United States Patent
Ikeda et al.

(10) Patent No.: US 9,112,925 B2
(45) Date of Patent: Aug. 18, 2015

(54) INFORMATION COMMUNICATION SYSTEM, FACILITY-SIDE APPARATUS AND PROGRAM, USER-SIDE APPARATUS AND PROGRAM, STATUS DETECTING DEVICE AND PROGRAM, UPDATING DEVICE AND PROGRAM

(75) Inventors: Hirotane Ikeda, Nagoya (JP); Toshihiro Hattori, Okazaki (JP); Mitsuyasu Matsuura, Chiryu (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 1580 days.

(21) Appl. No.: 12/071,850

(22) Filed: Feb. 28, 2008

(65) Prior Publication Data
US 2008/0215206 A1 Sep. 4, 2008

(30) Foreign Application Priority Data
Mar. 2, 2007 (JP) .................................. 2007-52942

(51) Int. Cl.
| | |
|---|---|
| *G01M 17/00* | (2006.01) |
| *G06F 15/16* | (2006.01) |
| *G06F 7/10* | (2006.01) |
| *G06F 17/30* | (2006.01) |
| *H04L 29/08* | (2006.01) |
| *G06Q 30/02* | (2012.01) |
| *G06Q 50/00* | (2012.01) |

(Continued)

(52) U.S. Cl.
CPC .............. *H04L 67/306* (2013.01); *G06Q 30/02* (2013.01); *G06Q 50/00* (2013.01); *H04L 29/06* (2013.01); *H04L 67/04* (2013.01); *H04L 67/18* (2013.01); *H04W 4/02* (2013.01)

(58) Field of Classification Search
CPC .......... G07C 5/008; G07C 5/006; G07C 5/02; G07C 5/0858; G07C 9/00158; G06Q 10/06; G06Q 50/30
USPC ............ 701/30, 35; 707/E17.019, 5; 709/227
See application file for complete search history.

(56) References Cited

U.S. PATENT DOCUMENTS

| | | | |
|---|---|---|---|
| 7,117,075 B1 * | 10/2006 | Larschan et al. ................. 701/35 |
| 7,233,858 B2 | 6/2007 | Sakatani | |
| 2006/0132291 A1 * | 6/2006 | Dourney et al. .......... 340/286.01 |

FOREIGN PATENT DOCUMENTS

| | | |
|---|---|---|
| JP | A-2000-137755 | 5/2000 |
| JP | A-2001-022836 | 1/2001 |

(Continued)

OTHER PUBLICATIONS

Office Action mailed Feb. 15, 2011 issued in corresponding JP patent application No. 2007-52942 (English translation enclosed).

*Primary Examiner* — John Q Nguyen
*Assistant Examiner* — Kyung Kim
(74) *Attorney, Agent, or Firm* — Posz Law Group, PLC

(57) ABSTRACT

An information communication system includes a user-side apparatus that is associated with a user and a facility-side apparatus provided at a facility, which the user is capable of visiting. The user-side apparatus transmits to the facility-side apparatus a user identifying information item related to the user of the user-side apparatus. The user identifying information item is used for identifying an appearance characteristic of the user. The facility-side apparatus outputs the appearance characteristic of the user identified based on the user identifying information item received from the user-side apparatus.

77 Claims, 28 Drawing Sheets

(51) Int. Cl.
*H04L 29/06* (2006.01)
*H04W 4/02* (2009.01)

(56) References Cited

FOREIGN PATENT DOCUMENTS

| | | |
|---|---|---|
| JP | A-2001-357278 | 12/2001 |
| JP | A-2002-056066 | 2/2002 |
| JP | A-2002-056171 | 2/2002 |
| JP | A-2002-056172 | 2/2002 |
| JP | A-2002-120670 | 4/2002 |
| JP | A-2002-170035 | 6/2002 |
| JP | A-2002-230264 | 8/2002 |
| JP | A-2003-141233 | 5/2003 |
| JP | A-2003-223422 | 8/2003 |
| JP | A-2003-242076 | 8/2003 |
| JP | A-2004-005345 | 1/2004 |
| JP | A-2004-259026 | 9/2004 |
| JP | A-2005-089095 | 4/2005 |
| JP | A-2005-190078 | 7/2005 |
| JP | A-2005-332135 | 12/2005 |
| JP | A-2006-004180 | 1/2006 |
| JP | A-2006-053599 | 2/2006 |
| JP | A-2006-146796 | 6/2006 |
| JP | A-2007-295524 | 11/2007 |

* cited by examiner

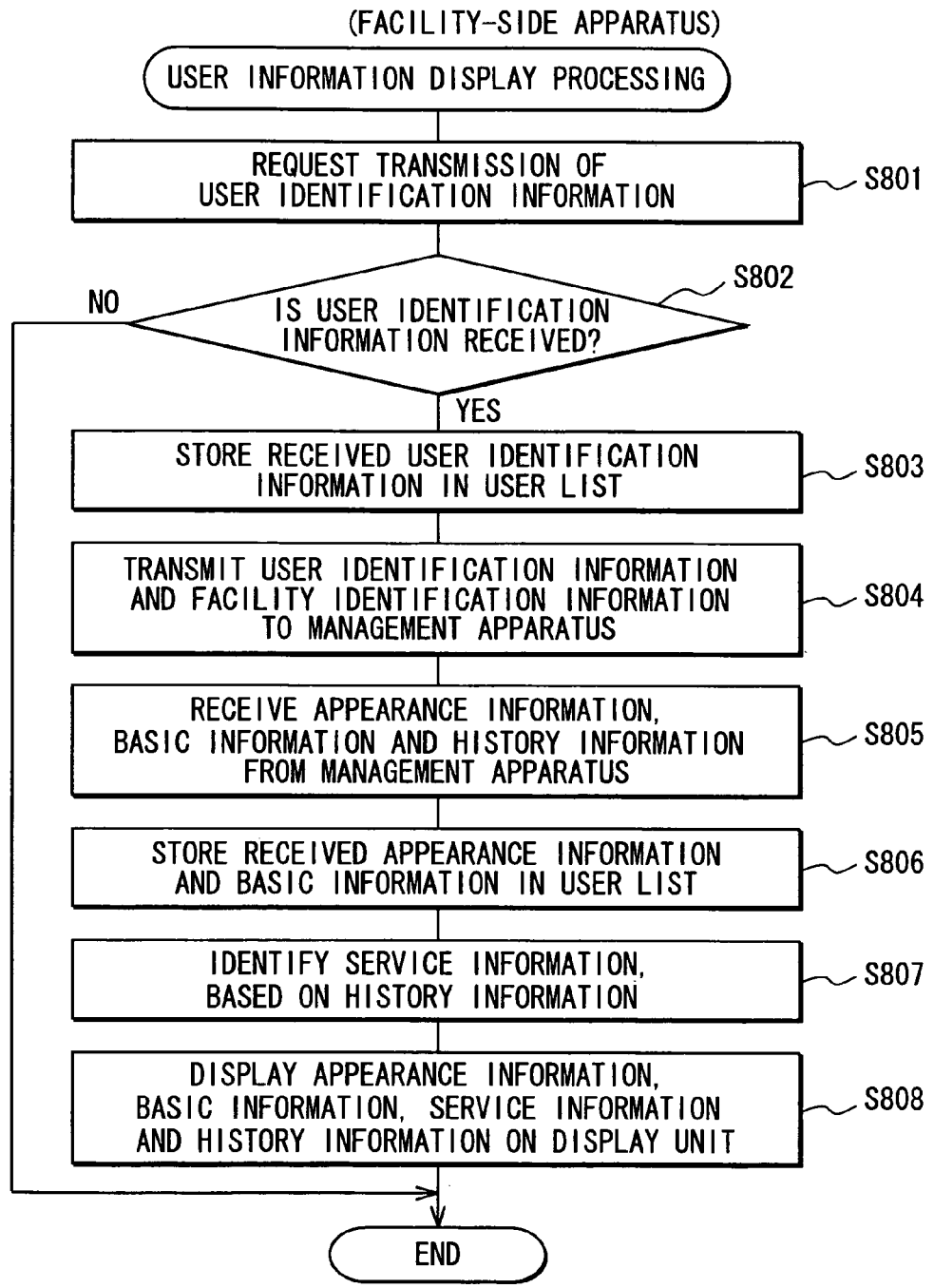

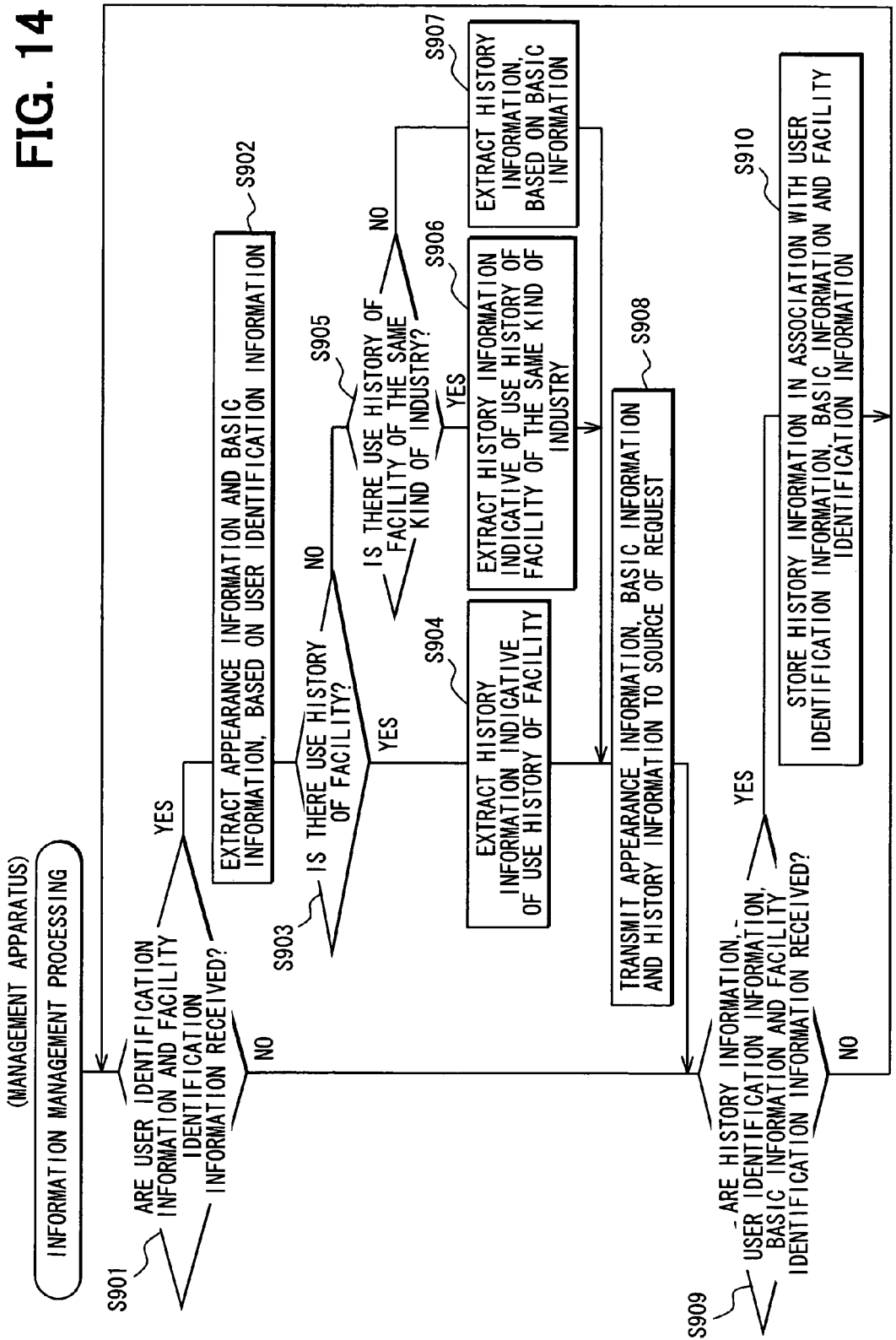

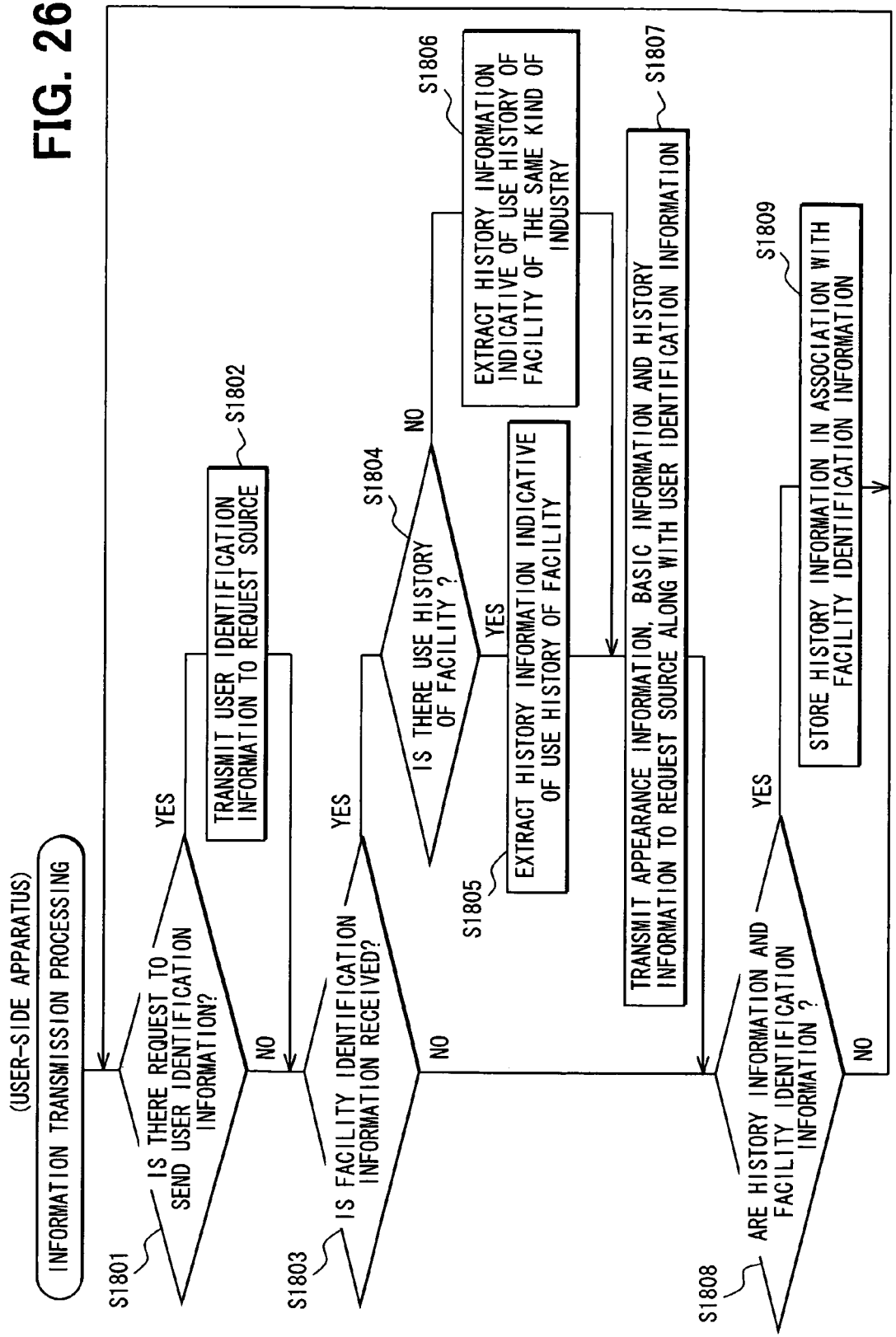

INFORMATION COMMUNICATION SYSTEM, FACILITY-SIDE APPARATUS AND PROGRAM, USER-SIDE APPARATUS AND PROGRAM, STATUS DETECTING DEVICE AND PROGRAM, UPDATING DEVICE AND PROGRAM

CROSS REFERENCE TO RELATED APPLICATION

This application is based on and incorporates herein by reference Japanese Patent Application No. 2007-52942 filed on Mar. 2, 2007.

BACKGROUND OF THE INVENTION

1. Field of the Invention

The present invention relates to an information communication system for a facility, which a user is capable of visiting.

2. Description of Related Art

There has heretofore been proposed an information communication system capable of furnishing service corresponding to each user that visits a facility. In an information communication system described in Japanese Unexamined Patent Publication No. 2006-4180, a vehicle, a user terminal carried by a user and a customer information computer terminal provided at a specific facility (dealer) are configured so as to be capable of performing short-range wireless communications. When the user visits the dealer, the customer information computer terminal retrieves customer information, based on a vehicle ID acquired from the vehicle by wireless communication and checks whether there are schedules for coming to the store for an occasion, such as a repair, a car inspection, business negotiation, etc. When there is a reservation for coming to the store, a sales representative makes contact with the user through an email and a house telephone or the like to meet the user, and the name of a customer, the purpose for coming to the shop and the like are displayed on a computer terminal of a reception counter.

SUMMARY OF THE INVENTION

It is however considered that in the above configuration, service to be provided to a given user may be provided to another user where multiple users visit a facility simultaneously.

The present invention is made in view of the above disadvantages. Thus, it is an objective of the present invention to address at least one of the above disadvantages.

According to a first aspect of the invention, an information communication system includes a user-side apparatus and a facility-side apparatus. The user-side apparatus is associated with a user. The facility-side apparatus is provided at a facility, which the user is capable of visiting. The user-side apparatus includes appearance information transmitting means for transmitting to the facility-side apparatus a user identifying information item related to the user of the user-side apparatus. The user identifying information item is used for identifying an appearance characteristic of the user. The facility-side apparatus includes output means for outputting the appearance characteristic of the user identified based on the user identifying information item received from the user-side apparatus.

According to a second aspect of the invention, a facility-side apparatus includes output means. The facility-side apparatus is provided at a facility, which a user is capable of visiting. The facility-side apparatus is capable of communicating with a user-side apparatus associated with the user. The user-side apparatus includes appearance information transmitting means for transmitting to the facility-side apparatus a user identifying information item related to the user. The user identifying information item is used for identifying an appearance characteristic of the user. The output means outputs the appearance characteristic of the user identified based on the user identifying information item received from the user-side apparatus.

According to a third aspect of the invention, a user-side apparatus associated with a user includes appearance information transmitting means. The user-side apparatus is capable of communicating with a facility-side apparatus. The facility-side apparatus is provided at a facility, which the user is capable of visiting. The facility-side apparatus includes output means for outputting an appearance characteristic of the user identified based on a user identifying information item received from the user-side apparatus. The appearance information transmitting means transmits to the facility-side apparatus the user identifying information item related to the user of the user-side apparatus. The user identifying information item is used for identifying the appearance characteristic of the user.

According to a fourth aspect of the invention, a status detecting device for an information communication system includes status detecting means and status information transmitting means. The information communication system includes a user-side apparatus associated with a user. The user-side apparatus includes appearance information transmitting means for transmitting to a facility-side apparatus a user identifying information item used for identifying a status information item indicative of an appearance characteristic of the user and indicative of a state related to the user. The status information item is received from the status detecting device. The system includes a facility-side apparatus provided at a facility, which the user is capable of visiting. The facility-side apparatus includes history information storing means for storing a plurality of history information items indicating services provided at the facility in a past. The facility-side apparatus includes service information generating means for generating a service selection information item for selecting service to be provided to the user based on one of the plurality of history information items stored in the history information storing means. The one of the plurality of history information items is related to the user having the appearance characteristic identified based on the user identifying information item received from the user-side apparatus. The one of the plurality of history information items corresponds to the status information item identified based on the user identifying information item. The facility-side apparatus includes notifying means for providing notification of the appearance characteristic of the user identified based on the user identifying information item received from the user-side apparatus together with the service selection information item generated by the service information generating means. The system includes a status detecting device mounted to a vehicle. The status detecting means detects at least one of a state of the user that sits in the vehicle and a state of the vehicle. The status information transmitting means transmits the status information item indicative of the state detected by the status detecting means to the user-side apparatus.

According to a fifth aspect of the invention, a status detecting device for an information communication system includes status detecting means and status information transmitting means. The information communication system includes a user-side apparatus associated with a user. The user-side apparatus includes appearance information transmitting means for transmitting to a facility-side apparatus a user identifying information item used for identifying a status information item indicative of an appearance characteristic of the user and indicative of a state related to the user. The status information item is received from the status detecting device. The system includes a management apparatus that stores a plurality of history information items indicating services provided in a past at a plurality of facilities. The system includes a facility-side apparatus provided at a facility, which the user is capable of visiting. The facility-side apparatus includes service information generating means for generating a service selection information item for selecting service to be provided to the user based on one of the plurality of history information items stored in the management apparatus. The one of the plurality of history information items is related to both (a) the user having the appearance characteristic identified based on the user identifying information item received from the user-side apparatus and (b) the facility having facility-side apparatus. The one of the plurality of history information items corresponds to the status information item identified based on the user identifying information item. The facility-side apparatus includes notifying means for providing notification of the appearance characteristic of the user identified based on the user identifying information item received from the user-side apparatus together with the service selection information item generated by the service information generating means. The system includes a status detecting device mounted to a vehicle. The status detecting means detects at least one of a state of the user that sits in the vehicle and a state of the vehicle. The status information transmitting means transmits the status information item indicative of the state detected by the status detecting means to the user-side apparatus.

According to a sixth aspect of the invention, an updating device suitable for an information communication system includes a capturing device. The system includes an updating device provided in a vehicle. The system includes a user-side apparatus associated with the user. The user-side apparatus includes appearance information transmitting means for transmitting to a facility-side apparatus a user identifying information item related to the user received from the updating device. The user identifying information item is used for identifying a face-shot image of the user. The system includes the facility-side apparatus provide at a facility, at which the user is capable of visiting. The facility-side apparatus includes output means for outputting the face-shot image of the user identified based on the user identifying information item received from the user-side apparatus. The capturing device captures an image of a face of the user to generate the face-shot image and transmits the face-shot image to the user-side apparatus associated with the user to perform image updating processing. The user sits in a driver seat of the vehicle.

According to a seventh aspect of the invention, an article manufacture for a facility-side apparatus includes a computer readable medium and program instructions. The facility-side apparatus is provided at a facility, which a user is capable of visiting. The facility-side apparatus is capable of communicating with a user-side apparatus associated with the user. The user-side apparatus includes appearance information transmitting means for transmitting to the facility-side apparatus a user identifying information item related to the user. The user identifying information item is used for identifying an appearance characteristic of the user. The computer readable medium is readable by a computer. The program instructions are carried by the computer readable medium for causing the computer to serve as output means for outputting the appearance characteristic of the user identified based on the user identifying information item received from the user-side apparatus.

According to a eighth aspect of the invention, an article manufacture for a user-side apparatus includes a computer readable medium and program instructions. The user-side apparatus is associated with a user for is capable of communicating with a facility-side apparatus. The facility-side apparatus is provided at a facility, which the user is capable of visiting. The facility-side apparatus includes output means for outputting an appearance characteristic of the user identified based on a user identifying information item received from the user-side apparatus. The computer readable medium is readable by a computer. The program instructions are carried by the computer readable medium for causing the computer to serve as appearance information transmitting means for transmitting to the facility-side apparatus the user identifying information item related to the user of the user-side apparatus. The user identifying information item is used for identifying the appearance characteristic of the user.

According to a ninth aspect of the invention, an article manufacture for a status detecting device for an information communication system includes a computer readable medium and program instructions. The information communication system includes a user-side apparatus associated with a user. The user-side apparatus includes appearance information transmitting means for transmitting to a facility-side apparatus a user identifying information item used for identifying a status information item indicative of an appearance characteristic of the user and indicative of a state related to the user. The status information item is received from the status detecting device. The system includes a facility-side apparatus provided at a facility, which the user is capable of visiting. The facility-side apparatus includes history information storing means for storing a plurality of history information items indicating services provided at the facility in a past. The facility-side apparatus includes service information generating means for generating a service selection information item for selecting service to be provided to the user based on one of the plurality of history information items stored in the history information storing means. The one of the plurality of history information items is related to the user having the appearance characteristic identified based on the user identifying information item received from the user-side apparatus. The one of the plurality of history information items corresponds to the status information item identified based on the user identifying information item. The facility-side apparatus includes notifying means for providing notification of the appearance characteristic of the user identified based on the user identifying information item received from the user-side apparatus together with the service selection information item generated by the service information generating means. The system includes a status detecting device mounted to a vehicle. The computer readable medium is readable by a computer. The program instructions are carried by the computer readable medium for causing the computer to serve as status detecting means and status information transmitting means. The status detecting means detects at least one of a state of the user that sits in the vehicle and a state of the vehicle. The status information transmitting means transmits the status information item indicative of the state detected by the status detecting means to the user-side apparatus.

According to a tenth aspect of the invention, an article manufacture for a status detecting device for an information communication system includes a computer readable medium and program instructions. The information communication system includes a user-side apparatus associated with a user. The user-side apparatus includes appearance information transmitting means for transmitting to a facility-side apparatus a user identifying information item used for identifying a status information item indicative of an appearance characteristic of the user and indicative of a state related to the user. The status information item is received from the status detecting device. The system includes a management apparatus that stores a plurality of history information items indicating services provided in a past at a plurality of facilities. The system includes a facility-side apparatus provided at a facility, which the user is capable of visiting. The facility-side apparatus includes service information generating means for generating a service selection information item for selecting service to be provided to the user based on one of the plurality of history information items stored in the management apparatus. The one of the plurality of history information items is related to both (a) the user having the appearance characteristic identified based on the user identifying information item received from the user-side apparatus and (b) the facility having facility-side apparatus. The one of the plurality of history information items corresponds to the status information item identified based on the user identifying information item. The facility-side apparatus includes notifying means for providing notification of the appearance characteristic of the user identified based on the user identifying information item received from the user-side apparatus together with the service selection information item generated by the service information generating means. The system includes a status detecting device mounted to a vehicle. The computer readable medium is readable by a computer. The program instructions are carried by the computer readable medium for causing the computer to serve as status detecting means and status information transmitting means. The status detecting means detects at least one of a state of the user that sits in the vehicle and a state of the vehicle. The status information transmitting means transmits the status information item indicative of the state detected by the status detecting means to the user-side apparatus.

According to an eleventh aspect of the invention, an article manufacture for an updating device suitable for an information communication system includes a computer readable medium and program instructions. The system includes an updating device provided in a vehicle. The system includes a user-side apparatus associated with the user. The user-side apparatus includes appearance information transmitting means for transmitting to a facility-side apparatus a user identifying information item related to the user received from the updating device. The user identifying information item is used for identifying a face-shot image of the user. The system includes the facility-side apparatus provide at a facility, at which the user is capable of visiting. The facility-side apparatus includes output means for outputting the face-shot image of the user identified based on the user identifying information item received from the user-side apparatus. The computer readable medium is readable by a computer. The program instructions are carried by the computer readable medium for causing the computer to serve as a capturing device that captures an image of a face of the user to generate the face-shot image and that transmits the face-shot image to the user-side apparatus associated with the user to perform image updating processing. The user sitting in a driver seat of the vehicle.

BRIEF DESCRIPTION OF THE DRAWINGS

The invention, together with additional objectives, features and advantages thereof, will be best understood from the following description, the appended claims and the accompanying drawings in which:

FIG. 13 is a flowchart of user information display processing according to the third embodiment;

FIG. 14 is a flowchart of information management processing according to the third embodiment;

FIG. 26 is a flowchart of information transmission processing according to the seventh embodiment;

DETAILED DESCRIPTION OF THE PREFERRED EMBODIMENTS

Preferred embodiments to which the present invention is applied will be explained below using the accompanying drawings.

1. First Embodiment

An information communication system according to a first embodiment of the present invention will first be described.

[1-1. Overall Configuration]

Figure 1:
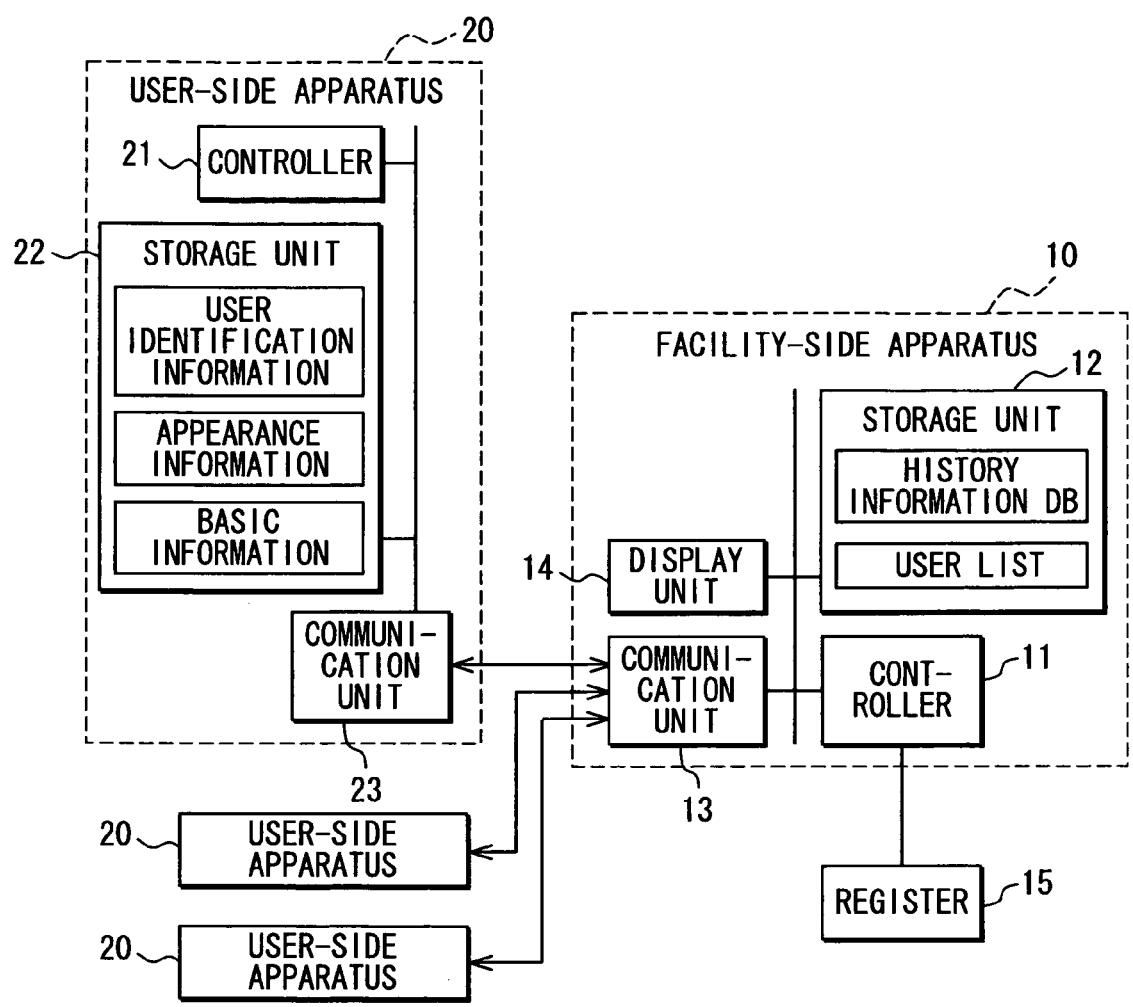
FIG. 1 is a block diagram showing a schematic configuration of an information communication system according to a first embodiment of the present invention.

FIG. 1 is a block diagram showing a schematic configuration of the information communication system according to the first embodiment.

The information communication system is designed to realize the furnishing or offering of service corresponding to individual users at facilities (such as restaurants, stores, etc.) at which the users stop. The information communication system includes a facility-side apparatus 10 placed or located in each facility and user-side apparatuses 20 associated with or possessed by the individual users.

Specific configurations of the respective apparatuses 10 and 20 that constitute the information communication system will be explained here.

[1-1-1. Configuration of Facility-Side Apparatus]

The facility-side apparatus 10 is equipped with a controller 11, a storage unit 12, a communication unit 13 and a display unit 14.

The controller 11 is mainly constituted of a microcomputer including a CPU, a ROM, a RAM, etc. and executes various processes. The controller 11 is connected communicably with a register (so-called POS register) 15 used when a service supplier (clerk, for example) on the facility side accepts the payment of service consideration from each user.

The storage unit 12 is so configured that various information items can be stored therein. A history information database corresponding to a database for managing usage histories of users who have utilized the facilities has been stored in the storage unit 12. The history information database stores therein history information transmitted from the register 15 as will be described later. For example, the history information or the history information item indicates the services provided to the user.

A user list corresponding to a database for managing information about users visiting the facilities or existing in the facilities has been stored in the storage unit 12. The user list is to be updated or renewed regularly as will be described later.

The communication unit 13 is designed to perform short-range wireless communications with the user-side apparatus 20 through which each user visits the facility. The communication unit 13 is capable of communicating with each user-side apparatus 20 lying or located in a communication area. In the present embodiment, the communication area is formed so as to contain all regions in which the users visiting the facilities can stay. Thus, the user-side apparatus 20 in a state of capable of communicating with the facility-side apparatus 10 is detected such that the user who is visiting each facility can be detected. As the short-range wiring communications, may be, for example, Bluetooth (registered trademark), DSRC (Dedicated Short Range Communication), wireless LAN, ZIGBEE (registered trademark), etc.

The display unit 14 is provided to display various information items for the service suppliers on the facility side. The display unit 14 is configured using, for example, a liquid crystal display.

[1-1-2. Configuration of User-Side Apparatus]

The user-side apparatus 20 is a transportable terminal portable by each facility-utilizing user and includes a controller 21, a storage unit 22 and a communication unit 23. For example, the user-side apparatus 20 employs a configuration of a cellular phone terminal in the present embodiment.

The controller 21 is mainly constituted of a microcomputer including a CPU, a ROM, a RAM, etc. and executes various processes.

The storage unit 22 is so configured that various information items can be stored therein. User identification information corresponding to identification information unique to users each having the user-side apparatus 20, appearance information indicative of appearance characteristics of the users, and basic information about the users have been stored in the storage unit 22 in advance. These information are written when the users have executed entry procedures for utilizing the present information communication system, for example, and are updated as needed.

Here, the appearance information are used to distinguish multiple users visiting the facilities by the service supplier on the facility side, based on the appearance characteristics. In the present embodiment, image information indicative of a face-shot image or an image of the face of each user is used.

The basic information is registered as information indicative of the characteristic of each user in advance. The basic information includes information about the name, height, weight, age, blood type, family structure and hobby of each user. The basic information can be updated as needed.

The communication unit 23 is designed to perform short-range wireless communications with the facility-side apparatus 10.

[1-2. Processing Executed by Information Communication System]

Processing executed by each of the apparatuses 10 and 20 that constitute the information communication system according to the first embodiment will next be explained.

[1-2-1. Information Transmission Processing]

Figure 2:
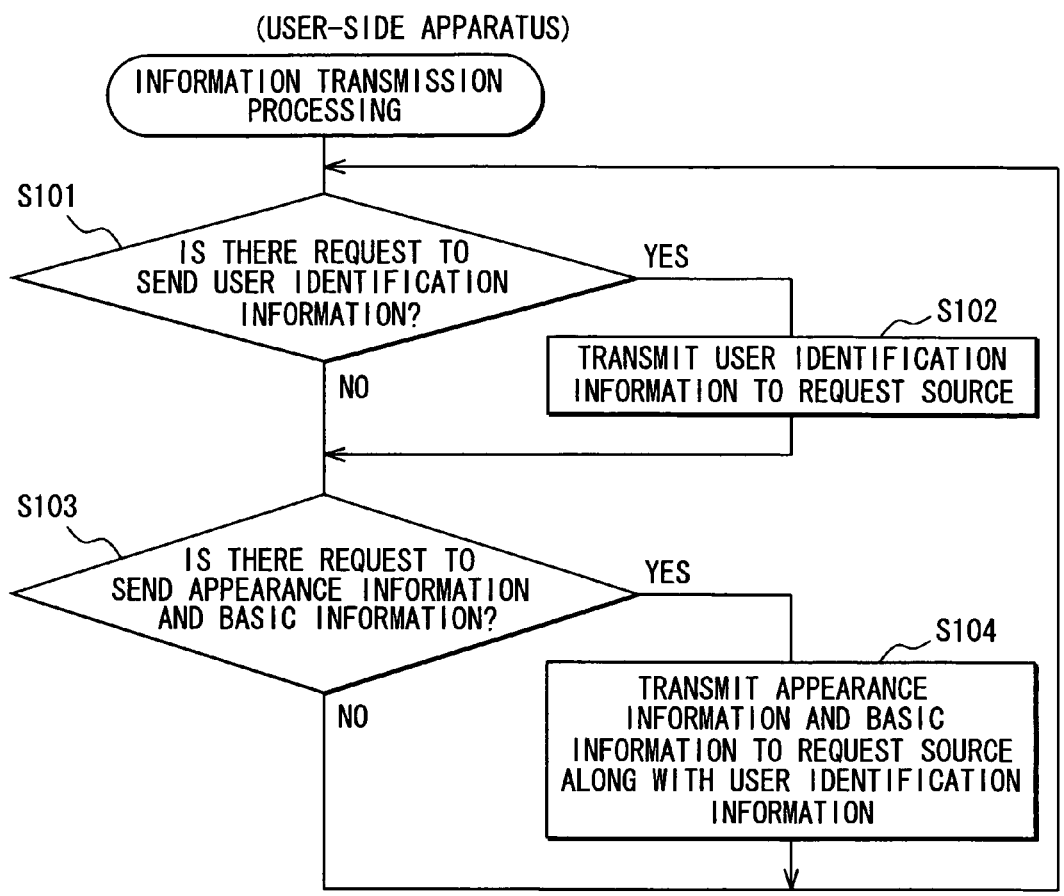
FIG. 2 is a flowchart of information transmission processing according to the first embodiment.

Information transmission processing executed by the controller 21 of the user-side apparatus 20 will first be explained using a flowchart shown in FIG. 2. The information transmission processing is started together with the start-up of the user-side apparatus 20 (power-on) and conducted continuously until the operation of the user-side apparatus 20 is stopped (power is turned off).

When the information transmission processing is started, the controller 21 first determines at S101 whether an identification information send request that requests the transmission of the user identification information is received. Here, the identification information send request is information regularly transmitted by the facility-side apparatus 10 through the short-range wireless communications as will be described later. The identification information send request is received in a state in which each user having or associated with the user-side apparatus 20 is visiting the facility.

When it is determined at S101 that the identification information send request has been received, the information transmission processing proceeds to S102, where the user identification information (user identification information of each user having the user-side apparatus 20) stored in the storage unit 22 is transmitted to the facility-side apparatus 10 corresponding to a request source or requester. Then, the information transmission processing proceeds to S103.

On the other hand, when it is determined at S101 that the identification information send request has not been received, the information transmission processing proceeds to S103.

It is determined at S103 whether a user information send request that requests the transmission of each of the appearance information and the basic information is received. Here, as will be described later, the user information send request is transmitted to the corresponding user-side apparatus 20 whose existence has been detected at the facility by the facility-side apparatus 10.

When it is determined at S103 that the user information send request has been received, the information transmission processing proceeds to S104. At S104, the appearance information and the basic information (appearance information and basic information of each user having the user-side apparatus 20) stored in the storage unit 22 is transmitted to the facility-side apparatus 10 of the request source together with the user identification information. Then, the information transmission processing returns to S101.

On the other hand, when it is determined at S103 that the user information send request has not been received, the information transmission processing returns to S101.

[1-2-2. Service History Storage Processing]

Figure 3:
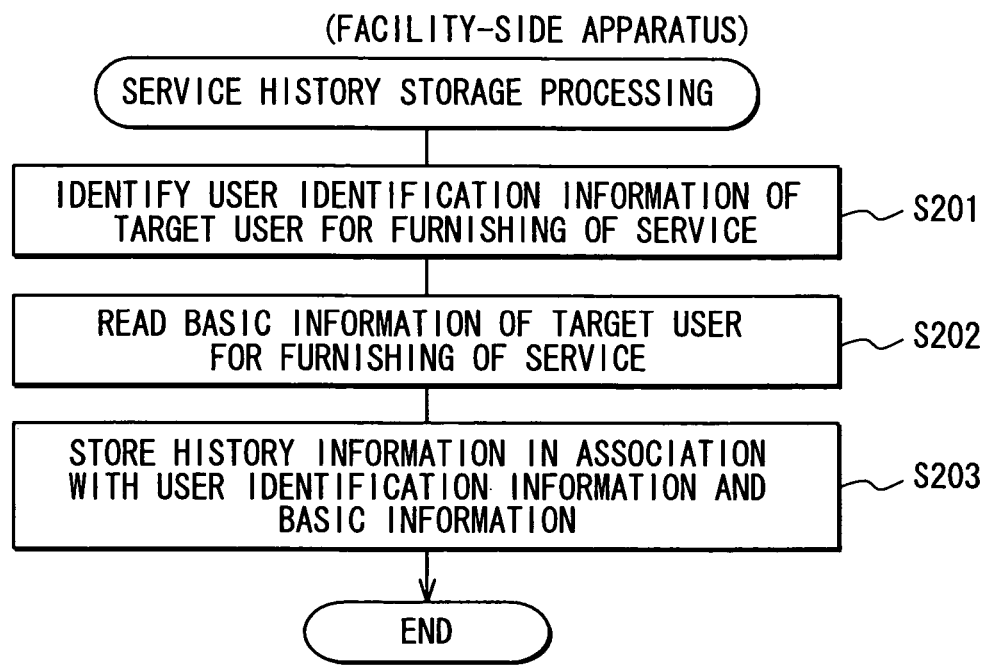
FIG. 3 is a flowchart of service history storage processing according to the first embodiment.

Service history storage processing executed by the controller 11 of the facility-side apparatus 10 will next be explained using a flowchart shown in FIG. 3. The service history storage processing is started by receiving history information and user identifying information used for identifying the user from the register 15.

That is, when the services are provided or furnished to each user at the facility, the service supplier on the facility side inputs information (history information) indicative of the contents of the service, information (user identifying information) used for identifying each user provided with the service to the register 15 together with information about the value of the service. The register 15 is configured so as to transmit the history information and user identifying information inputted by the service supplier to the facility-side apparatus 10. That is, the service history storage processing is executed each time the provision or furnishing of the service for each user is done at the facility.

The service supplier on the facility side is able to input user identifying information, based on the appearance characteristics of each user. That is, as will be described later, the facility-side apparatus 10 always grasps information about each user in the facility and allows the display unit 14 to display a user's face-shot image and the like. Therefore, the user identifying information may be information used for identifying each user provided with the service among the users grasped by the facility-side apparatus 10. If, for example, the face-shot image of each user in the facility is to be displayed together with a serial number, then the user identifying information may be defined as the serial number.

When the service history storage processing is started, the controller 11 first identifies or specifies user identification information of each user provided with the service among the user identification information stored in the user list of the storage unit 12, based on the user identifying information received from the register 15 at S201. In other words, the controller 11 first identifies one of the user identification information items stored in the user list of the storage unit 12 based on the user identifying information received from the register 15 at S201. That is, the user identification information, appearance information and basic information are stored in the user list in association with one another as the information of each user in the facility as will be described later. At S201, the user identification information of each user provided with the service is specified or identified.

Subsequently, at S202, the controller 11 reads the basic information stored in the user list in association with the user identification information specified at S201. For example, the basic information includes information item of the user provided with the service.

At S203 subsequent to the above, the history information received from the register 15 is stored in the history information database of the storage unit 12 in association with the user identification information and basic information of each user provided with the service.

That is, each time the provision of each user with the service is done at the facility, history information indicative of the contents of the service is added to the history information database in association with the user identification information and basic information of each user provided with the service. As a result, history information about the service provided in the past at each facility provided in the facility-side apparatus 10 are stored in the history information database in a retrievable state with the information, such as user identification information, basic information, of each user provided with the service as clues.

[1-2-3. User Information Display Processing]

Figure 4:
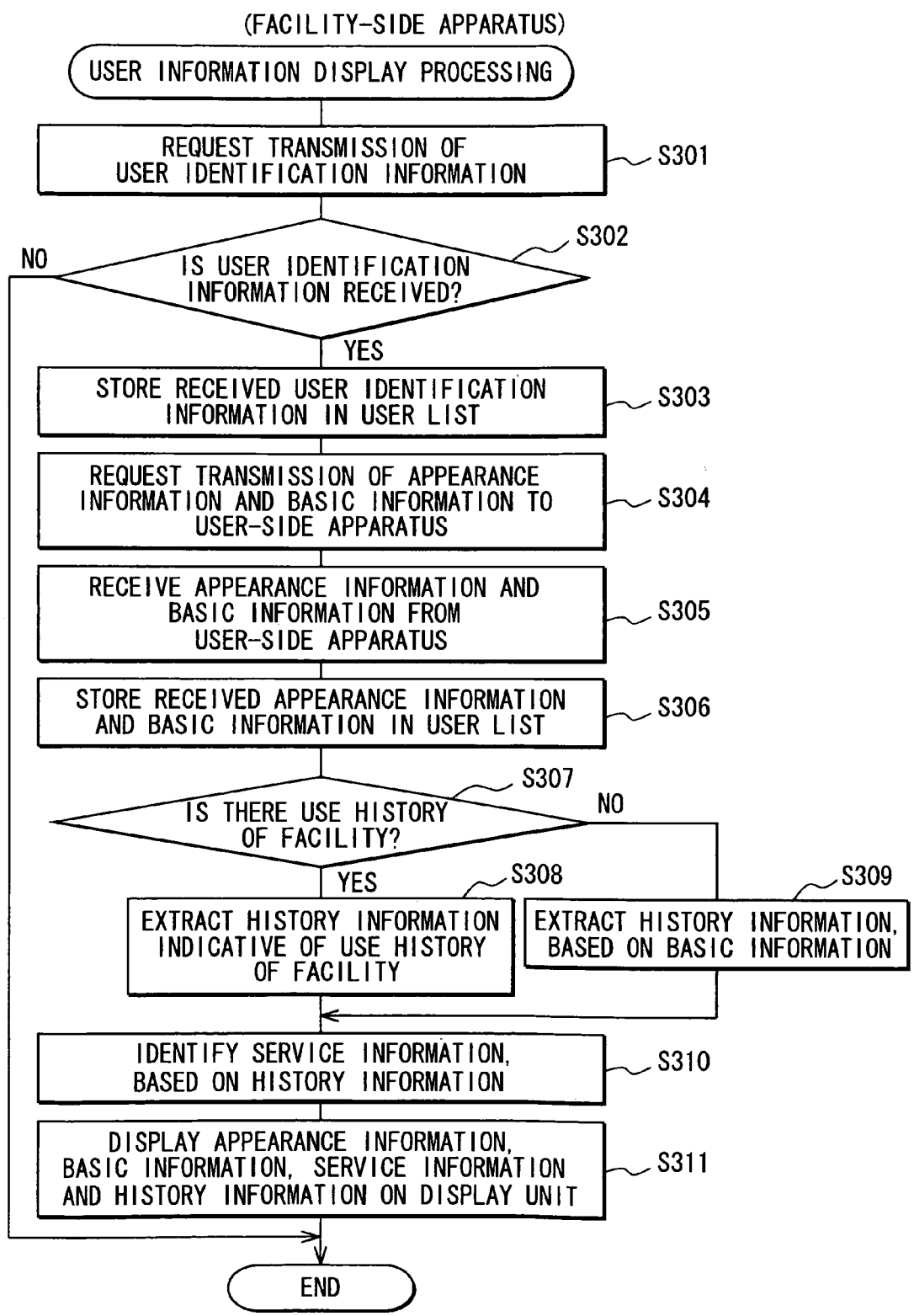
FIG. 4 is a flowchart of user information display processing according to the first embodiment.

User information display processing executed regularly (every second, for example) by the controller 11 of the facility-side apparatus 10 will next be explained using a flowchart shown in FIG. 4.

When the user information display processing is started, the controller 11 first sends an identification information send request that requests the transmission of the user identification information to the corresponding user-side apparatus 20 by using short-range wireless communications to detect each user in the facility at S301. Thus, when the user-side apparatus 20 exists in a communication area or when the user having or associated with the user-side apparatus 20 is in the facility, the user identification information is transmitted to the corresponding facility-side apparatus 10, corresponding to S102 at the above information transmission processing in FIG. 2. That is, the user-side apparatus 20 or the user in the facility existing in the communication area is detected by receiving the user identification information from the user-side apparatus 20 being in a state of communicating with the facility-side apparatus 10.

Subsequently, it is determined at S302 whether the user identification information is received.

When it is determined at S302 that the user identification information has not been received (each user having the user-side apparatus 20 is absent in the facility), the present user information display processing is terminated.

On the other hand, when it is determined at S302 that the user identification information has been received, the user information display processing proceeds to S303.

At S303, the received user identification information is stored in the corresponding user list of the storage unit 12 as information about the individual users visiting the facility. For example, all of multiple pieces of the user identification information or the multiple user indication information items may be stored in the user list of the storage unit 12 if received.

Described specifically, the information about each user unsubjected to the reception of its user identification information, of the information (information about the users whose existences have already been detected) already stored in the user list is first erased. That is, the information about each user moved out from the facility is erased from the user list.

Next, the information unstored in the user list, of the received user identification information is newly stored in the user list. That is, the information about each user having visited the facility newly is added to the user list.

Incidentally, if the information on the respective users in the user list are stored in a state in which the order of adding the same to the user list is identifiable, it is then possible to grasp the order in which the respective users visit, even when the multiple users are visiting the facility.

Subsequently, at S304, a user information send request that requests the transmission of the appearance information and basic information is transmitted to the user-side apparatus 20 or the user-side apparatus 20 of each user in the facility. The user-side apparatus 20 corresponds to a transmission source of the user identification information stored in the user list. Thus, the appearance information and basic information stored in the user-side apparatus 20 possessed by each user in the facility are transmitted to the corresponding facility-side apparatus 10 together with the user identification information, corresponding to S104 at the above information transmission processing in FIG. 2. When multiple user identification information items are stored in the user list, a user information send request is transmitted to each of user-side apparatuses 20 (all user-side apparatuses 20 present at the facility) corresponding to transmission sources of the respective user identification information.

Subsequently, at S305, the appearance information, basic information and user identification information transmitted from each of the user-side apparatus 20 are received.

At S306 subsequent to the above, the appearance information and basic information received at S305 are stored in the user list. Since the user identification information of each user in the facility has already been stored in the user list here, the appearance information and basic information are stored in association with the user identification information. As a result, the user identification information, appearance information and basic information are stored in the user list in association with one another as the information of each user in the facility.

The same information is overwritten as to the users (users whose existences have already been detected) whose appearance information and basic information have already been stored in the user list at the stage prior to execution of the process of S306. Therefore, the transmission of the user information send request at S304 may not be conducted for such users. That is, only as to the user identification information newly registered in the user list at S303, the user information send request is transmitted to the corresponding user-side apparatus 20 corresponding to the transmission source of the user identification information at S304. If done in the above way, unnecessary communications with each user-side apparatus 20 can be reduced.

Subsequently, it is determined at S307 whether the user identification information (which will be defined as "user identification information X" for convenience of explanation) stored in the user list is stored in the history information database of the storage unit 12. That is, it is determined whether each user in the facility corresponds to the user who has ever utilized the facility in the past. When plural (N≥2) user identification information X(1) through X(N) are stored in the user list, the determining process of S307 is performed on the respective user identification information X(1) through X(N). Therefore, the process of S308 or S309 is also effected on the respective identification information X(1) through X(N).

When it is determined at S307 that the user identification information X has been stored in the history information database, the user information display processing proceeds to S308, where the corresponding history information associated with the user identification information X is extracted among the history information stored in the history information database. Thereafter, the user information display processing proceeds to S310.

On the other hand, when it is determined at S307 that the user identification information X has not been stored in the history information database, the user information display processing proceeds to S309. At S309, the corresponding history information associated with basic information identical or similar to the basic information (which will be defined as "basic information X" for convenience of explanation) corresponding to the user identification information X is extracted among the history information stored in the history information database. Then, the user information display processing proceeds to S310. In the present embodiment, basic information containing information identical or similar to specific information contained in the basic information X will be defined as basic information similar to the basic information X. The basic information can be set like, for example, basic information about the age (give or take two years) identical or similar to information about the age contained in the basic information X. That is, when the history information of each user does not exist, the corresponding history information of the user similar to that user is extracted.

At S310, the controller 11 generates the service selection information used as reference information, which is used when a service supplier on the facility side selects the service to be provided to each user, based on the history information extracted from the history information database. In other words, the controller 11 generates the service selection information item based on one of the plurality of history information items stored in the history information database such that the service supplier selects the service to be provided to the user. Specifically, the services indicated by the extracted history information are divided into service categories or groups, and a service with frequently used is specified among the services in each service category. In other words, the contents of the service high in the frequency of use are specified in the respective group.

When the facility is of a restaurant, for example, information used for identifying or specifying the preference of drinking and eating, and information used for identifying the preference of the atmosphere are contained in history information. Described specifically, the information used for identifying the preference of drinking and eating may include information about the category of the food (for example, Japanese food, Chinese food, Western dish or the like), which the user has ordered, the detail of the dishes of the ordered food (for example, meat dish, potato dish, salads or the like), the seasoning for the dishes (for example, hot, salt reduction or the like), the alcoholic beverages (for example, beer, wine, shochu, etc.), which the user has ordered, etc. The information used for identifying the preference of the atmosphere may include information about the type of desired seat (table seat, private room or the like), the type of desired music (jazz, classic or the like), etc.

In this case, the contents of the service indicative of history information are group-divided into kinds of the genre of cooking, the contents of cooking, the seasoning, the contents of alcoholic beverages, the type of seat, and the type of music at S310. In the respective groups, three of less contents with high frequency of use are specified. Thus, the service selection information for selecting the service (user friendly service) to be provided to each user is generated.

When multiple user identification information items are stored in the user list, the process of S310 is performed with respect to users related to the respective user identification information.

Subsequently, at S311, the display unit 14 is caused to display the appearance information, basic information, service selection information and history information of the respective users whose user identification information have been stored in the user list, and the present user information display processing is terminated.

Figure 5:
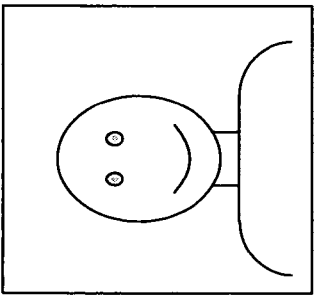
FIG. 5 is an explanatory diagram showing information displayed on a display unit.

Described specifically, as shown in FIG. 5, the appearance information (face-shot image) is displayed at the upper left of a display screen. The basic information (including name, height, weight, age, blood type, family structure, and hobby) is displayed on the lower side thereof. Further, the service selection information generated at S310 (including the preference of drinking and eating, and the preference of atmosphere) is displayed on the right side of the face-shot image, and the history information (including day coming to the shop, the number of accompanying persons, ordered cook, and ordered alcoholic beverage) is displayed on the lower side thereof. As to the history information, for example, only the latest information (only two information items in the present example) may be displayed without displaying all information items.

Since the information of each user in the facility is displayed on the display unit 14 in accordance with such user information display processing, the service supplier on the facility side is capable of grasping the appearance characteristics of each user having visited the facility and the service to be provided to the user in association with each other. If multiple users are visiting the facility, it is preferable to display information about all users on the display unit 14 simultaneously. Thus, display forms other than it can also be adopted. The information may be displayed in a hierarchical structure as in a case in which, for example, only basic information about the face-shot image, name and the like is displayed on the top screen and the corresponding information on the top screen is selected, thereby making a jump to a detailed display screen for displaying detailed information about the selected user.

[1-3. Effects]

The following advantageous effects are obtained according to the information communication system of the first embodiment as described above.

(1A) The facility-side apparatus 10 generates information for selecting the service to be provided to each user, based on information acquired from the corresponding user-side apparatus 20 possessed by the user visiting a facility, and causes the display unit 14 to display the information together with a face-shot image of the user. Therefore, even when plural unknown users have visited the facility, a service supplier on the facility side is able to recognize or distinguish the users easily and grasp what service should be provided to any user. As a result, the provision of the service corresponding to the respective users can be realized even when the multiple users visit the facility simultaneously.

Described specifically, the service corresponding to users can be provided in the following cases, for example.

Figure 6A:
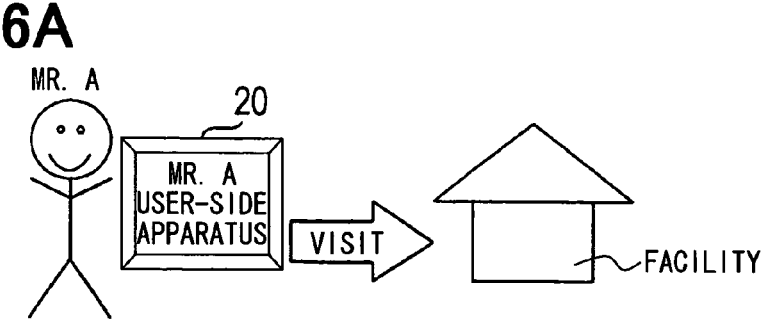
FIG. 6A is a typical diagram for describing the effects of the information communication system.

There is considered a case where as shown in FIG. 6A, a given user A (Mr. A) visits a facility with his own user-side apparatus 20. In this case, service selection information for selecting service to be provided to the user A is displayed on the display unit 14 together with a face-shot image of the user A at the facility.

Figure 6B:
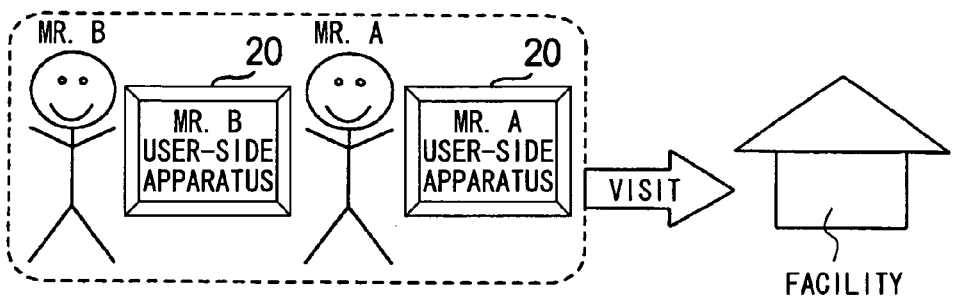
FIG. 6B is another typical diagrams for describing the effects of the information communication system.

There is considered a case where as shown in FIG. 6B, a user A (Mr. A) and a user B (Mr. B) visit a facility with their own user-side apparatuses 20 respectively. That is, in the case shown in FIG. 6A, the user B further visits the facility. In this case, service selection information for selecting service to be provided to the user A is displayed on the display unit 14 together with a face-shot image of the user A at the facility. Further, service selection information for selecting service to be provided to the user B is displayed on the display unit 14 together with a face-shot image of the user B at the facility.

Figure 6C:
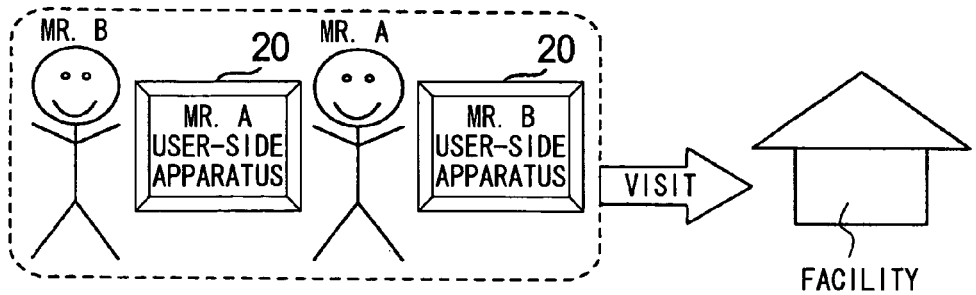
FIG. 6C is further another typical diagrams for describing the effects of the information communication system.

Further, there is considered a case where as shown in FIG. 6C, a user A (Mr. A) visits a facility with a user-side apparatus 20 of a user B, and another user B (Mr. B) visits the facility with a user-side apparatus 20 of the user A. That is, in the case shown in FIG. 6B, the respective users A and B visit the facility each having the other user-side apparatus 20 of the other user. Even in this case, service selection information for selecting service to be provided to the user A is displayed on the display unit 14 together with a face-shot image of the user A, and service selection information for selecting service to be provided to the user B is displayed on the display unit 14 together with a face-shot image of the user B.

Figure 6D:
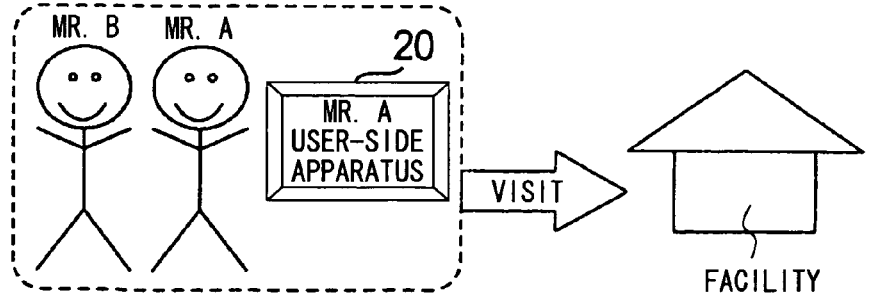
FIG. 6D is still further another typical diagrams for describing the effects of the information communication system.

On the other hand, there is considered a case where as show in FIG. 6D, a user A (Mr. A) visits a facility with his own user-side apparatus 20, and another user B (Mr. B) visits the facility without the user-side apparatus 20. That is, in the case of FIG. 6B, the user B does not have his or her own user-side apparatus 20. In this case, service selection information for selecting service to be provided to the user A is displayed on the display unit 14 together with a face-shot image of the user A at the facility.

(1B) The facility-side apparatus 10 is configured so as to be capable of communicating with the corresponding user-side apparatus 20 by wireless. The facility-side apparatus 10 receives various information items only from the corresponding user-side apparatus 20 (user-side apparatus 20 possessed by each user visiting a facility). Therefore, only information about each user in the facility is displayed on the display unit 14. Hence, the service supplier on the facility side is able to confirm only necessary information.

(1C) Since the user-side apparatus 20 transmits information only as needed according to a request issued from the facility-side apparatus 10, the transmission of unnecessary information can be reduced as compared with such a configuration that the transmission of information is conducted regardless of the request issued from the facility-side apparatus 10. Since the information stored in the user-side apparatus 20 is automatically acquired by the facility-side apparatus 10 and there is no need to cause each user to perform a specific operation, it is possible to furnish service corresponding to the user to the user without making the user conscious thereof.

(1D) The facility-side apparatus 10 acquires appearance information indicative of the appearance characteristics of each user having visited a facility, and basic information about the user from the corresponding user-side apparatus 20. With such a configuration, the facility-side apparatus 10 is not required to store in advance the appearance information and the basic information about each user who use the facility. Further still, even a first-visiting user who visits the facility for the first time can be recognized based on its appearance.

(1E) Since the facility-side apparatus 10 generates service selection information, based on history information of each user when the history information exists, it can select suitable service corresponding to each individual user. When the history information about the user does not exist, the facility-side apparatus 10 generates service selection information, based on history information of another user having a characteristic similar to, identical with, or common to the characteristic of the user. For example, the another user is close in age to the user. Therefore, the facility-side apparatus 10 can select service corresponding to the first-visiting user that visits the facility for the first time.

[1-4. Correspondence to Claims]

The controller 21 of the user-side apparatus 20 that executes the process of S104 at the information transmission processing (FIG. 2), corresponds to appearance information transmitting means in the information communication system according to the first embodiment.

The controller 11 of the facility-side apparatus 10 that executes the processes of S307 through S310 at the user information display processing (FIG. 4) corresponds to service information generating means. The controller 11 of the facility-side apparatus 10 that executes the process of S311 corresponds to output means (notifying means). The storage unit 12 of the facility-side apparatus 10 corresponds to history information storing means.

2. Second Embodiment

An information communication system according to a second embodiment of the present invention will next be explained.

[2-1. Overall Configuration]

Figure 7:
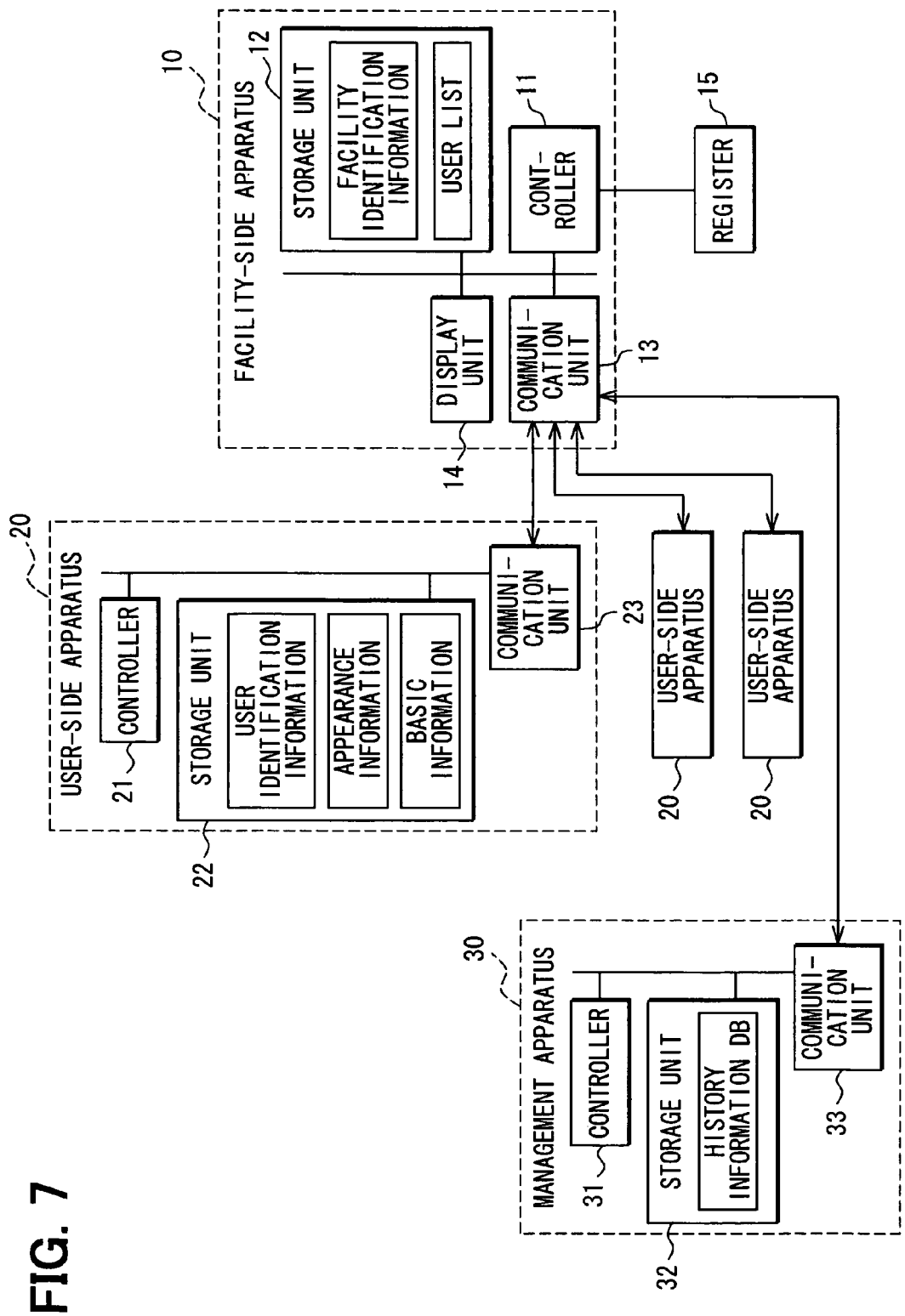
FIG. 7 is a block diagram showing a schematic configuration of an information communication system according to a second embodiment of the present invention.

FIG. 7 is a block diagram showing a schematic configuration of the information communication system according to the second embodiment.

Comparing with the information communication system (FIG. 1) of the first embodiment, the information communication system according to the second embodiment is different therefrom in that it is further provided with a management apparatus 30 provided at a management center. Elements or portions different from those of the information communication system according to the first embodiment will be mainly explained below. The same reference numerals are used for common elements or portions, and their explanations are therefore omitted.

[2-1-1. Configuration of Management Apparatus]

The management apparatus 30 is designed to execute control and management over information related to multiple users and plural facilities. The management apparatus 30 includes a controller 31, a storage unit 32 and a communication unit 33.

The controller 31 is mainly constituted of a microcomputer including a CPU, a ROM, a RAM, etc. and executes various processes.

The storage unit 32 is so configured that various information items can be stored therein. A history information database corresponding to a database for managing usage histories of users who have utilized the plural facilities under the control of the management apparatus 30 has been stored in the storage unit 32. The history information database stores therein history information transmitted from each facility-side apparatus 10 as will be described later.

The communication unit 33 is designed to perform communications with the respective facility-side apparatuses 10 provided at the plural facilities lying under the control of the management apparatus 30. In the present embodiment, the communication unit 33 is configured so as to be capable of constantly performing data communication with each facility-side apparatus 10 via Internet.

[2-1-2. Configuration of Facility-Side Apparatus]

The facility-side apparatus 10 of the second embodiment is different from the facility-side apparatus 10 of the first embodiment in that the history information database is not stored in the storage unit 12 and facility identification information corresponding to identification information unique to each facility provided for the facility-side apparatus 10 is stored in the storage unit 12 in advance.

The facility identification information is of information unique to each facility provided for the facility-side apparatus 10 and is set as information used for identifying or specifying the type or the category of the facility. The category includes a business field that is associated with the facility, for example. The facility identification information is made up of ten-digit numbers as a whole. Such information that the upper three-digit numbers indicate the type of facility and the lower seven-digit numbers indicate unique numbers can be used.

A communication unit 13 of the facility-side apparatus 10 is configured to communicate with its corresponding user-side apparatus 20 and the management apparatus 30. Described specifically, the communication unit 13 is configured so as to perform short-range wireless communications with the corresponding user-side apparatus 20 in a manner similar to the information communication system of the first embodiment. On the other hand, the communication unit 13 is configured so as to be capable of constantly performing data communications with the management apparatus 30 via Internet.

[2-1-3. Configuration of User-Side Apparatus]

The user-side apparatus 20 employed in the information communication system according to the second embodiment is identical to the user-side apparatus 20 of the first embodiment in configuration.

[2-2. Processing Executed by Information Communication System]

Processing executed by each of the apparatuses 10, 20 and 30 that constitute the information communication system according to the second embodiment will next be explained.

[2-2-1. Information Transmission Processing]

Since information transmission processing executed by a controller 21 of the user-side apparatus 20 is identical to that (FIG. 2) of the first embodiment, the description thereof is omitted.

[2-2-2. Service History Storage Processing]

Figure 8:
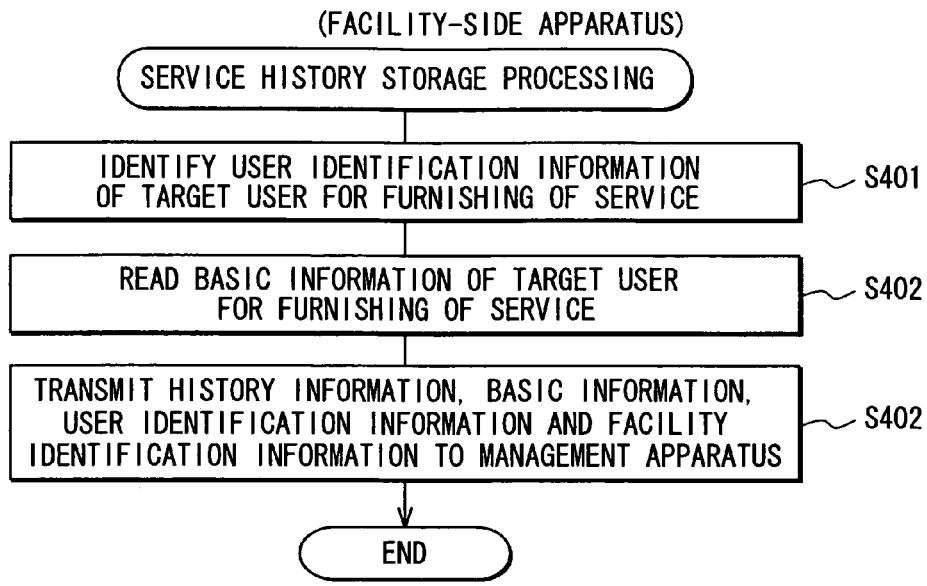
FIG. 8 is a flowchart of service history storage processing according to the second embodiment.

Service history storage processing executed by a controller 11 of the facility-side apparatus 10 will next be explained using a flowchart shown in FIG. 8. As compared with the service history storage processing (FIG. 3) of the first embodiment, the service history storage processing of the second embodiment is different therefrom in that process of S403 is conducted in place of the process of S203. Since the processing contents of S401 and S402 are identical to those of S201 and S202 in other respects, their explanations are omitted.

At S403, history information received from a register 15, user identification information and basic information about each user provided with service, and facility identification information stored in the storage unit 12 are transmitted to the management apparatus 30 as history information registration request. For example, the facility identification information about each facility provided for the corresponding facility-side apparatus 10 is stored in the storage unit 12. Then, the present service history storage processing is terminated. Thus, the transmitted history information is stored in the history information database of the storage unit 32 of the management apparatus 30 in a state of being associated with the transmitted user identification information, basic information and facility identification information (S609 at information management processing (FIG. 10) to be described later).

That is, the service history storage processing of the second embodiment is different from that of the first embodiment in that the history information is stored in the management apparatus 30 and the history information is associated with the facility identification information.

[2-2-3. User Information Display Processing]

Figure 9:
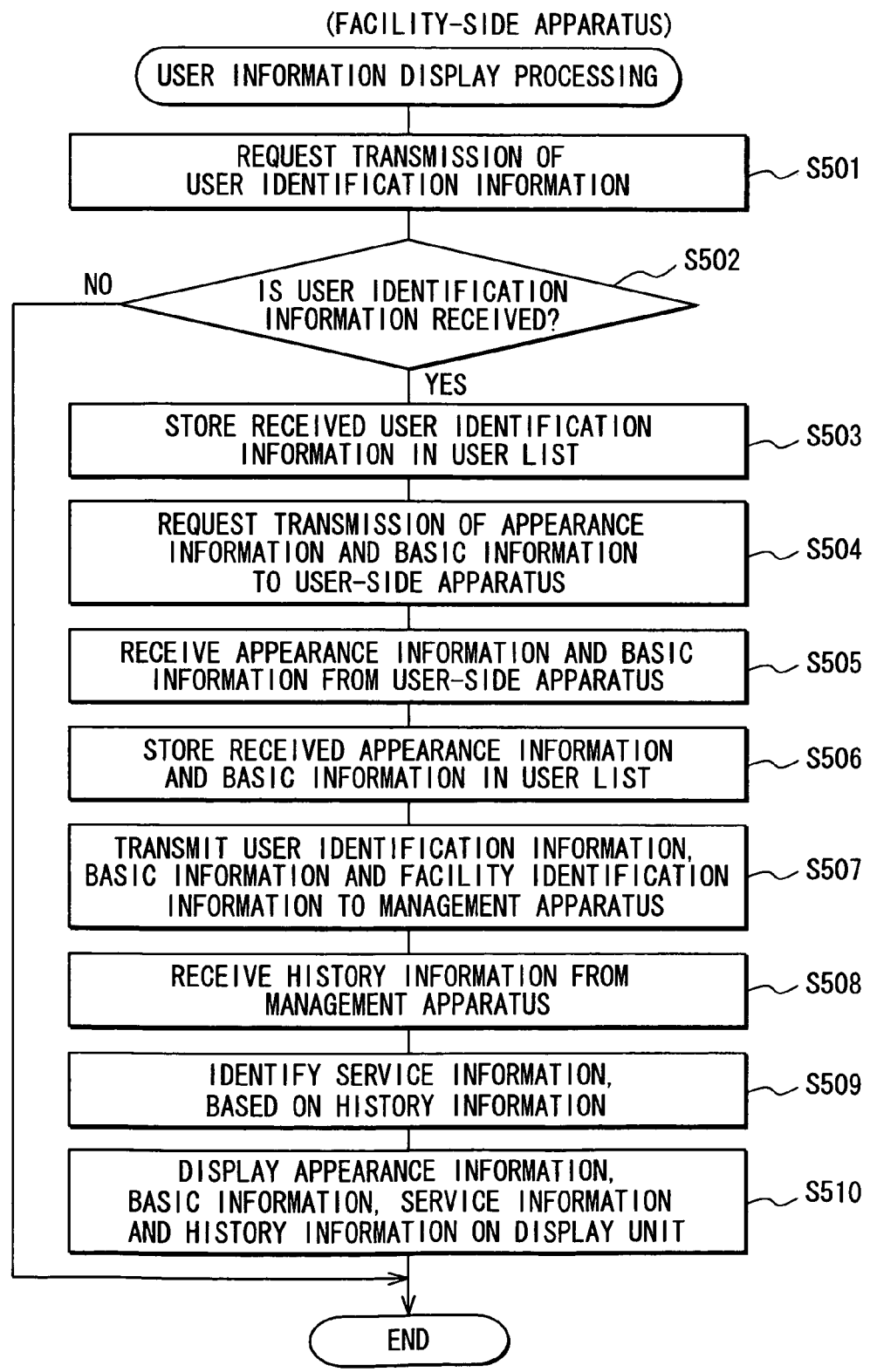
FIG. 9 is a flowchart of user information display processing according to the second embodiment.

User information display processing executed by the controller 11 of the facility-side apparatus 10 will next be explained using a flowchart shown in FIG. 9. As compared with the user information display processing (FIG. 4) of the first embodiment, the user information display processing of the second embodiment is different therefrom in that processes of S507 and S508 are carried out in place of the processes of S307 through S309. Since the processing contents of S501 through S506, S509 and S510 are identical to those of S301 through S306, S310 and S311 in other respects, their explanations are omitted.

At S507, user identification information and basic information of each user stored in a user list, and facility identification information (facility identification information of each facility provided for the corresponding facility-side apparatus 10) stored in the storage unit 12 are transmitted to the management apparatus 30 as requests to send history information. Consequently, the history information for selecting service to be provided to each user visiting a facility is transmitted from the management apparatus 30 to the facility-side apparatus 10 (S607 at information management processing (FIG. 10) to be described later).

Subsequently, the history information transmitted from the management apparatus 30 is received at S508. Incidentally, service selection information to be provided to each user is generated based on the history information received at S508 (S509).

That is, the user information display processing of the second embodiment is different from that of the first embodiment in that the history information for selecting the service to be provided to each user is acquired from the management apparatus 30.

[2-2-4. Information Management Processing]

Figure 10:
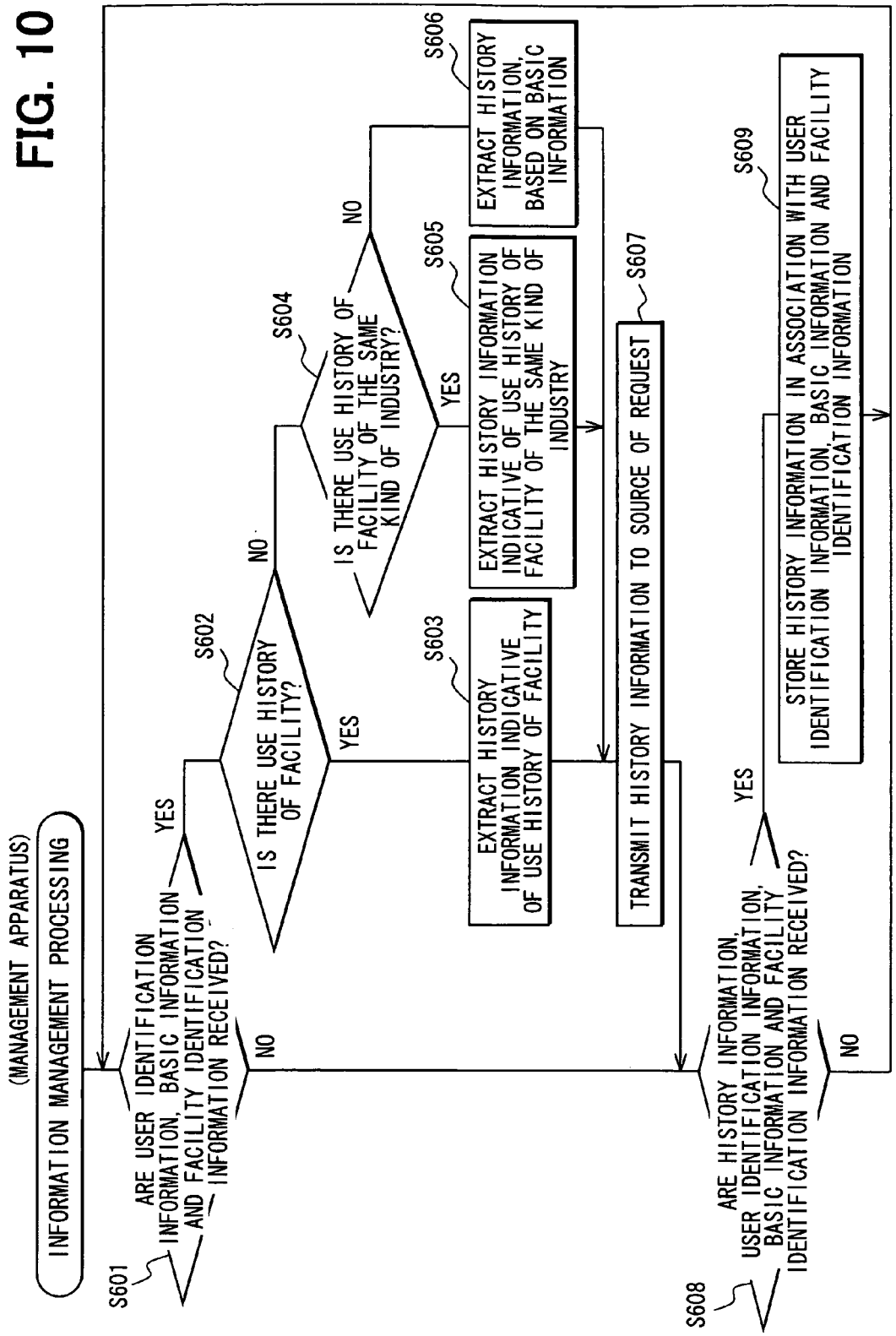
FIG. 10 is a flowchart of information management processing according to the second embodiment.

The information management processing executed by the controller 31 of the management apparatus 30 will next be explained using a flowchart shown in FIG. 10. The information management processing is started with the start-up of the management apparatus 30 (power-on) and conducted continuously until the operation of the management apparatus 30 is stopped (power is turned off).

When the information management processing is started, the controller 31 first determines at S601 whether each of user identification information, basic information and facility identification information is received as a history information send request that requests the transmission of the history information. The history information send request is transmitted by the facility-side apparatus 10 at S507 at the above-described user information display processing (FIG. 9).

When it is determined at S601 that the history information send request has been received, the information management processing proceeds to S602. It is determined at S602 whether the received user identification information (defined as "user identification information Y" for convenience of explanation) and the received facility identification information (defined as "facility identification information Y" for convenience of explanation) are stored in the history information database of the storage unit 32 in the form of being associated with each other. That is, it is determined whether a user (user Y) having user identification information Y utilized a facility (facility Y) of facility identification information Y in the past. When plural (N≥2) user identification information Y(1) through Y(N) are received, the determining process of S602 is performed on the user identification information Y(1) through Y(N). Therefore, processes of S603 through S606 are also performed on the user identification information Y(1) through Y(N).

When it is determined at S602 that the user identification information Y and the facility identification information Y have been stored in the history information database in the form of being associated with each other, the information management processing proceeds to S603. At S603, history information associated with both the user identification information Y and the facility identification information Y is extracted among the history information stored in the history information database and thereafter the information management processing proceeds to S607.

On the other hand, when it is determined at S602 that the user identification information Y and the facility identification information Y have not been stored in the history information database in the form of being associated with each other, the information management processing proceeds to S604. It is determined at S604 whether history information associated with the user identification information Y and associated with facility identification information of the same category, or the same business field (or industry), as the facility identification information Y is stored in the history information database. That is, it is determined whether a user Y has ever utilized a facility of the same business field as the field of the facility Y in the past.

When it is determined at S604 that the history information associated with the user identification information Y and associated with the facility identification information of the same kind of field as the facility identification information Y has been stored in the history information database, the information management processing proceeds to S605. At S605, the history information associated with the user identification information Y and associated with the facility identification information of the same kind of field as the facility identification information Y is extracted among the history information stored in the history information database. Thereafter, the information management processing proceeds to S607. That is, when the user Y has not utilized the facility Y in the past, the user Y extracts history information at the time that the user Y has utilized another facility of the same kind of field as the facility Y.

On the other hand, when it is determined at S604 that the history information associated with the user identification information Y and associated with the facility identification information of the same kind of field as the facility identification information Y has not, been stored in the history information database, the information management processing proceeds to S606. At S606, the corresponding history information associated with basic information identical or similar to the received basic information (defined as "basic information Y" for convenience of explanation) and associated with the facility identification information Y is extracted among the history information stored in the history information database. Then, the information management processing proceeds to S607. In the present embodiment, similar to the first embodiment (S310), basic information containing information identical or similar to specific information contained in the basic information Y will be defined as basic information similar to the basic information Y. That is, if the user Y has not utilized a facility of the same kind of field as the facility Y, history information about each user similar to the user Y is extracted.

At S607, the history information extracted from the history information database is transmitted to the corresponding facility-side apparatus 10 corresponding to a transmission source of the history information send request. Thereafter, the information management processing proceeds to S608. Thus, the facility-side apparatus 10 generates service selection information, based on the history information.

On the other hand, when it is determined at S601 that the history information send request has not been received, the information management processing proceeds to S608.

It is determined at S608 whether each of the history information, user identification information, basic information and facility identification information is received as the history information register request that requests the registration of the history information. The history information registration request is transmitted to the facility-side apparatus 10 at S403 at the above-described service history storage processing (FIG. 8).

When it is determined at S608 that the history information registration request has been received, the information management processing proceeds to S609, where the received history information is stored in the history information database of the storage unit 32 with being associated with each of the received user identification information, basic information and facility identification information. Then, the image management processing returns to S601.

That is, each time the provision of each user with the service is done at the facility, history information indicative of the contents of the service is added to the history information database in association with the user identification information and basic information of each user provided with the service and the facility identification information on the facility. As a result, the history information about the service provided in the past at each facility is stored in the history information database in a retrievable state, where the history information can be retrieved based on the information items of each user and the facility. The information item of the user includes the user identification information and the basic information of each user provided with the service, for example. The information item of the facility includes the facility identification information on the facility having provided the service.

On the other hand, when it is determined at S608 that the history information registration request has not been received, the information management processing returns to S601.

[2-3. Effects]

According to the information communication system of the second embodiment as described above, the following advantageous effects are obtained in addition to effects similar to the first embodiment.

(2F) The facility-side apparatus 10 acquires history information related to both (a) a user having visited a facility and (b) each facility provided for the facility-side apparatus 10 from the management apparatus 30. Therefore, the facility-side apparatus 10 needs not to store the history information of each user in advance and is capable of selecting suitable service corresponding to the individual user even with respect to each user who visits the facility for the first time.

(2G) When the history information of each user at the facility provided for the facility-side apparatus 10 exists, the facility-side apparatus 10 generates service selection information, based on the history information. It is therefore possible to select suitable service corresponding to both the user and the facility. When the history information of each user at the facility provided for the facility-side apparatus 10 does not exist, the facility-side apparatus 10 generates service selection information, based on history information at another facility of the same kind of business field as the facility. It is therefore possible to select service corresponding to each user visiting a facility for the first time even with respect to the user.

[2-4. Correspondence to Claims]

The controller 21 of the user-side apparatus 20 that executes the process of S104 at the information transmission processing (FIG. 2), corresponds to appearance information transmitting means in the information communication system according to the second embodiment.

The controller 11 of the facility-side apparatus 10 that executes the processes of S507 through S509 at the user information display processing (FIG. 9) corresponds to service information generating means. The controller 11 of the facility-side apparatus 10 that executes the process of S510 corresponds to output means (notifying means).

The controller 31 of the management apparatus 30 that executes the processes of S601 through S607 at the information management processing (FIG. 10) corresponds to history information returning means. For example, when the history information returning means receives from the facility-side apparatus the user identifying information item and a facility information item related to a facility, the history information returning means transmits one of the multiple history information items to the facility-side apparatus. In the above case, the above one of the multiple history information items is related to both (a) the user having the appearance characteristic identified based on the received user identifying information item and (b) the facility identified based on the received facility information item.

3. Third Embodiment

An information communication system according to a third embodiment of the present invention will next be explained.

[3-1. Overall Configuration]

Figure 11:
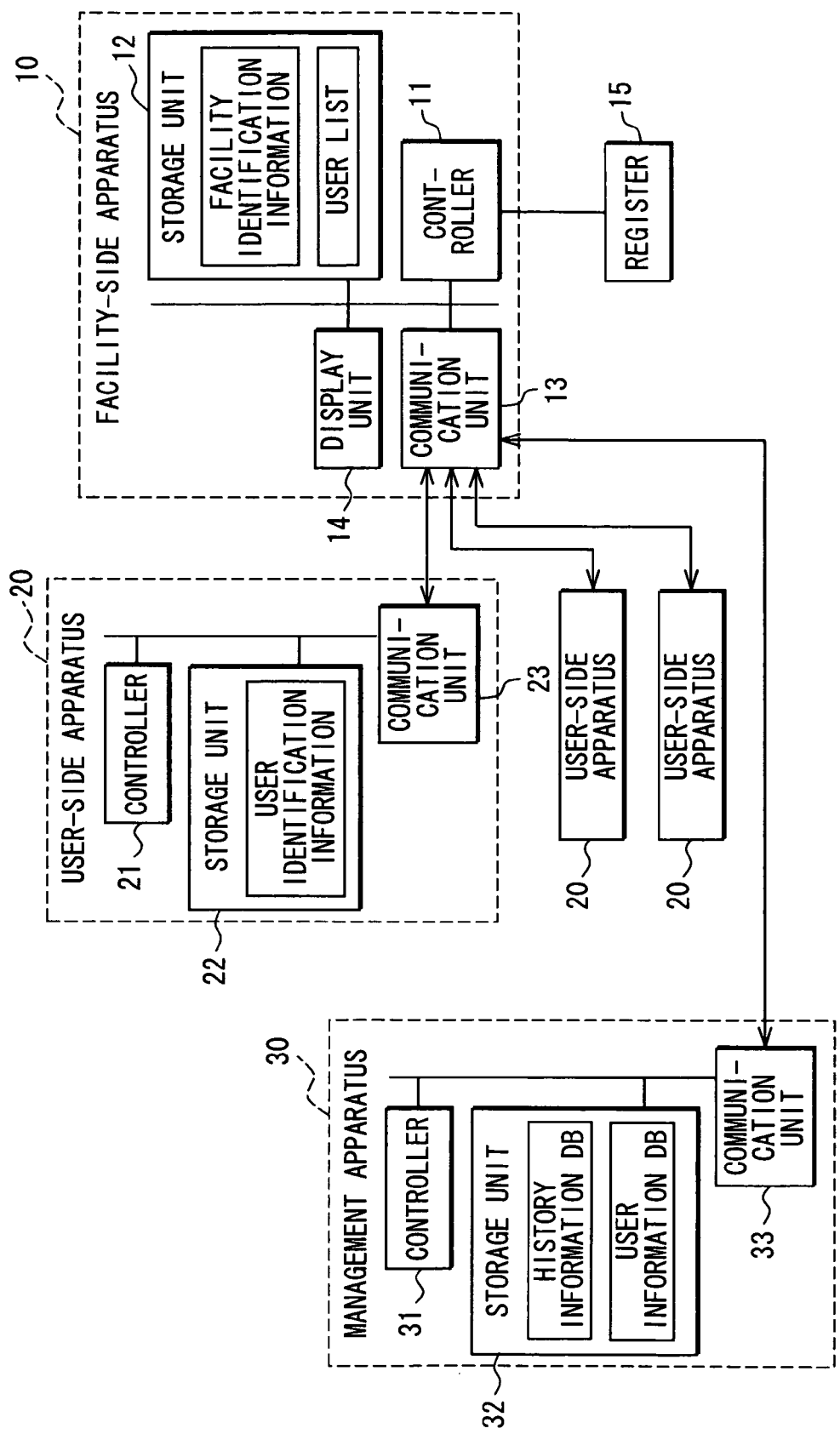
FIG. 11 is a block diagram showing a schematic configuration of an information communication system according to a third embodiment of the present invention.

FIG. 11 is a block diagram showing a schematic configuration of the information communication system according to the third embodiment.

As compared with the information communication system (FIG. 7) according to the second embodiment, the information communication system according to the third embodiment is different therefrom in that a management apparatus 30 is configured to manage not only history information about multiple users but also appearance information and basic information about the respective users.

That is, the appearance information and basic information have not been stored in a storage unit 22 of a user-side apparatus 20.

On the other hand, a user information database for registering the appearance information and basis information about the multiple users has been stored in a storage unit 32 of the management apparatus 30. The appearance information and basic information about the respective users are registered in the user information database in association with user identification information on the users. The appearance information and basic information about each user are retrievable based on the user identification information on the user.

Elements or portions different from those of the information communication system according to the second embodiment will be mainly explained below. The same reference numerals are used for common elements or portions, and their explanations are therefore omitted.

[3-2. Processing Executed by Information Communication System]

Processes executed by the apparatuses 10, 20 and 30 that constitute the information communication system according to the third embodiment will next be explained.

[3-2-1. Information Transmission Processing]

Figure 12:
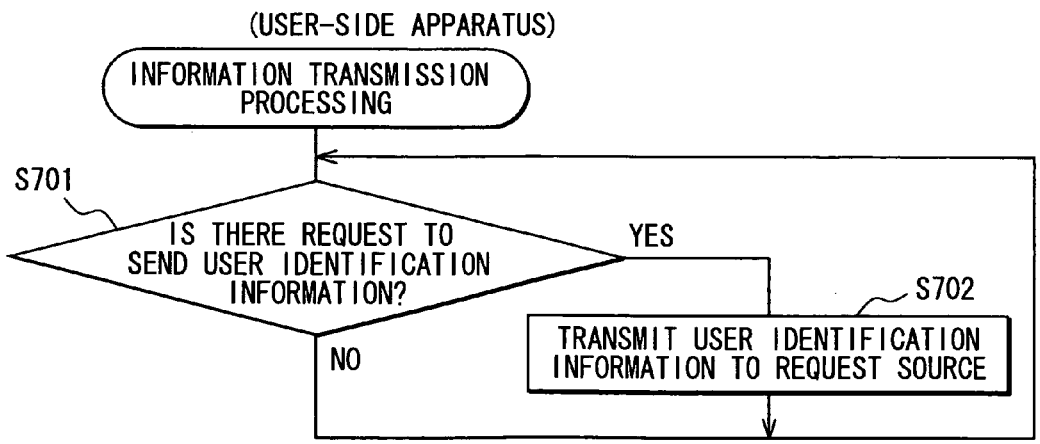
FIG. 12 is a flowchart of information transmission processing according to the third embodiment.

Information transmission processing executed by a controller 21 of a user-side apparatus 20 will first be explained using a flowchart shown in FIG. 12. As compared with the information transmission processing (FIG. 2) of the second embodiment, the information transmission processing of the third embodiment is different therefrom in that the processes of S103 and S104 are not conducted. Since the processing contents of S701 and S702 are identical to those of S101 and S102 in other respects, explanations of specific processing contents are omitted.

[3-2-2. Service History Storage Processing]

Since service history storage processing executed by a controller 11 of a facility-side apparatus 10 is identical to that (FIG. 8) of the second embodiment, its description is omitted.

[3-2-3. User Information Display Processing]

User information display processing executed by a controller 11 of a facility-side apparatus 10 will next be explained using a flowchart shown in FIG. 13. As compared with the user information display processing (FIG. 9) of the second embodiment, the user information display processing of the third embodiment is different therefrom in that processes of S804 and S805 are executed in place of the processes of S504, S505, S507 and S508. Since the processing contents of S801 through S803 and S806 through S808 are identical to those of S501 through S503, S506, S509 and S510 in other respects, the description of these processing contents is omitted.

At S804, user identification information of respective users stored in a user list, and facility identification information (facility identification information of a facility provided for the corresponding facility-side apparatus 10) stored in a storage unit 12 are transmitted to the management apparatus 30 as history information send requests. Consequently, history information used for selecting service to be provided to each user in the facility, and appearance information and basic information of each user are transmitted from the management apparatus 30 to the facility-side apparatus 10 (S908 at information management processing (FIG. 14) to be described later).

Subsequently, the appearance information, basic information and history information transmitted from the management apparatus 30 are received at S805. At subsequent processing, the appearance information and basic information received at S805 are stored in the user list (S806), and service selection information is generated at S807 based on the history information received at S805.

[3-2-4. Information Management Processing]

The information management processing executed by a controller 31 of the management apparatus 30 will next be explained using a flowchart shown in FIG. 14. As compared with the information management processing (FIG. 10) of the second embodiment, the information management processing is different therefrom in that processes of S901, S902 and S908 are executed in place of the processes of S601 and S607. Since the processing contents of S903 through S907, S909 and S910 are identical to those of S602 through S606, S608 and S609 in other respects, the description of these processing contents is omitted.

It is determined at S901 whether each of user identification information and facility identification information is received as a history information send request. That is, the present embodiment is different from the second embodiment in that no basic information is contained in the history information send request.

When it is determined at S901 that the history information send request has been received, the information management processing proceeds to S902. At S902, appearance information and basis information Y associated with the received user identification information Y are extracted among the information stored in the user information database. Then, the information management processing proceeds to S903. That is, appearance information and basic information Y of a user Y are identified or specified based on the user identification information Y received from the facility-side apparatus 10. When plural (N≥2) user identification information Y(1) through Y(N) are received, the process of S902 is performed on the user identification information Y(1) through Y(N).

At S908, the history information extracted from the history information database, and the appearance information and basic information extracted from the user information database at S902 are transmitted to the facility-side apparatus 10 corresponding to a transmission source of the history information send request. Thereafter, the information management processing proceeds to S909.

[3-3. Effects]

According to the information communication system of the third embodiment as described above, the following advantageous effects are obtained in addition to effects (except for (1D)) similar to the second embodiment.

(3D) The facility-side apparatus 10 acquires appearance information indicative of the appearance characteristics of each user having visited a facility, and basic information about the user from the management apparatus 30. With such a configuration, the facility-side apparatus 10 is not required to store in advance the appearance information and the basic information about each user that uses the facility. But still, the first-visiting user that visits the facility for the first time can be recognized or identified based on its appearance. Further, since the user-side apparatus 20 may store user identification information in place of the appearance information and the basic information and transmit it to the facility-side apparatus 10, the amount of information to be stored in the storage unit 22 and the amount of information to be transmitted to the facility-side apparatus 10 can be reduced.

[3-4. Correspondence to Claims]

The controller 21 of the user-side apparatus 20 that executes the process of S702 at the information transmission processing (FIG. 12), corresponds to appearance information transmitting means in the information communication system according to the third embodiment.

The controller 11 of the facility-side apparatus 10 that executes the processes of S804, S805 and S807 at the user information display processing (FIG. 13) corresponds to service information generating means. The controller 11 of the facility-side apparatus 10 that executes the process of S808 corresponds to output means (notifying means).

The controller 31 of the management apparatus 30 that executes the processes of S901 through S908 at the information management processing (FIG. 14) corresponds to history information returning means and appearance information returning means. For example, when the appearance information returning means receives the user identifying information item from the facility-side apparatus, the appearance information returning means transmits one of the appearance information items to the facility-side apparatus. In the above case, the above one of the appearance information items is identified based on the received user identifying information item.

4. Fourth Embodiment

An information communication system according to a fourth embodiment will next be explained.

[4-1. Overall Configuration]

Figure 15:
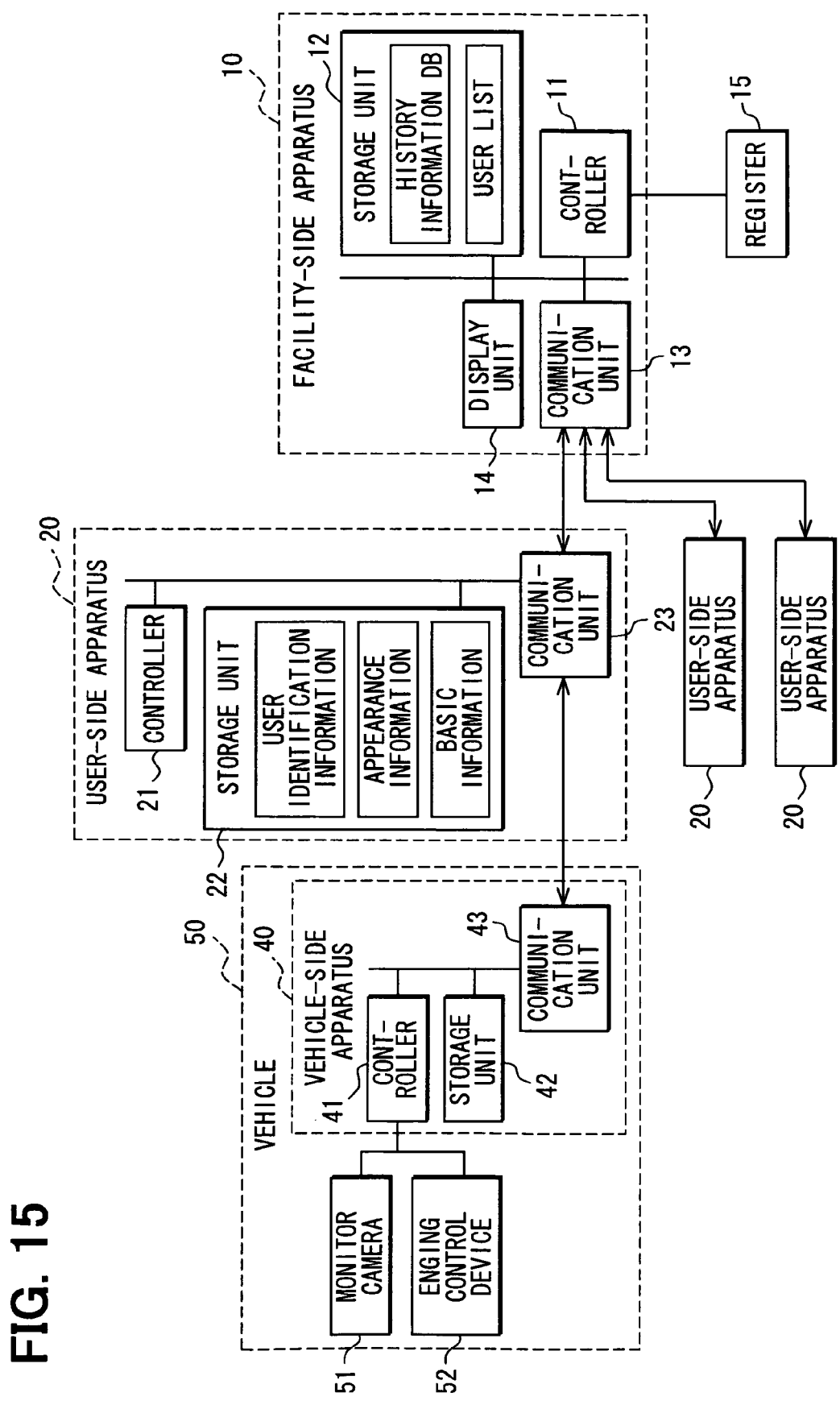
FIG. 15 is a block diagram showing a schematic configuration of an information communication system according to a fourth embodiment of the present invention.

FIG. 15 is a block diagram showing a schematic configuration of the information communication system according to the fourth embodiment.

As compared with the information communication system (FIG. 1) according to the first embodiment, the information communication system according to the fourth embodiment is different therefrom in that a vehicle-side apparatus 40 mounted to a vehicle 50 is further provided. Elements or portions different from those of the information communication system according to the first embodiment will be mainly explained below. The same reference numerals are used for common elements or portions, and their explanations are therefore omitted.

[4-1-1. Configuration of Vehicle-Side Apparatus]

The vehicle-side apparatus 40 includes a controller 41, a storage unit 42 and a communication unit 43.

The controller 41 is mainly constituted of a microcomputer including a CPU, a ROM, a RAM, etc. and executes various processes. The controller 41 is connected to be communicable with a monitor camera 51, an engine control device 52 and the like mounted to the vehicle 50.

Here, the monitor camera 51 is designed to capture the image of the face of a user who drives the vehicle 50. The monitor camera 51 can use or share a camera (capturing device) that is employed in other in-vehicle system, such as an inattention preventing device or the like.

The engine control device 52 is designed to execute control on an engine mounted to the vehicle 50. The engine control device 52 is configured to detect operating states like the start and stop of the engine, and notify the operating states to the vehicle-side apparatus 40 regularly.

The storage unit 42 is configured so as to be capable of storing various information items therein.

The communication unit 43 is designed to perform short-range wireless communications with a user-side apparatus 20. The communication unit 43 is capable of communicating with the user-side apparatus 20 that exists in a communication areas (short-range radio communication area) that covers a full range of the interior of the vehicle 50.

[4-1-2. Configuration of Facility-Side Apparatus]

A facility-side apparatus 10 employed in the information communication system according to the fourth embodiment is identical in configuration to the facility-side apparatus 10 of the first embodiment.

[4-1-3. Configuration of User-Side Apparatus]

In the information communication system according to the fourth embodiment, a communication unit 13 of the user-side apparatus 20 is configured so as to perform short-range wireless communications not only with the facility-side apparatus 10 but also with the vehicle-side apparatus 40.

[4-2. Processing Executed by Information Communication System]

Processing executed by each of the apparatuses 10, 20 and 40 that constitute the information communication system according to the fourth embodiment will next be explained.

[4-2-1. Appearance Information Updating Processing]

Figure 16:
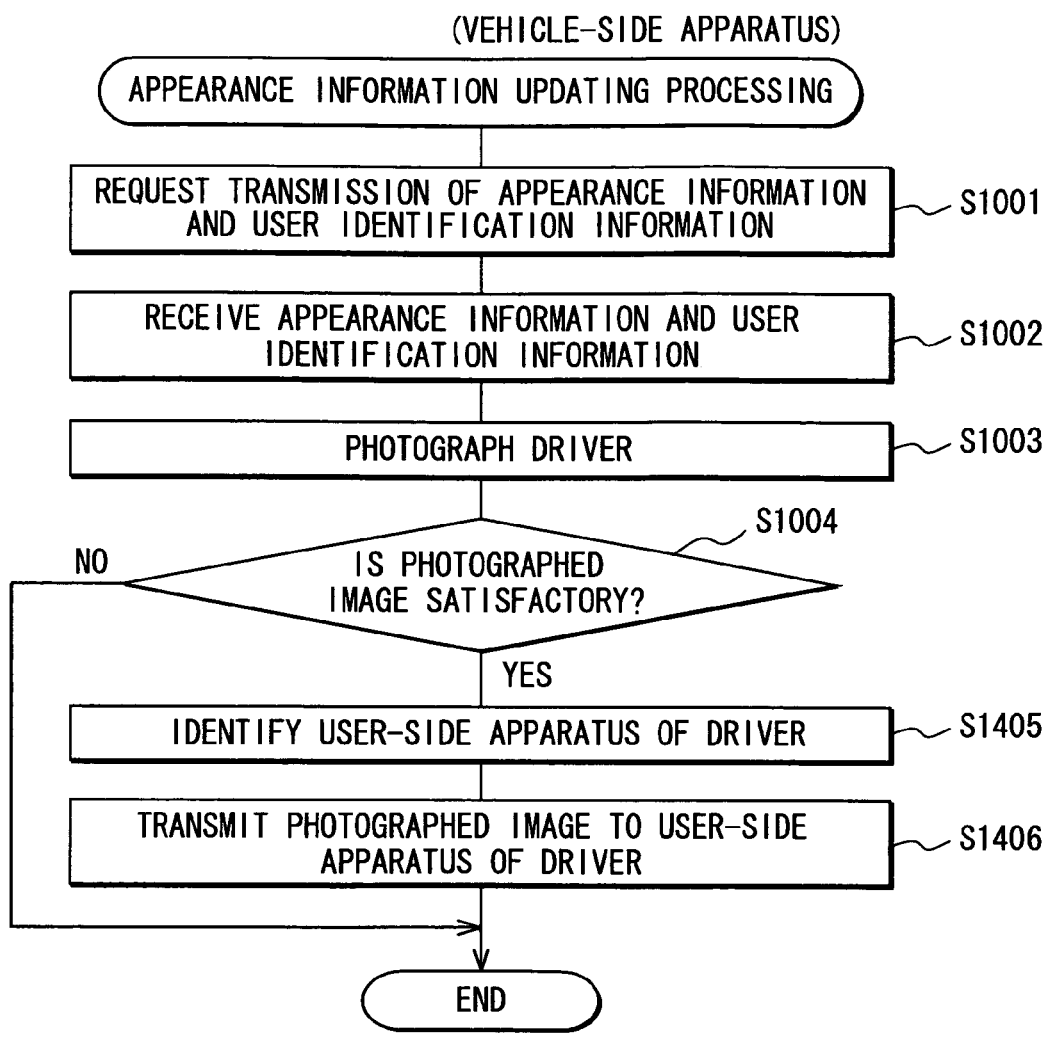
FIG. 16 is a flowchart of appearance information updating processing according to the fourth embodiment.

Appearance information updating processing executed by the controller 41 of the vehicle-side apparatus 40 will first be described using a flowchart shown in FIG. 16. The appearance information updating processing is started by detecting the start of the engine of the vehicle 50, based on notification from the engine control device 52.

When the appearance information updating processing is started, the controller 41 first transmits an appearance information send request to each user-side apparatus 20 in order to identify or specify a user corresponding to a driver of the vehicle 50 at S1001. The appearance information send request requests the transmission of the appearance information and the user identification information. Consequently, the appearance information and user identification information stored in the user-side apparatus 20 possessed by the user riding in the vehicle 50 are transmitted to the corresponding vehicle-side apparatus 40 (S1102 at information transmission processing (FIG. 17) to be described later). That is, the appearance information and user identification information transmitted from the user-side apparatus 20 are received as a response to the appearance information send request thereby to detect the user riding in the vehicle 50 and specify its appearance characteristics.

Subsequently, the appearance information and the user identification information transmitted by the user-side apparatus 20 are received at S1002.

At S1003 subsequent to the above, the image of the face of a user (driver) that exists in a driver seat is captured or the driver is may be photographed by the monitor camera 51.

Subsequently, it is determined at S1004 whether an image (face-shot image of driver) captured by the monitor camera 51 at S1003 is good or satisfactory. Described specifically, the image is determined to be not good if the face of the driver does not face frontward or if the amount of light for imaging falls short.

When it is determined at S1004 that the captured image is good, the appearance information updating processing proceeds to S1005. At S1005, the corresponding user-side apparatus 20 of the driver is identified or specified among the user-side apparatuses 20 (each corresponding to the user-side apparatus 20 of each user riding in the vehicle 50). Here, the user-side apparatus 20 corresponds to a source that sends the appearance information and the user information received at S1002. Described specifically, the appearance information received at S1002 and the image captured by the monitor camera 51 are compared by template matching thereby to identify or specify appearance information indicative of the user identical to the captured image. When the appearance information received at S1002 is one, the user-side apparatus 20 corresponding to the source to send the appearance information may be specified as one possessed by the driver without performing a comparison between the appearance information and the captured image.

Subsequently, at S1006, the image captured by the monitor camera 51 is transmitted to the user-side apparatus 20 of the driver identified at S1005, and the present appearance information updating processing is terminated. Consequently, the appearance information stored in the user-side apparatus 20 of the driver is updated to information indicative of the transmitted captured image (S1004 at information transmission processing (FIG. 17) to be described later). That is, each time a user rides in the corresponding vehicle as the driver of the vehicle 50, the appearance information stored in the corresponding user-side apparatus 20 is updated to the latest one.

[4-2-2. Information Transmission Processing]

Figure 17:
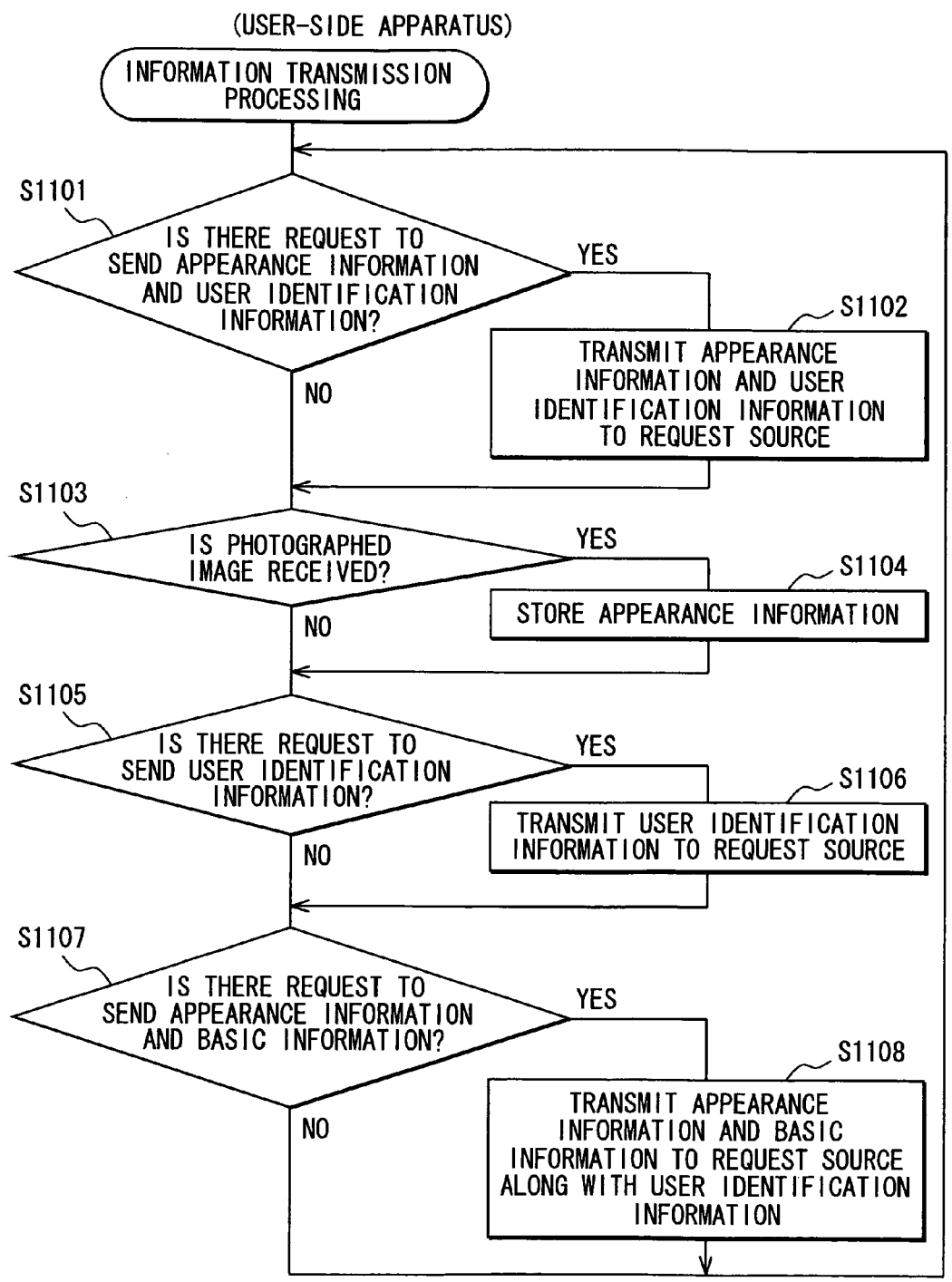
FIG. 17 is a flowchart of information transmission processing according to the fourth embodiment.

The information transmission processing executed by a controller 21 of each user-side apparatus 20 will next be explained using a flowchart shown in FIG. 17. As compared with the information transmission processing (FIG. 2) of the first embodiment, the information transmission processing of the fourth embodiment is different therefrom in that processes of S1101 through S1104 are executed. Since the processing contents of S1105 through S1108 are identical to those of S101 through S104 in other respects, the description of these processing contents is omitted.

It is determined at S1101 whether an appearance information send request is received. The appearance information send request corresponds to a request that requests the transmission of the appearance information and the user identification information. The appearance information send request is transmitted by the vehicle-side apparatus 40 at S1001 at the above-described appearance information updating processing (FIG. 16).

When it is determined at S1101 that the appearance information send request has been received, the information transmission processing proceeds to S1102. At S1102, the appearance information and user identification information (appearance information and basic information of each user having the corresponding user-side apparatus 20) stored in the storage unit 22 are transmitted to the vehicle-side apparatus 40. Then, the information transmission processing proceeds to S1103.

On the other hand, when it is determined at S1101 that the appearance information send request has not been received, the information transmission processing proceeds to S1103.

It is determined at S1103 whether a captured image of a driver is received. The captured image is transmitted by the vehicle-side apparatus 40 at S1006 at the aforementioned appearance information updating processing (FIG. 16).

When it is determined at S1103 that the captured image has been received, the information transmission processing proceeds to S1104. At S1104, the received captured image is stored in the storage unit 22 as appearance information (appearance information stored in the storage unit 22 is updated to information indicative of received face-shot image), and the information transmission processing proceeds to S1105.

On the other hand, when it is determined at S1103 that the captured image has not been received, the information transmission processing proceeds to S1105.

[4-2-3. Service History Storage Processing]

Since service history storage processing executed by a controller 11 of the facility-side apparatus 10 is identical to that (FIG. 3) of the first embodiment, its description is omitted.

[4-2-4. User Information Display Processing]

Since user information display processing executed by the controller 11 of the facility-side apparatus 10 is also identical to that (FIG. 4) of the first embodiment, its description is omitted.

[4-3. Effects]

According to the information communication system of the fourth embodiment as described above, the following advantageous effects are obtained in addition to effects similar to the first embodiment.

(4H) Since the image of the face of a user is captured at a vehicle and the appearance information stored in the user-side apparatus 20 is updated, it is possible to capture the image of the face without making the user conscious and maintain the face-shot image as the latest. It is also possible to employ the configuration of other in-vehicle system such as an inattention preventing device or the like.

[4-4. Correspondence to Claims]

The controller 21 of the user-side apparatus 20 that executes the process of S1108 at the information transmission processing (FIG. 17), corresponds to appearance information transmitting means in the information communication system according to the fourth embodiment.

The controller 11 of the facility-side apparatus 10 that executes the processes of S307 through S310 at the user information display processing (FIG. 4) corresponds to service information generating means. The controller 11 of the facility-side apparatus 10 that executes the process of S311 corresponds to output means (notifying means). The storage unit 12 of the facility-side apparatus 10 corresponds to history information storing means.

The controller 41 of the vehicle-side apparatus 40 that executes the processes of S1001 through S1006 at the appearance information updating processing (FIG. 16) corresponds to an updating device.

5. Fifth Embodiment

An information communication system according to a fifth embodiment of the present invention will next be explained. An overall configuration diagram for the information communication system of the fourth embodiment shown in FIG. 15 is used for description.

[5-1. Overall Configuration]

As compared with the information communication system according to the fourth embodiment, the information communication system according to the fifth embodiment is different therefrom in that a condition for updating appearance information stored in a user-side apparatus 20 varies. Elements or portions different from those of the information communication system according to the fourth embodiment will be mainly explained below. The same reference numerals are used for common elements or portions, and their explanations are therefore omitted.

[5-2. Processing Executed by Information Communication System]

Processing executed by each of the apparatuses 10, 20 and 40 that constitute the information communication system according to the fifth embodiment will next be explained.

[5-2-1. Appearance Information Updating Processing]

Figure 18:
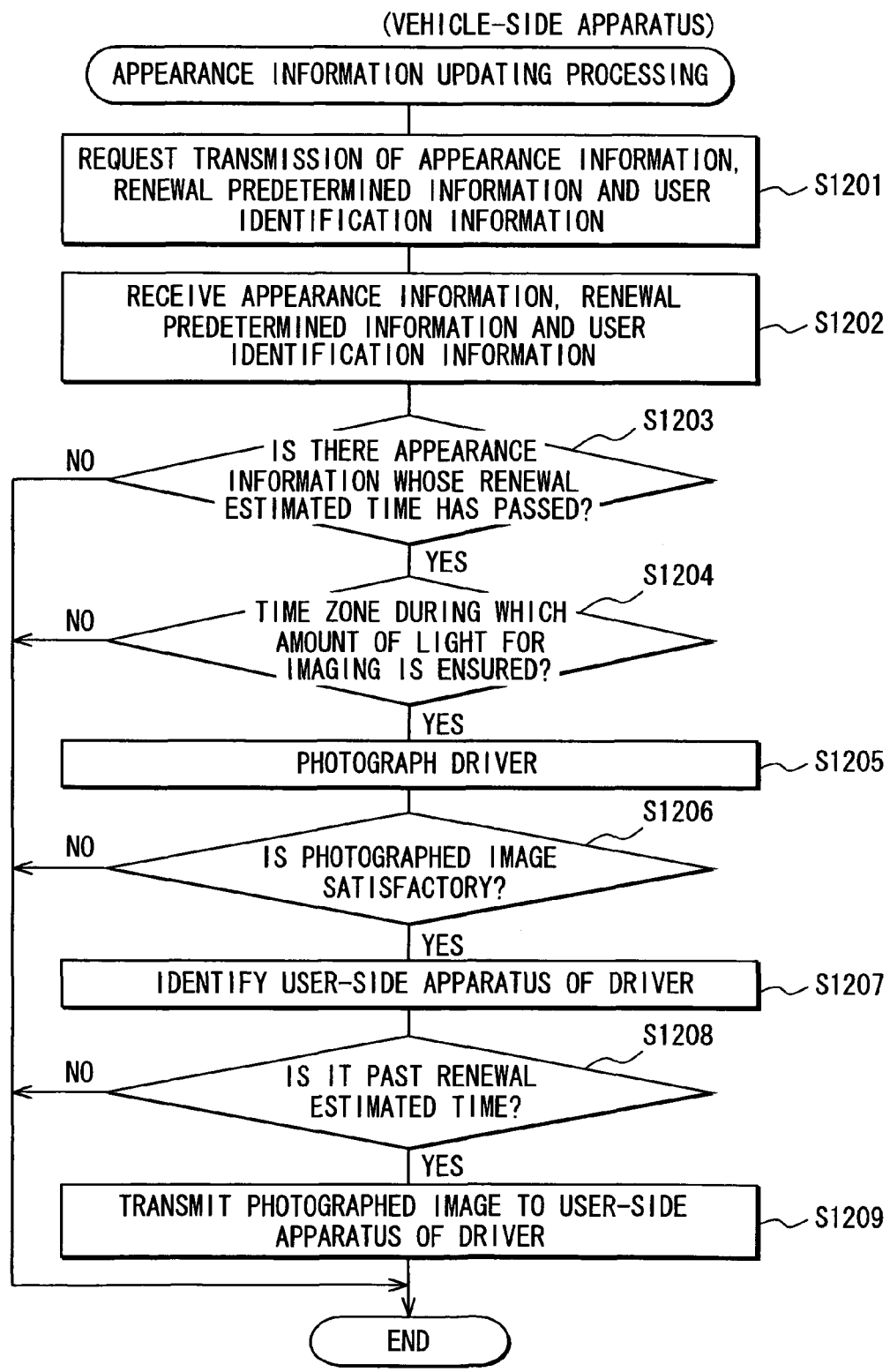
FIG. 18 is a flowchart of appearance information updating processing according to a fifth embodiment of the present invention.

Appearance information updating processing executed by a controller 41 of a vehicle-side apparatus 40 will first be described using a flowchart shown in FIG. 18. As compared with the appearance information updating processing (FIG. 16) of the fourth embodiment, the appearance information updating processing of the fifth embodiment is different therefrom in that processes of S1201 and S1202 and processes of S1203, S1204 and S1208 are executed in place of the processes of S1001 and S1002. Since the processing contents of S1205 through S1207 and S1209 are identical to those of S1003 through S1006 in other respects, the description of these processing contents is omitted.

At S1201, an appearance information send request corresponding to a request to send appearance information, renewal plan information and user identification information relative to each user-side apparatus 20 is transmitted to identify or specify a user corresponding to a driver of a vehicle 50. Consequently, the appearance information, renewal plan information and user identification information stored in the user-side apparatus 20 possessed by each user riding in the vehicle 50 are transmitted to the corresponding vehicle-side apparatus 40 (S1302 at information transmission processing (FIG. 19) to be described later). Here, the renewal plan information is of information indicative of the estimated time set to update the appearance information and is calculated at the user-side apparatus 20. That is, the appearance information, renewal plan information and user identification information transmitted from the user-side apparatus 20 are received as a response to the appearance information send request thereby to detect the user riding in the vehicle 50 and specify its appearance characteristics and the renewal predetermined time.

Subsequently, the appearance information, renewal plan information and user identification information transmitted by the user-side apparatus 20 are received at S1202. That is, the present embodiment is different from the fourth embodiment in that the renewal plan information is acquired.

At S1203 subsequent to above, it is determined based on the renewal plan information whether any one of the appearance information received at S1202 has been expired relative to the renewal estimated time. In other words, it is determined whether there exists any appearance information item among the appearance information items received at S1202, which information item needs to be updated or renewed.

When it is determined at S1203 that the above appearance information item does not exist, the present appearance information updating processing is ended.

On the other hand, when it is determined at S1203 that the above appearance information item exists, the appearance information updating processing proceeds to S1204, where a decision is made as to whether it reaches a time zone (from 8 a.m. to 16 p.m., for example) during which the amount of light for imaging is ensured, based on the present time.

When it is determined at S1204 that the time zone during which the amount of light for imaging is ensured has not been reached, the present appearance information updating processing is terminated.

On the other hand, when it is determined at S1204 that the time zone has been reached, the appearance information updating processing proceeds to S1205, where the image of a driver is captured.

It is determined at S1208 whether the appearance information received from the corresponding user-side apparatus 20 of the driver specified at S1207 corresponds to one whose renewal estimated time has passed. In other words, it is determined whether the appearance information received from the corresponding user-side apparatus 20 of the driver specified at S1207 is expired relative to the renewal estimated time.

When it is determined at S1208 that the appearance information does not correspond to the one whose renewal estimated time has passed, the present appearance information updating processing is terminated.

On the other hand, when it is determined at S1208 that the appearance information corresponds to the one whose renewal estimated time has passed, the appearance information updating processing proceeds to S1209, where an image captured by a monitor camera 15 is transmitted to the corresponding user-side apparatus 20 of the driver specified at S1207, and the present appearance information updating processing is terminated. Thus, the appearance information stored in the user-side apparatus 20 of the driver is updated to the corresponding information indicative of the transmitted captured image (S1305 at information transmission processing (FIG. 19) to be described later).

[5-2-2. Information Transmission Processing]

Figure 19:
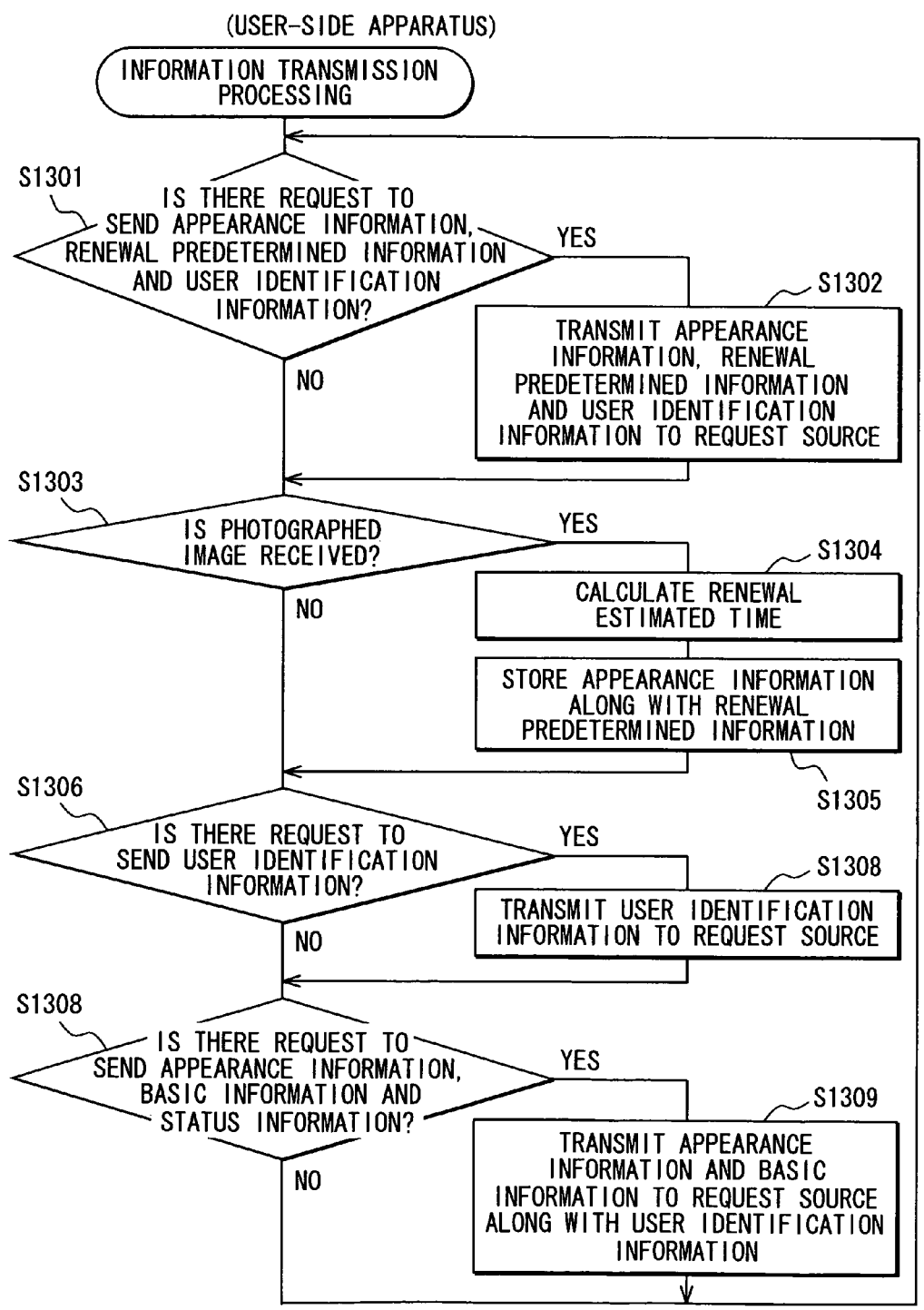
FIG. 19 is a flowchart of information transmission processing according to the fifth embodiment.

The information transmission processing executed by a controller 21 of each user-side apparatus 20 will next be described using a flowchart shown in FIG. 19. As compared with the information transmission processing (FIG. 17) of the fourth embodiment, the information transmission processing of the fifth embodiment is different therefrom in that processes of S1301, S1302 and S1305 are executed in place of the processes of S1101, S1102 and S1104 and in that and a process of S1304 is further executed. Since the processing contents of S1103 and S1105 through S1108 are identical to those of S1303 and S1306 through S1309 in other respects, the description of these processing contents is omitted.

It is determined at S1301 whether an appearance information send request is received. The appearance information send request requests the transmission of the appearance information, the renewal plan information and the user identification information. The appearance information send request is transmitted by the vehicle-side apparatus 40 at S1201 at the above-described appearance information updating processing (FIG. 18).

When it is determined at S1301 that the appearance information send request has been received, the information transmission processing proceeds to S1302. At S1302, the appearance information, renewal plan information and user identification information stored in the storage unit 22 are transmitted to the vehicle-side apparatus 40. Then, the information transmission processing proceeds to S1303. The renewal plan information is calculated by the process of S1304 to be described later and stored in the storage unit 22 by the process of S1305.

When it is determined at S1303 that the captured image has been received, the information transmission processing proceeds to S1304, where the renewal estimated time, which is the timing for updating the appearance information, is calculated. Described specifically, the time after a predetermined period of time from the present time is calculated as the renewal estimated time. Here, the predetermined period of time varies depending upon the age of each user. In the present embodiment, the predetermined period of time is fixed to a period (e.g., three years when the age is less than 30 years old and five years when the age is greater than or equal to 30 years old) shorter as the age of the user gets younger. The age of each user is identified from the basic information.

Subsequently, at S1305, the received captured image is stored in the storage unit 22 as its corresponding appearance information (the appearance information stored in the storage unit 22 is updated to the corresponding information indicative of each received face-shot image). Further, the renewal plan information indicative of the renewal estimated time calculated at S1304 is stored in association with the appearance information. Thereafter, the information transmission processing proceeds to S1306.

[5-2-3. Service History Storage Processing]

Since service history storage processing executed by a controller 11 of the facility-side apparatus 10 is identical to that (FIG. 3) of the fourth embodiment, its description is omitted.

[5-3. Effects]

According to the information communication system of the fifth embodiment as described above, the following advantageous effects are obtained in addition to effects similar to the fourth embodiment.

(5I) Since the renewal of the face-shot image is performed after the elapse of the predetermined period from the previous timing of capturing the image, and the period is set shorter as the age of each user gets younger in particular, it is possible to perform the renewal of the image suitably. Because the image is captured only if a time zone during which the amount of light for imaging is ensured is reached, it is possible to make it hard to cause needless image capturing.

[5-4. Correspondence to Claims]

The controller 21 of the user-side apparatus 20 that executes the process of S1309 at the information transmission processing (FIG. 19), corresponds to appearance information transmitting means in the information communication system according to the fifth embodiment.

The controller 11 of the facility-side apparatus 10 that executes the processes of S307 through S310 at the user information display processing (FIG. 4) corresponds to service information generating means. The controller 11 of the facility-side apparatus 10 that executes the process of S311 corresponds to output means (notifying means). The storage unit 12 of the facility-side apparatus 10 corresponds to history information storing means.

The controller 41 of the vehicle-side apparatus 40 that executes the processes of S1201 through S1209 at the appearance information updating processing (FIG. 18) corresponds to an updating device.

6. Sixth Embodiment

Figure 20:
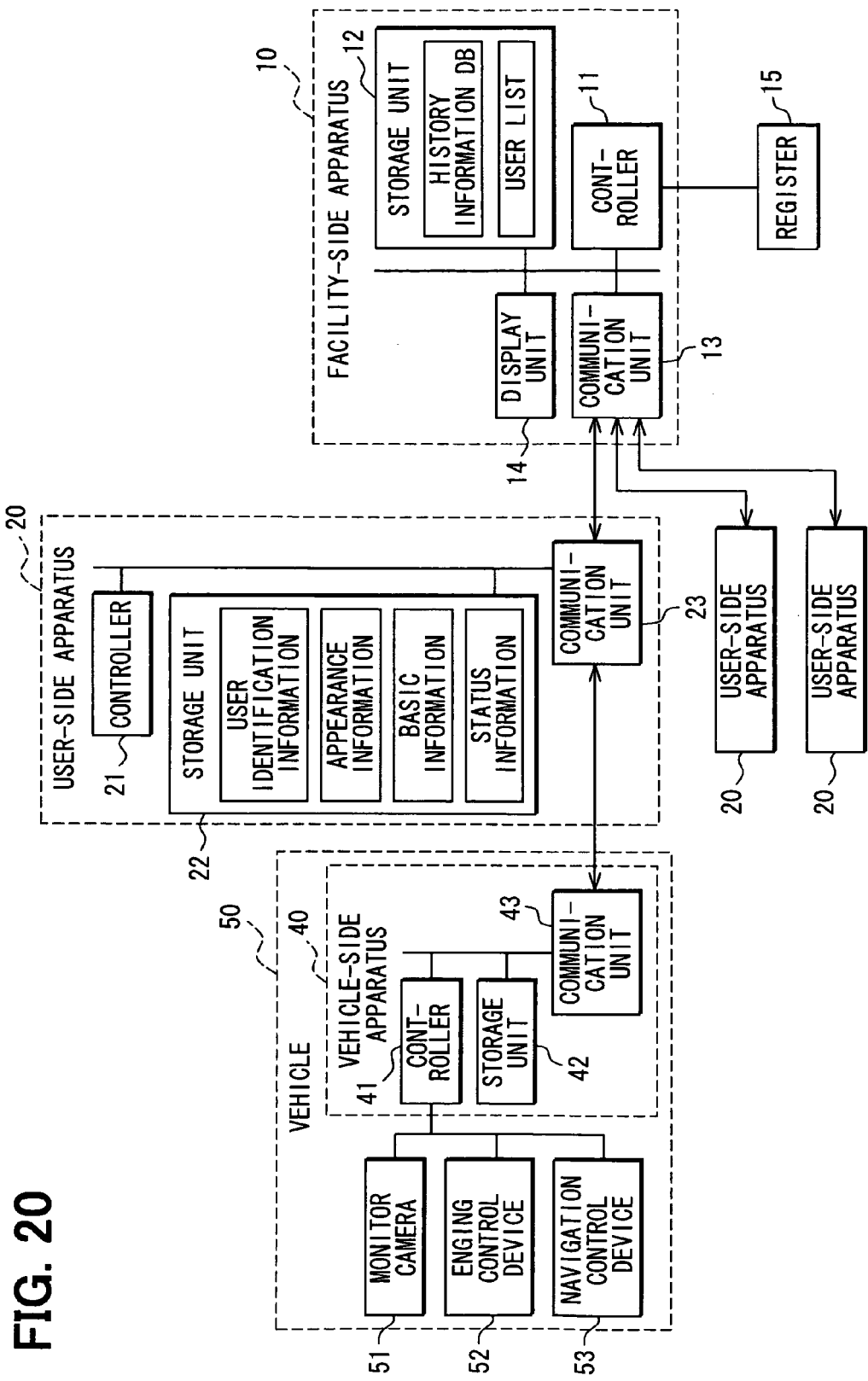
FIG. 20 is a block diagram showing a schematic configuration of an information communication system according to a sixth embodiment of the present invention.

An information communication system according to a sixth embodiment will next be explained.
[6-1. Overall Configuration]
FIG. 20 is a block diagram showing a schematic configuration of the information communication system according to the sixth embodiment.

As compared with the information communication system according to the fourth embodiment, the information communication system according to the sixth embodiment is different therefrom in that in addition to fixed information (user identification information and basic information) related to each user, status information indicative of a state (state accompanied with a timing variation) at that time, of each user is added to generate service selection information. Elements or portions different from those of the information communication system according to the fourth embodiment will be mainly explained below. The same reference numerals are used for common elements or portions, and their explanations are therefore omitted.
[6-1-1. Configuration of Vehicle-Side Apparatus]
In the information communication system according to the sixth embodiment, the controller 41 of the vehicle-side apparatus 40 is connected so as to be communicable with a navigation control device 53 in addition to the monitor camera 51 and engine control device 52 mounted to the vehicle 50.

Here, the navigation control device 53 is designed to perform a route guidance from the present location to the destination location and the like. The navigation control device 53 is configured to monitor a continuous driving time of the vehicle 50, a driving route along which the vehicle 50 has been driven, a facility at which the vehicle stops, and the like and to notify these information items in response to a request issued from the vehicle-side apparatus 40.
[6-1-2. Configuration of Facility-Side Apparatus]
A facility-side apparatus 10 employed in the information communication system according to the sixth embodiment is identical in configuration to the facility-side apparatus 10 of the first embodiment except for the contents (to be described later) of processing executed by a controller 11.
[6-1-3. Configuration of User-Side Apparatus]
In the information communication system according to the sixth embodiment, the storage unit 22 of the user-side apparatus 20 stores status information indicative of a current state of each user associated with the user-side apparatus 20, in addition to the user identification information, the appearance information, and the basic information.
[6-2. Processing Executed by Information Communication System]
Processing executed by each of the apparatuses 10, 20 and 40 that constitute the information communication system according to the sixth embodiment will next be explained.

[6-2-1. Appearance Information Updating Processing]
Appearance information updating processing executed by the controller 41 of the vehicle-side apparatus 40 will first be explained using a flowchart shown in FIG. 21. As compared with the appearance information updating processing (FIG. 16) of the fourth embodiment, the appearance information updating processing of the sixth embodiment is different therefrom in that processes of S1407 through S1409 are executed. Since the processing contents of S1401 through S1406 are identical to those of S1001 through S1006 in other respects, the description of these processing contents are omitted.

At S1406, a captured image is transmitted to a user-side apparatus 20 of a driver and the appearance information updating processing proceeds to S1407, where a standby state is kept until the user (the driver) is detected to be getting out of the vehicle. When it is determined that the getting-out of the driver has been detected, the appearance information updating processing proceeds to S1408. In the present embodiment, it is determined that when the stop of engine in the vehicle 50 is detected based on notification from the engine control device 52, the user getting out is detected.

At S1408, the state of each user that exists in a driver seat is detected. In the present embodiment, a request for information on a continuous driving time of the vehicle 50 is made to the navigation control device 53. The information (information about the driving time) notified with respect to this request is detected as a state indicative of the degree of fatigue of the user.

Figure 22:
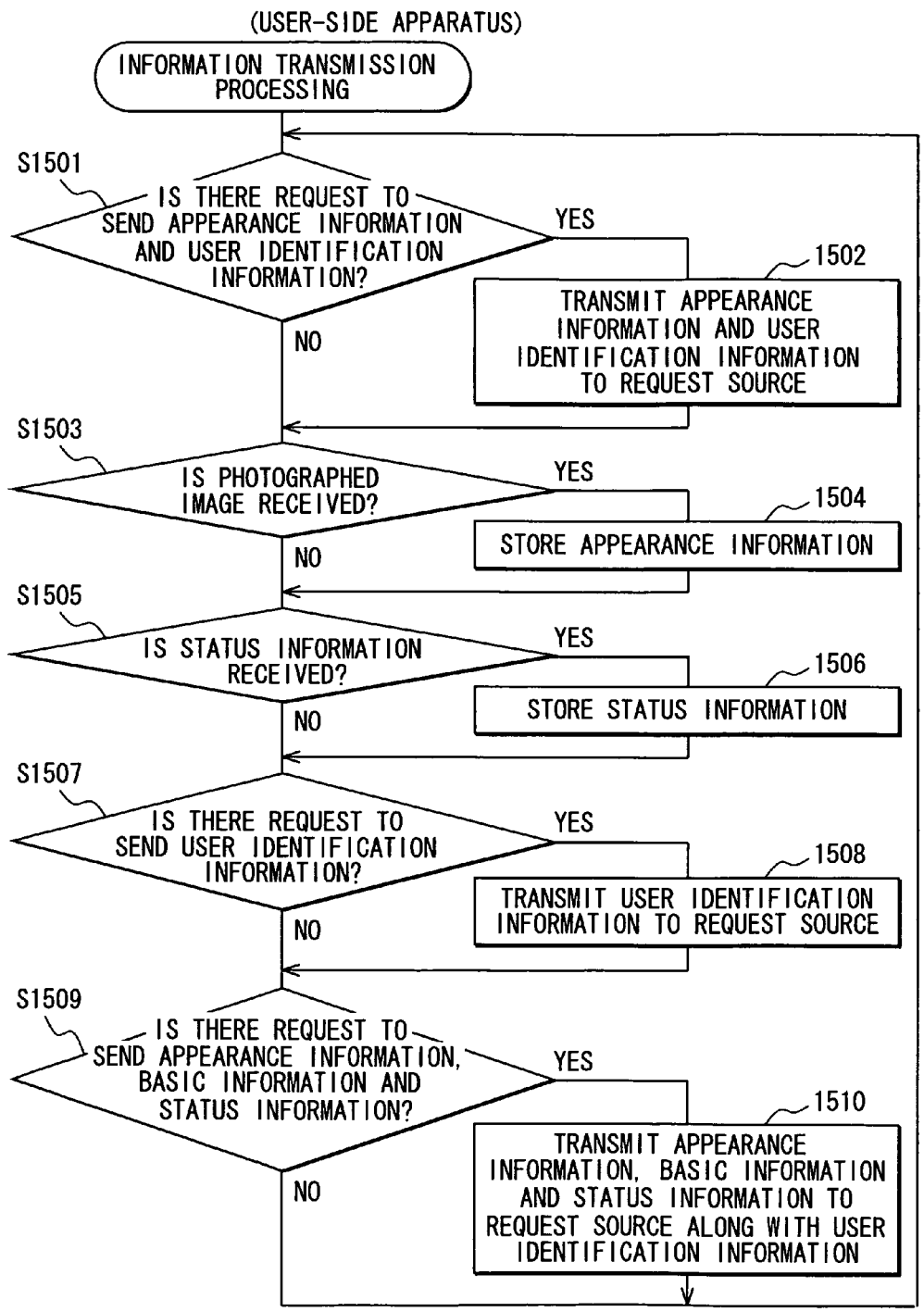
FIG. 22 is a flowchart of information transmission processing according to the sixth embodiment.

Subsequently, at S1409, status information indicative of the user's state detected at S1408 is transmitted to the user-side apparatus 20 of the driver, and the present appearance information updating processing is terminated.
[6-2-2. Information Transmission Processing]
Information transmission processing executed by a controller 21 of the user-side apparatus 20 will next be explained using a flowchart shown in FIG. 22. As compared with the information transmission processing (FIG. 17) of the fourth embodiment, the information transmission processing of the sixth embodiment is different therefrom in that processes of S1505 and S1506 are performed and processes of S1509 and S1510 are performed in place of the processes of S1107 and S1108. Since the processing contents of S1501 through S1504, S1507 and S1508 are identical to those of S1101 through S1106 in other respects, the description of specific processing contents is omitted.

Figure 21:
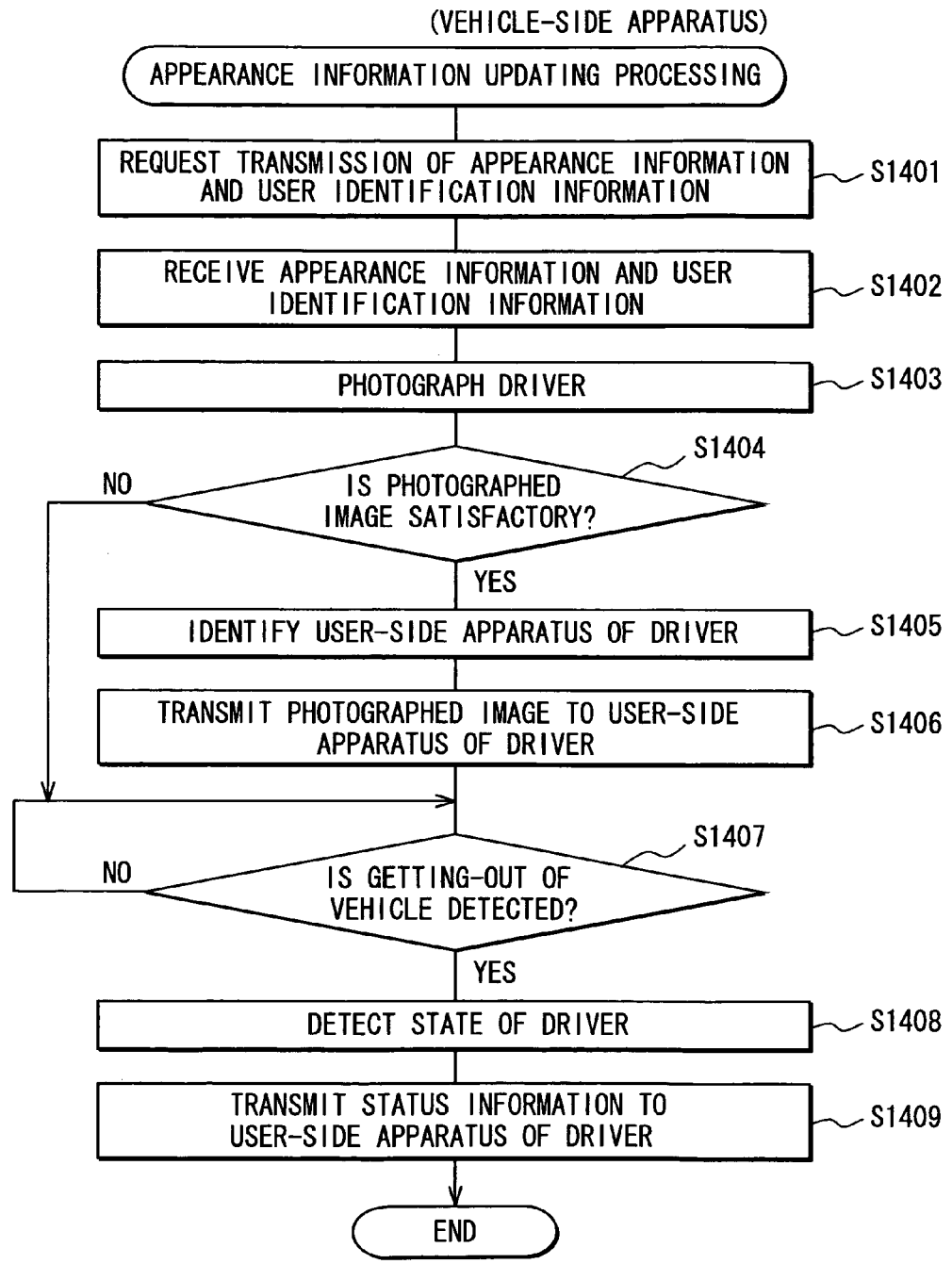
FIG. 21 is a flowchart of appearance information updating processing according to the sixth embodiment.

It is determined at S1505 whether the status information is received. The status information is transmitted by the corresponding vehicle-side apparatus 40 at S1408 at the above-described appearance information updating processing (FIG. 21). That is, the status information is received in response to the stopping of the engine after the user associated with the user-side apparatus 20 has driven the vehicle 50.

When it is determined at S1505 that the status information has been received, the information transmission processing proceeds to S1506. At S1506, the received status information is stored in the corresponding storage unit 22, and the information transmission processing proceeds to S1507. In other words, the status information stored in the storage unit 22 is updated to the contents of the received status information at S1506.

On the other hand, when it is determined at S1505 that the status information has not been received, the information transmission processing proceeds to S1507.

It is determined at S1509 whether a user information send request is received. The user information send request requests the transmission of the appearance information, the basic information, and the status information. Here, the user information send request is transmitted from the facility-side apparatus 10 to the user-side apparatus 20 whose existence is detected at a facility by the facility-side apparatus 10 as will be described later.

When it is determined at S1509 that the user information send request has been received, the information transmission processing proceeds to S1510. At S1510, the appearance information, basic information and status information stored in the storage unit 22 are transmitted to the facility-side apparatus 10 together with the user identification information. Here, the status information includes the appearance information, the basic information, and the status information of each user associated with the user-side apparatus 20, for example. Thereafter, the information transmission processing returns to S1501.

On the other hand, when it is determined at S1509 that the user information send request has not been received, the information transmission processing returns to S1501.

[6-2-3. Service History Storage Processing]

Figure 23:
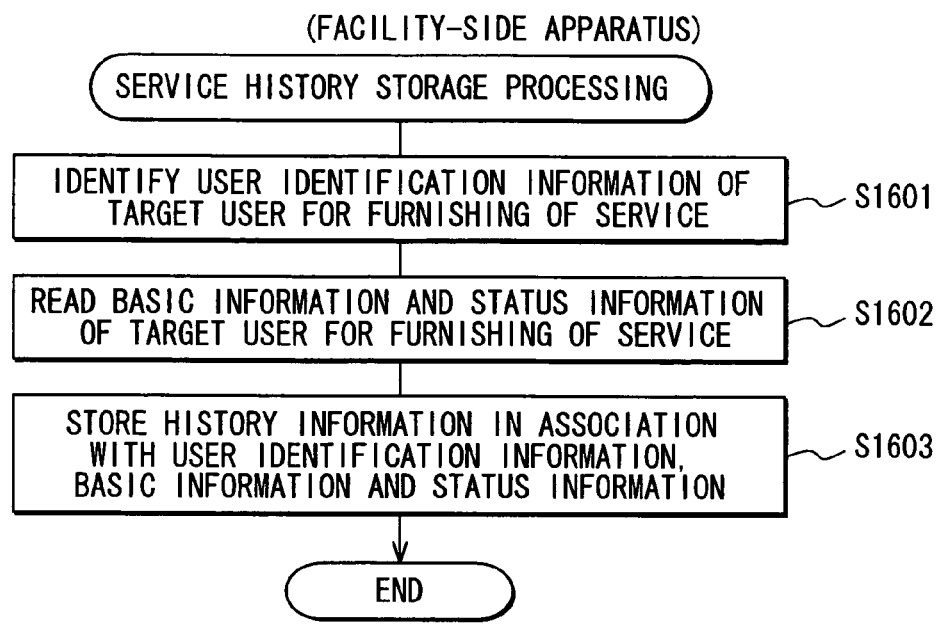
FIG. 23 is a flowchart of service history storage processing according to the sixth embodiment.

Service information storage processing executed by a controller 11 of a corresponding facility-side apparatus 10 will next be explained using a flowchart shown in FIG. 23. As compared with the service history storage processing (FIG. 3) of the fourth embodiment, the service history storage processing of the sixth embodiment is different therefrom in that processes of S1602 and S1603 are executed in place of the processes of S202 and S203. Since the processing contents of S1601 are identical to those of S201 in other respects, the description of the processing contents is omitted.

Basic information and status information (basic information and status information of each user provided with the service) stored in a user list in association with the user identification information specified at S1601 are read at S1602. That is, as will be described later, the user identification information, appearance information, basic information and status information are stored in association with one another as information of each user visiting a facility, and at S1602, the basic information item and the status information item of the user provided with the service are identified or specified among the other information items.

Subsequently, at S1603, history information received from a register 15 is stored in a history information database of a storage unit 12 in association with the user identification information, basic information and status information of each user provided with the service. Thereafter, the present service history storage processing is finished.

That is, the present service history storage processing is different from that of the fourth embodiment in that the history information is associated with the status information. As a result, the history information about the service provided in the past at the facility provided for the corresponding facility-side apparatus 10 is stored in the history information database in a retrievable state, where the history information is retrieved based on the information (user identification information, basic information and status information) of each user provided with the service.

[6-2-4. User Information Display Processing]

Figure 24:
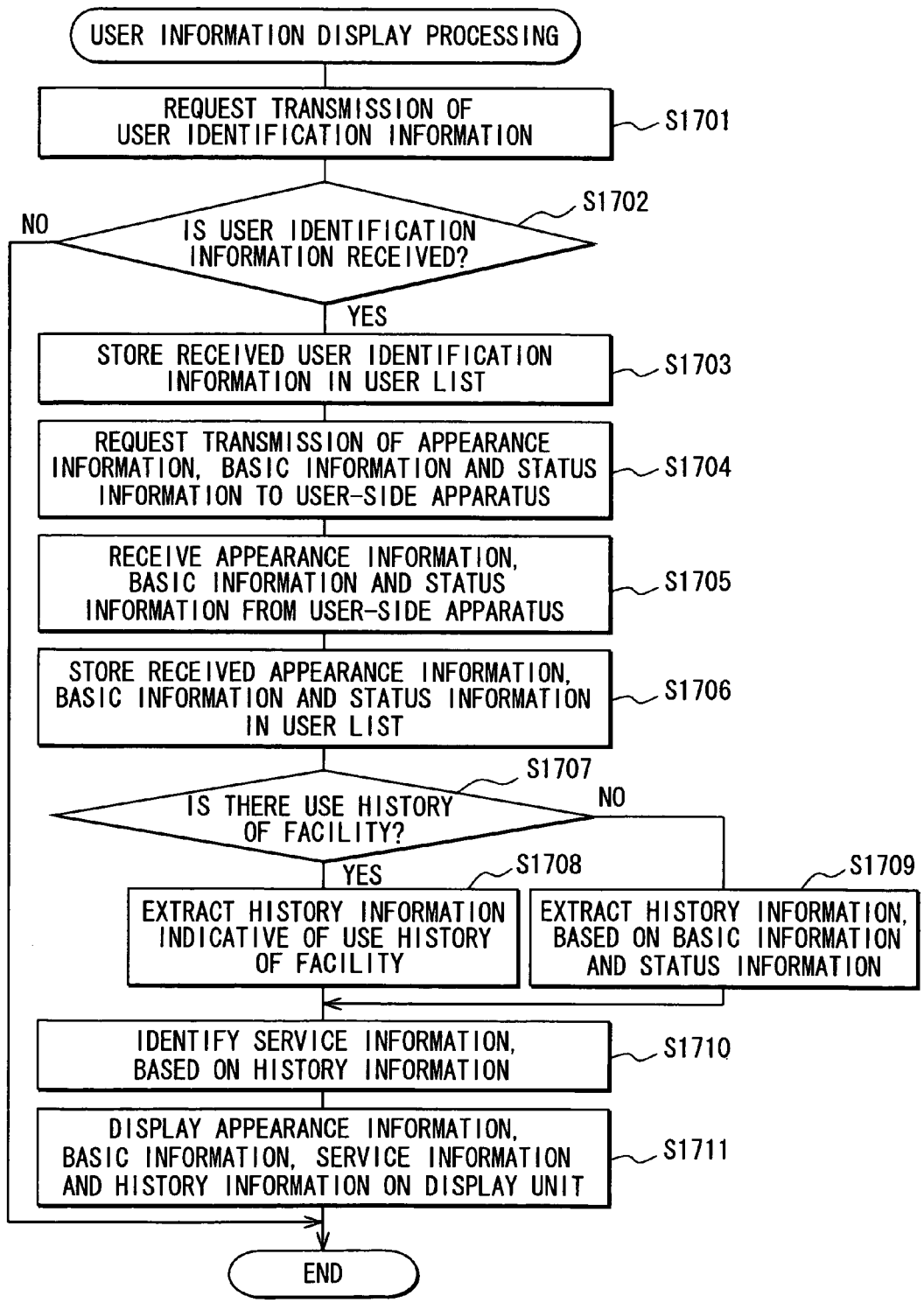
FIG. 24 is a flowchart of user information display processing according to the sixth embodiment.

User information display processing executed by the controller 11 of the facility-side apparatus 10 will next be explained using a flowchart shown in FIG. 24. As compared with the user information display processing (FIG. 4) of the fourth embodiment, the user information display processing of the sixth embodiment is different therefrom in that processes of S1704 through S1706 and S1709 are performed in place of the processes of S304 through S306 and S309. Since the processing contents of S1701 through S1703, S1707, S1708, S1710 and S1711 are identical to those of S301 through S303, S307, S308, S310 and S311 in other respects, the description of these processing contents is omitted.

At S1704, a user information send request corresponding to a request to send appearance information, basic information and status information is transmitted to the corresponding user-side apparatus 20 (user-side apparatus 20 of each user in the facility) corresponding to a transmission source of the user identification information stored in the user list. Consequently, the appearance information, basic information and status information stored in the user-side apparatus 20 possessed by each user in the facility are transmitted to the corresponding facility-side apparatus 10 together with the user identification information (S1510 at the aforementioned information transmission processing (FIG. 22)). If the multiple user identification information items are stored in the corresponding user list, a user information send request is transmitted to each corresponding user-side apparatus 20 of all user-side apparatuses 20 existing in the facility.

Subsequently, the appearance information, basic information, status information and user identification information transmitted from each user-side apparatus 20 are received at S1705.

At S1706 subsequent to above, the appearance information, basic information and status information received at S1705 are stored in the user list. Here, since the user identification information of each user in the facility has already been stored in the user list, the appearance information, basic information and status information are stored in association with the user identification information. As a result, the user identification information, appearance information, basic information and status information are stored in association with one another as the information about each user in the facility.

That is, the processes of S1704 through S1706 are different from those of S304 through S306 in that the transmission of status information is requested by the user information send request and the status information is received and stored in the user list.

At S1709, the corresponding history information associated with basic information identical or similar to basic information X corresponding to user identification information X and associated with status information identical or similar to status information X corresponding to the user identification information X is extracted. Then, the user information display processing proceeds to S1710. In the present embodiment, basic information containing information identical or similar to specific information contained in the basic information X will be defined as basic information similar to the basic information X in a manner similar to the first embodiment (S310). Status information indicating a driving time value in a range of two hours more or less than the reference driving time indicated by the status information X may be defined as similar status information similar to the status information X. That is, when the history information of each user does not exist, the corresponding history information of the user similar to that user, which is similar to a user's state at the present time, is extracted.

[6-3. Effects]

According to the information communication system of the sixth embodiment as described above, the following advantageous effects are obtained in addition to effects similar to the fourth embodiment.

(6J) Since the service selection information is generated based on the status information indicative of the state of each user, the service to be provided to the user can be selected more suitably. Since the state of each user is detected at the vehicle 50 in particular, the state of the user can be detected without making the user conscious.

[6-4. Correspondence to Claims]

The controller 21 of the user-side apparatus 20 that executes the process of S1510 at the information transmission processing (FIG. 22), corresponds to appearance information transmitting means in the information communication system according to the sixth embodiment.

The controller 11 of the facility-side apparatus 10 that executes the processes of S1707 through S1710 at the user information display processing (FIG. 24) corresponds to service information generating means. The controller 11 of the facility-side apparatus 10 that executes the process of S1711 corresponds to output means (notifying means). The storage unit 12 of the facility-side apparatus 10 corresponds to history information storing means.

The controller 41 of the vehicle-side apparatus 40 that executes the processes of S1401 through S1406 at the appearance information updating processing (FIG. 21) corresponds to an updating device. The controller 41 of the vehicle-side apparatus 40 that executes the processes of S1407 through S1409 corresponds to status detecting means, and the controller 41 that executes the process of S1409 corresponds to status information transmitting means.

7. Seventh Embodiment

An information communication system according to a seventh embodiment will next be explained.

[7-1. Overall Configuration]

Figure 25:
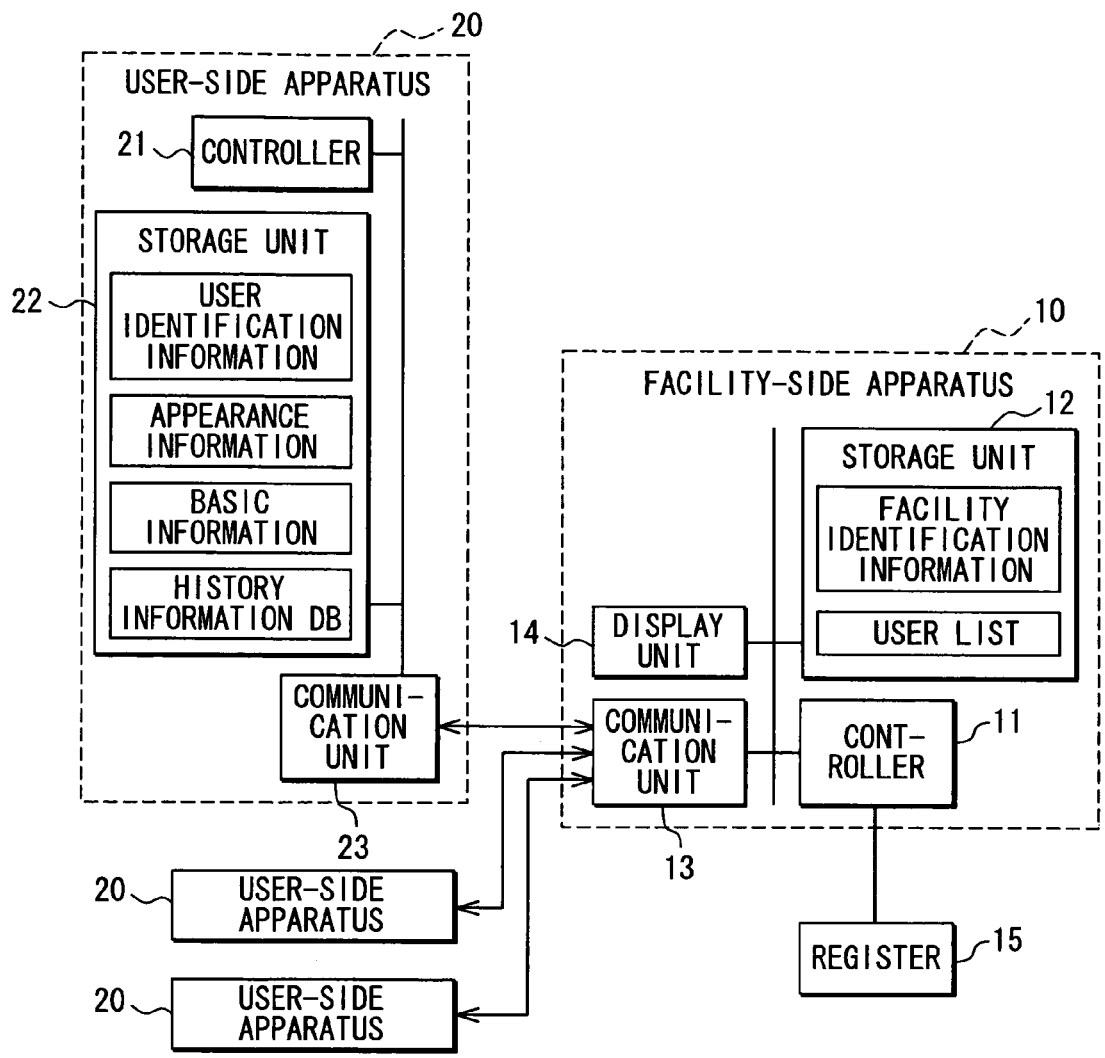
FIG. 25 is a block diagram showing a schematic configuration of an information communication system according to a seventh embodiment of the present invention.

FIG. 25 is a block diagram showing a schematic configuration of the information communication system according to the seventh embodiment.

As compared with the information communication system (FIG. 1) according to the first embodiment, the information communication system according to the seventh embodiment is different therefrom in that a history information database is stored in a user-side apparatus 20 instead of being stored in a facility-side apparatus 10, and facility identification information is stored in the facility-side apparatus 10 in advance. The facility identification information is identical to that described in the second embodiment. Elements or portions different from those of the information communication system according to the first embodiment will be mainly explained below. The same reference numerals are used for common elements or portions, and their explanations are therefore omitted.

[7-2. Processing Executed by Information Communication System]

Processing executed by each of the apparatuses 10 and 20 that constitute the information communication system according to the seventh embodiment will next be explained.

[7-2-1. Information Transmission Processing]

Information transmission processing executed by a controller 21 of each user-side apparatus 20 will first be explained using a flowchart shown in FIG. 26. As compared with the information transmission processing (FIG. 2) of the first embodiment, the information transmission processing of the seventh embodiment is different therefrom in that processes of S1803 through S1809 are executed in place of the processes of S103 and S104. Since the processing contents of S1801 and S1802 are identical to those of S101 and S102 in other respects, the description of these processing contents is omitted.

It is determined at S1803 whether the facility identification information is received. The facility identification information serves as a request for requesting the transmission of the appearance information, the basic information, and the history information. As will be described later, the send request is transmitted from the facility-side apparatus 10 to the user-side apparatus 20 whose existence is detected at a facility by the facility-side apparatus 10.

When it is determined at S1803 that the facility identification information has been received, the information transmission processing proceeds to S1804. It is determined at S1804 whether the information item corresponding to the received facility identification information is stored in the history information database of a storage unit 22. That is, as will be described later, history information about each user having the corresponding user-side apparatus 20 is stored in the history information database in association with the facility identification information of the facility that the user used. It is determined at S1804 whether the received facility identification information is stored in the history information database. That is, it is determined whether the user having the user-side apparatus 20 utilized the facility related to the received facility identification information in the past.

When it is determined at S1804 that the received facility identification information has been stored in the history information database of the storage unit 22, the information transmission processing proceeds to S1805. At S1805, the corresponding history information associated with the received facility identification information is extracted among the history information stored in the history information database. Thereafter, the information transmission processing proceeds to S1807.

On the other hand, when it is determined at S1804 that the received facility identification information has not been stored in the history information database of the storage unit 22, the information transmission processing proceeds to S1806. At S1806, the corresponding history information associated with facility identification information of the same kind of business field as the received facility identification information is extracted among the history information stored in the history information database. Then, the information transmission processing proceeds to S1807. That is, when the facility related to the received facility identification information was not utilized in the past, history information at a facility of the same kind of business field as that facility is extracted.

At S1807, the history information extracted from the history information database, and the appearance information and basic information (appearance information and basic information of each user having the corresponding user-side apparatus 20) stored in the storage unit 22 are transmitted to the facility-side apparatus 10 corresponding to a request source together with the user identification information. Thereafter, the information transmission processing proceeds to S1808. Thus, service selection information is generated at the facility-side apparatus 10, based on the history information.

On the other hand, when it is determined at S1803 that the facility identification information has not been received, the information transmission processing proceeds to S1808.

It is determined at S1808 whether both the history information and facility identification information are received. Both the history information and facility identification information serve as a history information registration request. Here, when each user is provided with service at a facility, the history information registration request is of information transmitted from the facility-side apparatus 10 to the user-side apparatus 20 as will be described later.

When it is determined at S1808 that the history information registration request has been received, the information transmission processing proceeds to S1809, where the received history information is stored in the history information database of the storage unit 22 in association with the received facility identification information. Then, the information transmission processing returns to S1801.

That is, each time each user having the corresponding user-side apparatus 20 is provided with service at a facility, history information indicative of the contents of the service is added to the history information database in association with facility identification information about the facility. As a result, the history information about the service provided to each user having the user-side apparatus 20 in the past at the facility is stored in the history information database in a retrievable state, where the history information is retrieved based on the information (facility identification information) about the facility that has provided the service.

On the other hand, when it is determined at S1808 that the history information registration request has not been received, the information transmission processing returns to S1801.

[7-2-2. Service History Storage Processing]

Figure 27:
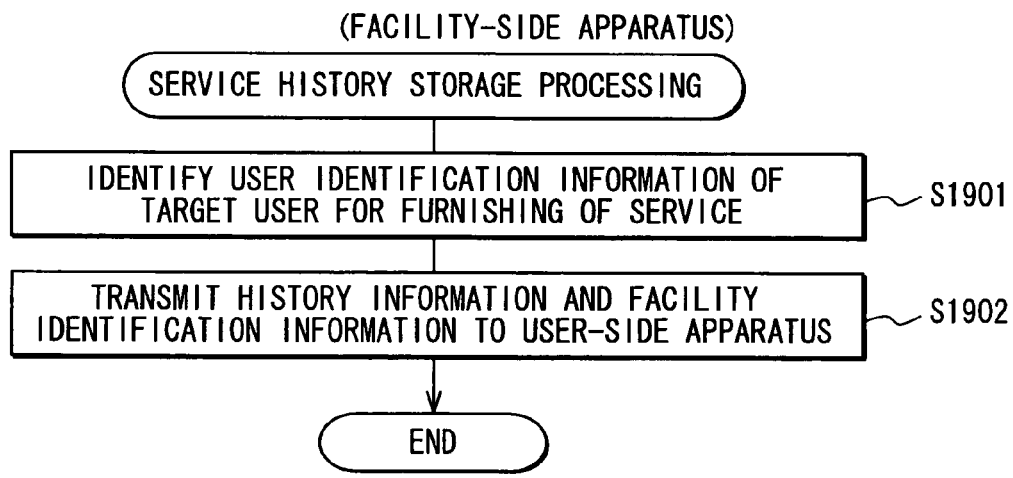
FIG. 27 is a flowchart of service history storage processing according to the seventh embodiment.

Service history storage processing executed by the corresponding controller 11 of the facility-side apparatus 10 will next be explained using a flowchart shown in FIG. 27. As compared with the service history storage processing (FIG. 3) of the first embodiment, the service history storage processing of the seventh embodiment is different therefrom in that a process of S1902 is executed in place of the processes of S202 and S203. Since the processing contents of S1901 are identical to those of S201 in other respects, the description of the processing contents is omitted.

At S1902, each of history information received from a register 15, and facility identification information (facility identification information about each facility provided for the corresponding facility-side apparatus 10) stored in the storage unit 12 are transmitted to the user-side apparatus 20 as a history information registration request. Then, the present service history storage processing is terminated. Thus, the transmitted history information is stored in the history information database of the storage unit 22 of the user-side apparatus 20 in a state of being associated with the transmitted facility identification information (S1809 at the above-described information transmission processing (FIG. 26)).

That is, the service history storage processing of the seventh embodiment is different from that of the first embodiment in that the history information is stored in the user-side apparatus 20 and the history information is stored with being associated with the facility identification information.

[7-2-3. User Information Display Processing]

Figure 28:
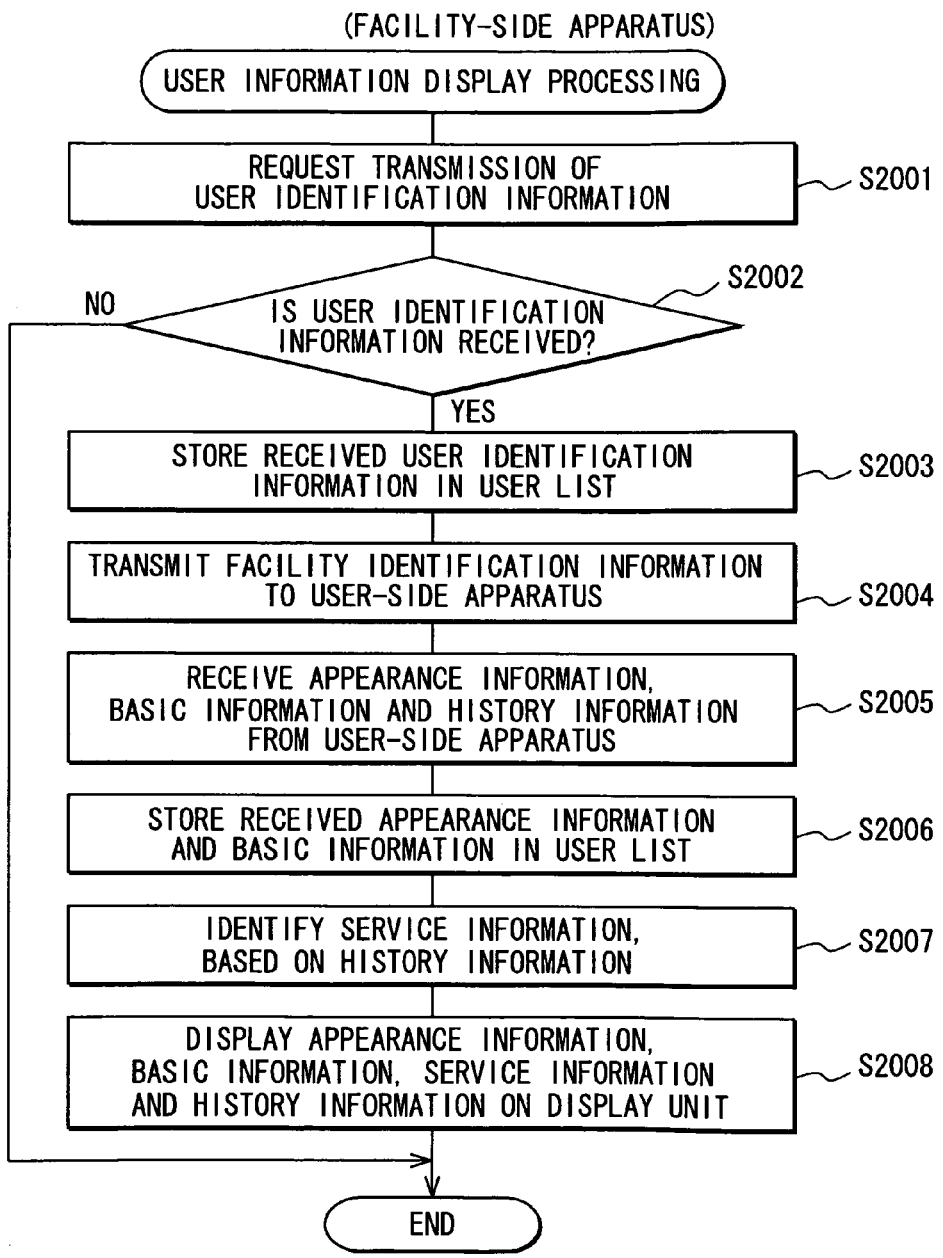
FIG. 28 is a flowchart of user information display processing according to the seventh embodiment.

User information display processing executed by the controller 11 of the facility-side apparatus 10 will next be explained using a flowchart shown in FIG. 28. As compared with the user information display processing (FIG. 4) of the first embodiment, the user information display processing of the seventh embodiment is different therefrom in that processes of S2004 and S2005 are carried out in place of the processes of S304, S305 and S307 through S309. Since the processing contents of S2001 through S2003 and S2006 through S2008 are identical to those of S301 through S303, S306, S310 and S311 in other respects, their explanations are omitted.

At S2004, the facility identification information (facility identification information of each facility provided for the corresponding facility-side apparatus 10) stored in the storage unit 12 is transmitted to the user-side apparatus 20 corresponding to a transmission source of the user identification information stored in the user list. The facility identification information serves as a request of transmission of the appearance information, the basic information, and the history information. Consequently, the appearance information and basic information of each user visiting the facility, and history information for selecting service to be provided to each user in the facility are transmitted to the facility-side apparatus 10 together with the user identification information (S1807 at the aforementioned information transmission processing (FIG. 26)). If the multiple user identification information items are stored in the corresponding user list, the above send requests are transmitted to the respective user-side apparatuses 20 (all user-side apparatuses 20 existing in the facility).

Subsequently, the appearance information, basic information and history information transmitted from each user-side apparatus 20 are received at S2005. At subsequent processing, the appearance information and basic information received at S2005 are stored in the user list at S2006, and service selection information is generated at S2007 based on the history information received at S2005.

That is, the user information display processing of the seventh embodiment is different from that of the first embodiment in that the history information for selecting service to be provided to each user is acquired from the corresponding user-side apparatus 20.

[7-3. Effects]

According to the information communication system of the seventh embodiment as described above, the following advantageous effects are obtained in addition to effects (except for (1E)) similar to the first embodiment.

(7F) The facility-side apparatus 10 acquires history information related to each user having visited the facility from the corresponding user-side apparatus 20. Therefore, the facility-side apparatus 10 needs not to store the history information on each user in advance and is capable of selecting suitable service corresponding to the individual user even with respect to the first-visiting user that visits the facility for the first time.

(7G) If history information about each user at the facility provided for the corresponding facility-side apparatus 10 exists, the facility-side apparatus 10 generates service selection information, based on the history information. It is therefore possible to select suitable service corresponding to both each user and its corresponding facility. If the history information does not exist, the facility-side apparatus generates service selection information based on history information about other facility of the same kind of business field as the target facility, at which the user exists. It is therefore possible to select service corresponding to the first-visiting user that visits the facility for the first time.

[7-4. Correspondence to Claims]

The controller 21 of the user-side apparatus 20 that executes the process of S1807 at the information transmission processing (FIG. 26), corresponds to appearance information transmitting means in the information communication system according to the seventh embodiment. The storage unit 22 of the user-side apparatus 20 corresponds to history information storing means.

The controller 11 of the facility-side apparatus 10 that executes the processes of S2004, S2005 and S2007 at the user information display processing (FIG. 28) corresponds to service information generating means. The controller 11 of the facility-side apparatus 10 that executes the process of S2008 corresponds to output means (notifying means).

8. Eighth Embodiment

An information communication system according to an eighth embodiment of the present invention will next be explained.

[8-1. Overall Configuration]

Figure 29:
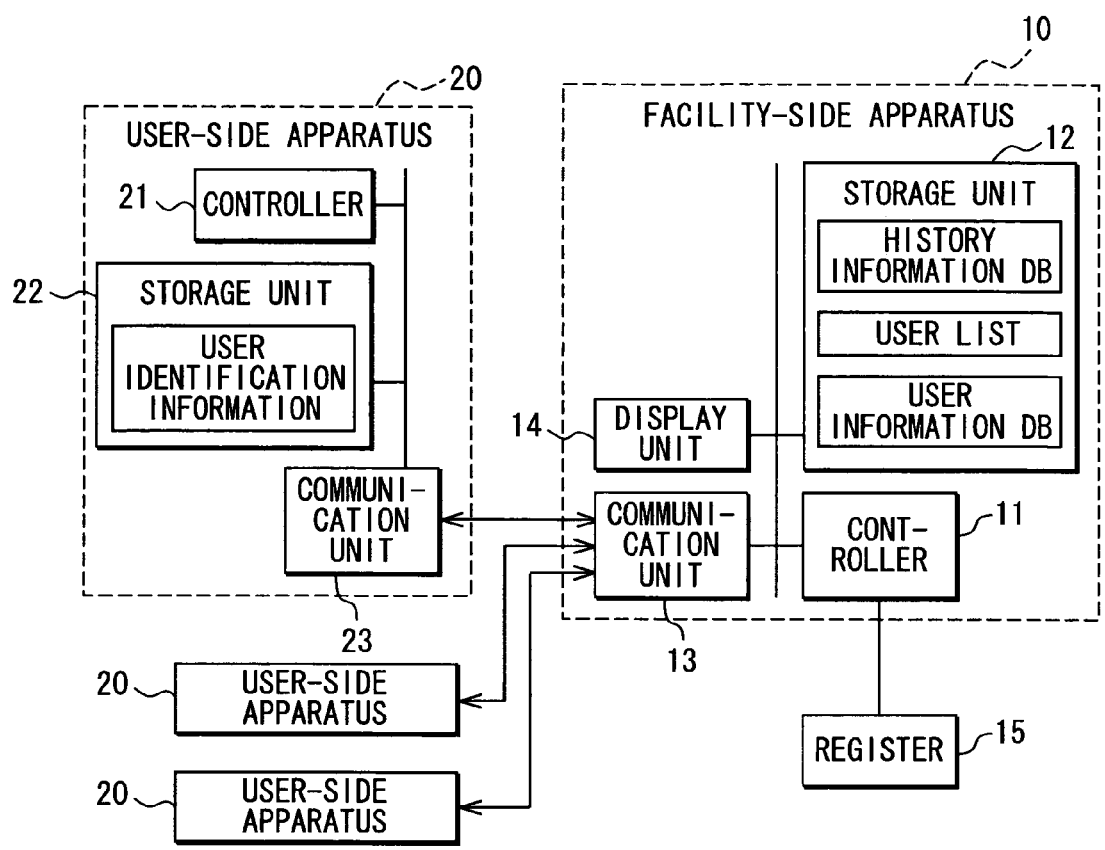
FIG. 29 is a block diagram showing a schematic configuration of an information communication system according to an eighth embodiment of the present invention.

FIG. 29 is a block diagram showing a schematic configuration of the information communication system according to the eighth embodiment.

As compared with the information communication system (FIG. 1) according to the first embodiment, the information communication system according to the eighth embodiment is different therefrom in that a facility-side apparatus 10 is configured so as to manage not only history information about multiple users but also appearance information and basic information about each user.

That is, the appearance information and basic information are not stored in a storage unit 22 of a user-side apparatus 20.

On the other hand, a user information database that registers appearance information and basic information about multiple users are stored in a storage unit 12 of a facility-side apparatus 10. The appearance information and basic information about each user are registered in the user information database in association with user identification about each user. The appearance information and basic information about each user are retrievable based on the user identification information.

Elements or portions different from those of the information communication system according to the first embodiment will be mainly explained below. The same reference numerals are used for common elements or portions, and their explanations are therefore omitted.

[8-2. Processing Executed by Information Communication System]

Processing executed by each of the apparatuses 10 and 20 that constitute the information communication system according to the eighth embodiment will next be explained.

[8-2-1. Information Transmission Processing]

Since information transmission processing executed by a controller 21 of each user-side apparatus 20 is different from the information transmission processing (FIG. 2) of the first embodiment but identical to the information transmission processing (FIG. 12) of the third embodiment, the description thereof is omitted.

[8-2-2. Service History Storage Processing]

Since service history storage processing executed by a controller 11 of the corresponding facility-side apparatus 10 is identical to the service history storage processing (FIG. 3) of the first embodiment, the description thereof is omitted.

[8-2-3. User Information Display Processing]

Figure 30:
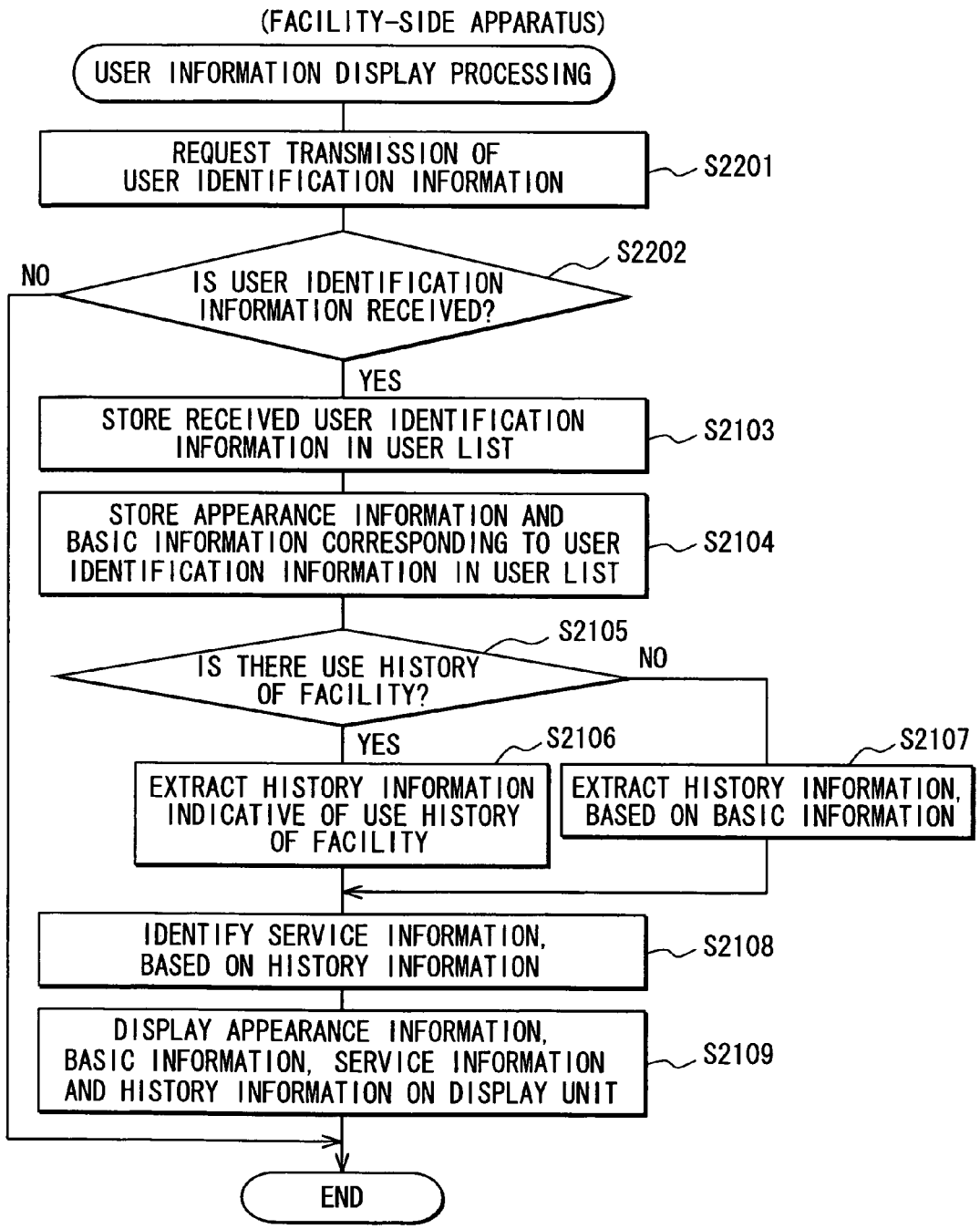
FIG. 30 is a flowchart of user information display processing according to the eighth embodiment.

User information display processing executed by the controller 11 of the facility-side apparatus 10 will next be explained using a flowchart shown in FIG. 30. As compared with the user information display processing (FIG. 4) of the first embodiment, the user information display processing of the eighth embodiment is different therefrom in that a process of S2104 is carried out in place of the processes of S304 through S306. Since the processing contents of S2101 through S2103 and S2105 through S2109 are identical to those of S301 through S303 and S307 through S311 in other respects, their explanations are omitted.

At S2104, appearance information and basic information Y associated with user identification information Y stored in the corresponding user list of the storage unit 12 are extracted among the information stored in the user information database of the storage unit 12, and stored in the corresponding user list. Since the user identification information about each user in the facility has already been stored in the user list here, the appearance information and basic information are stored in association with the user identification information. As a result, the user identification information, appearance information and basic information are stored in association with one another as information about each user in the facility. When plural (N≥2) user identification information items Y(1) through Y(N) are stored in the user list, the process of S2104 is performed on the user identification information items Y(1) through Y(N).

That is, the user information display processing of the eighth embodiment is different from that of the first embodiment in that the appearance information and basic information are acquired from the user information database.

[8-3. Effects]

According to the information communication system of the eighth embodiment as described above, the following advantageous effects are obtained in addition to effects (except for (1D)) similar to the first embodiment.

(8D) The facility-side apparatus 10 acquires appearance information indicative of the appearance characteristics of each user having visited a facility and basic information related to each user from the user information database of the storage unit 12 of the corresponding facility-side apparatus 10. With such a configuration, the corresponding user-side apparatus 20 may store user identification information instead of the appearance information and basic information and transmit the same to the facility-side apparatus 10. It is therefore possible to reduce the amount of information stored in the storage unit 22 and the amount of information transmitted to the facility-side apparatus 10.

[8-4. Correspondence to Claims]

The controller 21 of the user-side apparatus 20 that executes the process of S702 at the information transmission processing (FIG. 12), corresponds to appearance information transmitting means in the information communication system according to the eighth embodiment.

The controller 11 of the facility-side apparatus 10 that executes the processes of S2105 through S2108 at the user information display processing (FIG. 30) corresponds to service information generating means. The controller 11 of the facility-side apparatus 10 that executes the process of S2109 corresponds to output means (notifying means). The storage unit 12 of the facility-side apparatus 10 corresponds to history information storing means and appearance information storing means.

9. Modifications

Although embodiments of the present invention have been described above, it is needless to say that the present invention can take various forms.

[9-1. Configuration in which Facility-Side Apparatus Stores User Information Database]

The eighth embodiment has illustrated the information communication system having such a configuration that the user information database that registers the appearance information and basic information about the multiple users is stored in the storage unit 12 of the facility-side apparatus 10. Although the information communication system according to the eighth embodiment is configured based on the information communication system according to the first embodiment, the present invention is not limited to it. The present information communication system may be configured based on, for example, the information communication system equipped with the management apparatus 30 as in the second embodiment or may be configured based on the information communication system that the user-side apparatus 20 stores the history information as in the seventh embodiment.

[9-2. Timing Provided to Update Appearance Information]

Each of the fourth through sixth embodiments has illustrated the information communication system having such a configuration as to automatically update the appearance information stored in the user-side apparatus 20. Here, the timing for updating the appearance information is not limited to or by the contents illustrated in each of the above embodiments.

For example, the appearance information may be updated on the condition that each user has been provided with specific service at a certain facility. Here, the specific service indicates such service that the appearance of each user changes greatly. As the specific service, may be mentioned, for example, a case in which a user is provided with service at a beauty parlor or a case in which a user purchased eyeglasses at an eyeglass store.

Described specifically, when the user-side apparatus 20 is provided with specific service at a facility, it stores its information therein together with appearance information and transmits the same to the corresponding vehicle-side apparatus 40 together with the appearance information upon riding in the vehicle 50. The vehicle-side apparatus 40 determines whether each user is provided with the specific service based on information received from the user-side apparatus 20 together with the appearance information. Only when it is determined that the user has been provided with the specific service, processing (including capturing the image of user and transmission of face-shot image) for updating the appearance information is performed. If done in the above way, then the appearance information can be efficiently updated with timing at which the appearance of each user has varied greatly.

[9-3. Location where Appearance Information is Updated]

Although each of the embodiments has illustrated such a configuration that the image of each user is captured at the vehicle 50 and its appearance information is updated, the present invention is not limited to it. The image of the user is captured at a location other than the vehicle 50 and its appearance information may be updated. For example, a dedicated location for capturing the image of the face may be provided in a facility.

[9-4. Contents of Appearance Information]

Although each of the embodiments has illustrated the configuration that the face-shot image is used as the appearance information, the present invention is not limited to it. The appearance information may be alternatively the appearance characteristics of each user. For example, a portrait of a user may be used. It is also possible to use, as appearance information, such information that provides basis to determine the appearance characteristics of each user, like the height, weight, age, sex, eyeglasses, face's characteristic, body type (for example, leptosome), social status and nationality of each user, etc.

[9-5. Basic Information]

Each of the embodiments has illustrated, as the basic information, the information about the name, height, weight, age, blood type, family structure and hobby of each user. Of these, the height, weight and age can be utilized upon distinguishing the users, based on the appearance characteristics thereof. The basic information may be include, for example, information about the sex, presence or absence of eyeglasses, nationality, etc.

It is not always necessary to use the basic information. Such a configuration that no basic information is used may be adopted.

[9-6. Acquisition of Information from User-Side Apparatus by Facility-Side Apparatus]

In the first, second and fourth through seventh embodiments, the facility-side apparatus 10 detects the user-side apparatus 20 of each user in the facility by acquiring the user identification information from the user-side apparatus 20 and acquires the appearance information by transmitting the user information send request to the detected user-side apparatus 20. However, the timing for acquiring the appearance information or the like from the user-side apparatus 20 by the facility-side apparatus 10 is not limited to the above.

For example, the facility-side apparatus 10 may acquire the appearance information together with the user identification information upon detecting the user-side apparatus 20 of each user in the facility. Also, the facility-side apparatus 10 may acquire the appearance information in stead of the user identification information upon detecting the user-side apparatus 20 of each user in the facility. If done in the above way, because the facility-side apparatus 10 needs not to transmit the user information send request to the user-side apparatus 20 after the detection of the user-side apparatus 20 of each user in the facility, the processing can be simplified.

The acquisition of the information from the user-side apparatus 20 by the facility-side apparatus 10 is not limited by its execution based on a request issued from the facility-side apparatus 10. For example, such a configuration that the user-side apparatus 20 regularly transmits information to the facility-side apparatus 10 may be taken.

[9-7. Configuration of User-Side Apparatus]

Although each of the embodiments describes a configuration that employs the cellular phone terminal as the user-side apparatus 20, the present invention is not limited to it. The user-side apparatus may employ a storage device having a radio communication arrangement, such as a portable information device of PDA or the like, an electronic key (smart key) of the vehicle 50, or the like. A short-range type or contact type storage device that performs the transfer of data, such as an IC card, an eddy card, a USB memory, an SD card or the like may be used. The user-side apparatus may be configured as a dedicated machine that is not used for other purpose or that is not shared by the other machine.

Although each of the embodiments has illustrated the case in which the respective users have the user-side apparatuses 20 one by one, the present invention is not limited to it. For example, multiple users may hold one common user-side apparatus 20. In this case, the user-side apparatus 20 stores information (user identification information, and appearance information and basic information, etc. as needed) related to multiple users that use the common user-side apparatus 20, in association with one another with respect to the users. Even though such a configuration is taken, effects similar to the above embodiments can be obtained.

[9-8. Configuration of Management Apparatus]

Although the second and third embodiments respectively have illustrated the configuration in which the management apparatus 30 is provided which exercises control and management over the information related to the plurality of facilities, the management apparatus 30 may be constituted integrally with the facility-side apparatus 10 provided at any facility, for example. As in the fourth through sixth embodiments, the management apparatus 30 can be used even in the information communication system equipped with the vehicle-side apparatus 40.

[9-9. Acquisition of Information from Management Apparatus by Facility-Side Apparatus]

In the second and third embodiments, the facility-side apparatus 10 transmits to the management apparatus 30 both (a) the user identification information received from the user-side apparatus 20 and (b) the facility identification information of the facility provided for the facility-side apparatus 10. The user identification information and the facility identification information serve as the history information send request, and thereby the facility-side apparatus 10 acquires the history information and the like from the management apparatus 30. However, the method for acquiring the history information and the like from the management apparatus 30 by the facility-side apparatus 10 is not limited to it.

When the user-side apparatus 20 is configured so as to be communicable with the management apparatus 30, for example, it can also be configured as follows:

First, a facility-side apparatus 10 transmits facility identification information of a facility provided for the facility-side apparatus 10 to the user-side apparatus 20. The user-side apparatus 20 transmits to the management apparatus 30 both (a) the user identification information of each user associated with the user-side apparatus 20 and (b) the facility identification information received from the facility-side apparatus 10. The user identification information and the facility identification information serve as the history information send request, and thereby the user-side apparatus 20 acquires history information and the like from the management apparatus 30. The user-side apparatus 20 transmits the so-acquired history information and the like to the facility-side apparatus 10. If done in the above way, the facility-side apparatus 10 is capable of indirectly acquiring the history information and the like from the management apparatus 30 via the user-side apparatus 20.

When the history information send request from the user-side apparatus 20 is received at the management apparatus 30 under this configuration, the management apparatus 30 may directly transmit the history information and the like to the facility-side apparatus 10. If done in the above way, then the number of communications at the entire system can be reduced as compared with the case in which the history information and the like are returned to the user-side apparatus 20.

[9-10. Identification of User Provided with Service]

Although in each of the embodiments, the service supplier on the facility side inputs the information used for identifying or specifying each user provided with service to the register 15 when the user is provided with the service at the facility, the present invention is not limited to it. For example, a narrow communication area is formed in the vicinity of the register 15 and a user may be identified based on a user-side apparatus 20 detected in the communication area. The image of the face of each user provided with service is captured by a cameral provided at a facility, and the user may be identified based on its face-shot image.

[9-11. Generation of Service Selection Information]

Although, when the history information about each user does not exist, the service selection information is generated based on the history information of other user common in characteristic to the user in each of the first through sixth embodiments and the eighth embodiment, the present invention is not limited to it. For example, when the number of history information items for the user at the facility is lower than a predetermined number, the service selection information may be generated in consideration of the history information items of other users. The service selection information may be regularly generated in consideration of the history information about other users regardless of the number of the history information items of the user. In reverse, the history information about other users may not be used at all.

Similarly, although, when the history information of each user at a facility does not exist, the service selection information is generated based on the history information at other facility of the same kind of business field as that facility in each of the second, third and seventh embodiments, the present invention is not limited to it. For example, if the number of history information items for the user at the facility is lower than a predetermined number, the service selection information may be generated in consideration of the history information items at other facility. The service selection information may be regularly generated in consideration of the history information items at the other facility regardless of the number of the history information items for the user. In reverse, the history information at other facility may not be used at all.

[9-1. Detection of Getting Out of Vehicle]

Although it is determined in the sixth embodiment that the user getting out of the vehicle 50 has been detected as a result of the detection of the stop of the engine of the vehicle 50, the present invention is not limited to it. For example, the user getting out may be determined to have been detected as a result of the detection of opening/closing of the door on the driver's seat side.

[9-13. Status Information]

Although the continuous driving time of the vehicle 50 is detected as the status information indicative of the user having the user-side apparatus 20 in the sixth embodiment, the present invention is not limited to it. For example, a driving route, a change of a vehicle speed during driving, a facility at which the vehicle has stopped, etc. may be detected for the state information. Information to be detected is not limited to one related to driving conditions. For example, living-body information (heart rate and blood pressure or the like) of each user (not limited to the driver) riding in the vehicle 50 may be detected for the state information. On the other hand, the state of vehicle equipment may be detected as status information indicative of the state of the vehicle 50 in place of the state of the user or in addition to the user's state.

The status information may be displayed on the display unit 14 together with the user's face-shot image and the like. If done in the above way, then the service supplier on the facility side is capable of selecting service corresponding to the state of each user as illustrated below.

If information about a driving time is contained in the status information, a user, which visits the facility after continuous driving over long hours, can be provided with service that serves tea such that the user can be relaxed at the beginning.

If information about a driving route and a facility at which a vehicle has stopped is contained in the status information, a user, who visits a restaurant immediately before the visit of the present facility, may be recommended to take a light meal instead of a heavy meal.

If information about a deviation of a vehicle speed is contained in the status information, a user, who visits the facility after having driven at high speed, can hold a conversation through such a topic as to relax user's feeling.

If the heart rate and blood pressure of each user are contained in the status information, a user being in bad physical condition can be recommended to take a light meal without alcohol.

[9-14. Display of Information]

Although each of the embodiments has illustrated such a configuration that the appearance information, basic information, service selection information and history information of each user in the facility are displayed on the display unit 14, the contents thereof to be displayed are not limited to it. For example, only the appearance information and basic information of each user may be displayed on the display unit 14. Even if done in the above way, each user who visits the facility may be called by name for the service. The appearance information and the basic information may be displayed the above information sets are processed to delete unwanted information, for example.

The appearance information and the like may be notified in the form other than the display. In other words, the notification of the appearance information may be provided through other device other than the display device. Here, the notification is to work on at least one of the human senses thereby to notify some information. It is possible to provide notification of the appearance information and the like through audio output, for example. For example, an synthetic voice saying "50 years old with no eyeglasses" may be outputted through the audio device.

On the other hand, the notification of the appearance information is provided to the service supplier on the facility side through a paper. For example, a process for outputting appearance information as a membership card may be performed. For example, in the above process, a membership card, on which a face-shot image of a user having visited a facility is printed, may be automatically created.

[9-15. Facility]

The information communication system of the present invention is applicable to various facilities. As the facilities, may be mentioned, for example, eating and drinking places such as a restaurant and a pub, large-scale shopping stores such as a department store, a supermarket, a boutique and retailing stores for furniture, electrical appliances and the like, a barber shop and a beauty parlor, accommodation facilities such as a hotel, etc., a hospital, a sport club, a car dealer, a parking area, a culture center, amusement facilities such as Disneyland, etc., an airport, a station, a harbor, music and video stores, etc. The facilities are not limited to the above.

As in the above embodiment, a user identifying information item or the user identification information may directly indicate the appearance characteristic of the user. Also, the user identifying information item of the present invention may indirectly indicate the appearance characteristic of the user. In the above indirect case, the user identifying information item is used for identifying the appearance characteristic of the user.

In the above embodiments, the image of the face of the driver or the user sitting in the driver seat is captured for updating the appearance information. The image may be digitally captured and the captured imaged is used for radio communication. Thus, the photographing the driver in the above embodiment or the drawings is not limited to the meaning of the capturing of the image by using a film of a conventional film camera.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An information communication system comprising:
a user-side apparatus that is associated with a user;
a facility-side apparatus provided at a facility, which the user is capable of visiting; and
a management apparatus configured to store a plurality of history information items that indicates services provided in a past at a plurality of facilities, wherein:
the user-side apparatus includes appearance information transmitting means for transmitting to the facility-side apparatus a user identifying information item related to the user of the user-side apparatus, the user identifying information item being used for identifying an appearance characteristic of the user;
the facility-side apparatus includes output means for outputting the appearance characteristic of the user identified based on the user identifying information item received from the user-side apparatus;
the output means provides notification of the appearance characteristic of the user identified based on the user identifying information item received from the user-side apparatus;
the facility-side apparatus includes service information generating means for generating service selection information item used for selecting a service to be provided to the user based on the user identifying information item received from the user-side apparatus, the user having the appearance characteristic identified based on the user identifying information item received from the user-side apparatus;
the output means provides notification of the appearance characteristic of the user identified based on the user identifying information item together with notification of the service selection information item generated by the service information generating means;
the service information generating means of the facility-side apparatus detects whether the user-side apparatus exists in a communication area of the facility-side apparatus, and when the user-side apparatus is detected in the communication area of the facility-side apparatus,
transmits a wireless request to the user-side apparatus for the user identifying information item,
receives the user identifying information item, and
responsive to receipt of the user identifying information item,
determines, from the plurality of history information items, as a use-history-of-facility, whether the user identified by the user identifying information has a history indicative of a use history of the facility where the facility-side-apparatus is provided,
when the use-history-of-facility is determined to exist, then extracts at least one of the plurality of history information items stored in the management apparatus which has the history indicative of use history of the facility where the facility-side-apparatus is provided by the user identified by the user identifying information,
when the use-history-of-facility is determined to not exist, then
determines, from the plurality of history information items, as a use-history-of-same-kind-of-facility, whether the user identified by the user identifying information has a history indicative of a use history of a facility of the same kind of industry as the facility where the facility-side apparatus is provided,
when the use-history-of-same-kind-of-facility is determined to exist, then extracts at least one of the plurality of history information items stored in the management apparatus which has the history indicative of the use history of the facility of the same kind of industry as the facility where the facility-side-apparatus is provided by the user identified by the user identifying information,
and generates the service selection information item based on the extracted one of the plurality of history information items, the one of the plurality of history information items being related to and corresponding to both (a) the user having the appearance characteristic that is identified based on the user identifying information item received from the user-side apparatus and (b) the facility that has the facility-side apparatus;

the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus;

the facility-side apparatus is capable of performing radio communication with the user-side apparatus; and the facility-side apparatus is configured to receive the user identifying information item from the user-side apparatus that is in a state for being capable of communicating with the facility-side apparatus.

2. The information communication system according to claim 1, wherein the facility-side apparatus includes history information storing means for storing a plurality of history information items indicating services provided in a past at the facility having the facility-side apparatus, and wherein the service information generating means generates the service selection information item based on one of the plurality of history information items stored in the history information storing means, the one of the plurality of history information items being related to the user that has the appearance characteristic identified based on the user identifying information item received from the user-side apparatus.

3. The information communication system according to claim 2, wherein the user identifying information item transmitted by the appearance information transmitting means of the user-side apparatus indicates the appearance characteristic of the user associated with the user-side apparatus, and wherein the output means provides the notification of the appearance characteristic indicated by the user identifying information item received from the user-side apparatus together with the notification of the service selection information item.

4. The information communication system according to claim 2, wherein the facility-side apparatus includes appearance information storing means for storing appearance information items indicating appearance characteristics of the plurality of users, wherein the user identifying information item transmitted by the appearance information transmitting means of the user-side apparatus is used for identifying one of the appearance information items stored in the appearance information storing means, the one of the appearance information items indicating the appearance characteristic of the user associated with the user-side apparatus, and wherein the output means acquires from the appearance information transmitting means the one of the appearance information items and provides the notification of the appearance characteristic indicated by the acquired one of the appearance information items together with the notification of the service selection information item.

5. The information communication system according to claim 1, wherein the management apparatus includes history information returning means for transmitting one of the plurality of history information items to the facility-side apparatus such that the service information generating means acquires the one of the plurality of history information items when the user identifying information item and facility information item related to the facility having the facility-side apparatus are received from the facility-side apparatus, the one of the plurality of history information items being related to both (a) the user having the appearance characteristic identified based on the received user identifying information item and (b) the facility identified based on the received facility information item.

6. The information communication system according to claim 1, wherein the user identifying information item transmitted by the appearance information transmitting means of the user-side apparatus indicates the appearance characteristic of the user associated with the user-side apparatus, and wherein the output means provides the notification of the appearance characteristic of the user indicated by the user identifying information item received from the user-side apparatus together with the notification of the service selection information item generated by the service information generating means.

7. The information communication system according to claim 1, wherein the facility-side apparatus includes appearance information storing means for storing appearance information items indicating appearance characteristics of the plurality of users, wherein the user identifying information item transmitted by the appearance information transmitting means of the user-side apparatus is used for identifying one of the appearance information items stored in the appearance information storing means, the one of the appearance information items indicating the appearance characteristics of the user associated with the user-side apparatus, and wherein the output means acquires the one of the appearance information items from the appearance information storing means and provides the notification of the appearance characteristic indicated by the acquired one of the appearance information items together with the notification of the service selection information item generated by the service information generating means.

8. The information communication system according to claim 1, wherein the management apparatus is capable of storing appearance information items indicating appearance characteristics of the plurality of users, wherein the user identifying information item transmitted by the appearance information transmitting means of the user-side apparatus is used for identifying one of the appearance information items stored in the management apparatus, the one of the appearance information items indicating the appearance characteristic of the user associated with the user-side apparatus, and wherein the output means acquires the one of the appearance information items from the management apparatus and provides the notification of the appearance characteristic indicated by the one of the appearance information items together with the notification of the service selection information item generated by the service information generating means.

9. The information communication system according to claim 8, wherein the management apparatus includes appearance information returning means for transmitting one of the appearance information items to the facility-side apparatus such that the output means acquires the one of the appearance information items when the user identifying information item is received from the output means of the facility-side apparatus, the one of the appearance information items being identified based on the received user identifying information item.

10. The information communication system according to claim 1, wherein the one of the plurality of history information items indicates the service provided in the past at the facility having the facility-side apparatus.

11. The information communication system according to claim 1, wherein the one of the plurality of history information items indicates the service provided at the another facility of a category identical to a category of the facility having the facility-side apparatus.

12. The information communication system according to claim 2,
wherein the user identifying information item transmitted to the facility-side apparatus by the appearance information transmitting means of the user-side apparatus is used for identifying an identification information item unique to the user associated with the user-side apparatus, and
wherein the service information generating means generates the service selection information item based on one of the plurality of history information items, the one of the plurality of history information items indicating the service provided to the user corresponding to the identification information item identified based on the user identifying information item received from the user-side apparatus.

13. The information communication system according to claim 2,
wherein the user identifying information item transmitted to the facility-side apparatus by the appearance information transmitting means of the user-side apparatus is used for identifying a characteristic information item indicating a characteristic of the user associated with the user-side apparatus, and
wherein the service information generating means generates the service selection information item based on the one of the plurality of history information items, the one of the plurality of history information items indicating the service provided to the user corresponding to the characteristic information item identified based on the user identifying information item received from the user-side apparatus.

14. The information communication system according to claim 13,
wherein the service information generating means generates the service selection information item based on the one of the plurality of history information items, the one of the plurality of history information items indicating the service provided another user corresponding to a characteristic information item identical or similar to the characteristic information item identified based on the user identifying information item received from the user-side apparatus.

15. The information communication system according to claim 2,
wherein the user identifying information item transmitted to the facility-side apparatus by the appearance information transmitting means of the user-side apparatus is used for identifying a status information item indicative of a state related to the user associated with the user-side apparatus, and
wherein the service information generating means generates the service selection information item based on the one of the plurality of history information items, the one of the plurality of history information items corresponding to the status information item identified based on the user identifying information item received from the user-side apparatus.

16. The information communication system according to claim 15, further including a status detecting device mounted to a vehicle,
wherein the status detecting device includes:
status detecting means for detecting at least one of a state of the user that gets in the vehicle and a state of the vehicle; and
status information transmitting means for transmitting the status information item indicative of the state detected by the status detecting means to the user-side apparatus of the user, and
wherein the user identifying information item transmitted to the facility-side apparatus by the appearance information transmitting means is used for identifying the status information item received from the status detecting device.

17. The information communication system according to claim 1,
wherein the user-side apparatus includes history information storing means for storing a plurality of history information items indicating services provided at the facility and at another facility in a past to the user associated with the user-side apparatus, and
wherein the service information generating means of the facility-side apparatus generates the service selection information item based on one of the plurality of history information items stored in the history information storing means, the one of the plurality of history information items being related to the facility having the facility-side apparatus.

18. The information communication system according to claim 17,
wherein the user identifying information item transmitted by the appearance information transmitting means of the user-side apparatus indicates the appearance characteristic of the user associated with the user-side apparatus, and
wherein the output means provides notification of the appearance characteristic of the user indicated by the user identifying information item received from the user-side apparatus together with the notification of the service selection information item generated by the service information generating means.

19. The information communication system according to claim 17,
wherein the facility-side apparatus includes appearance information storing means for storing appearance information items indicative of appearance characteristics of a plurality of users,
wherein the user identifying information item transmitted by the appearance information transmitting means of the user-side apparatus is used for identifying one of the appearance information items stored in the appearance information storing means, the one of the appearance information items indicating the appearance characteristic of the user associated with the user-side apparatus, and wherein the output means acquires the one of the appearance information items from the appearance information storing means and provides the notification of the appearance characteristic indicated by the one of the appearance information items together with the notification of the service selection information item generated by the service information generating means.

20. The information communication system according to claim 17, wherein the one of the plurality of history information items indicates the service provided in the past at the facility having the facility-side apparatus.

21. The information communication system according to claim 17, wherein the one of the plurality of history information items indicates the service provided in the past at another facility of a category identical to a category of the facility having the facility-side apparatus.

22. The information communication system according to claim 1, wherein the user identifying information item transmitted to the facility-side apparatus by the appearance information transmitting means of the user-side apparatus is used for identifying a face-shot image as the appearance characteristic, the face-shot image showing a face of the user associated with the user-side apparatus, and wherein the output means outputs the face-shot image of the user, the face-shot image being identified based on the user identifying information item received from the user-side apparatus.

23. The information communication system according to claim 22, further including an updating device that captures an image of the user to generate the face-shot image of the user and that transmits the face-shot image to the user-side apparatus associated with the user to perform image updating processing, wherein the appearance information transmitting means transmits the user identifying information item to the facility-side apparatus, the user identifying information item being used for identifying, as the appearance characteristic, the face-shot image received from the updating device.

24. The information communication system according to claim 23, wherein the updating device is provided to a vehicle and captures the image of the face of the user that sits in a driver seat of the vehicle.

25. The information communication system according to claim 23, wherein the updating device performs the image updating processing after elapse of a predetermined period since a time, when the updating device previously performs the image updating processing.

26. The information communication system according to claim 25, wherein the period is set to a length that differs depending on an age of the user.

27. The information communication system according to claim 23, wherein the updating device performs the image updating processing under a circumstance where an amount of light for capturing the image is ensured.

28. The information communication system according to claim 23, wherein the updating device performs the image updating processing if the user is provided with a predetermined service at the plurality of facilities.

29. A facility-side apparatus provided at a facility, which a user is capable of visiting, the facility-side apparatus being capable of communicating with a user-side apparatus associated with the user, the user-side apparatus including appearance information transmitting means for transmitting to the facility-side apparatus a user identifying information item related to the user in response to a request for user identifying information item, the user identifying information item being used for identifying an appearance characteristic of the user, the facility-side apparatus comprising:

output means for outputting the appearance characteristic of the user identified based on the user identifying information item received from the user-side apparatus;

service information generating means for generating service selection information item used for selecting a service to be provided to the user based on the user identifying information item received from the user-side apparatus, the user having the appearance characteristic identified based on the user identifying information item received from the user-side apparatus; and a management apparatus configured to store a plurality of history information items that indicates services provided in a past at a plurality of facilities, wherein:

the output means provides notification of the appearance characteristic of the user identified based on the user identifying information item received from the user-side apparatus;

the output means provides notification of the appearance characteristic of the user identified based on the user identifying information item together with notification of the service selection information item generated by the service information generating means; and the service information generating means detects whether the user-side apparatus exists in a communication area of the facility-side apparatus, and when the user-side apparatus is detected in the communication area of the facility-side apparatus transmits a wireless request to the user-side apparatus for the user identifying information item, receives the user identifying information item, and responsive to receipt of the user identifying information item, determines, from the plurality of history information items, as a use-history-of-facility, whether the user identified by the user identifying information has a history indicative of a use history of the facility where the facility-side-apparatus is provided, when the use-history-of-facility is determined to exist, then extracts at least one of the plurality of history information items stored in the management apparatus which has the history indicative of use history of the facility where the facility-side-apparatus is provided by the user identified by the user identifying information, when the use-history-of-facility is determined to not exist, then determines, from the plurality of history information items, as a use-history-of-same-kind-of-facility, whether the user identified by the user identifying information has a history indicative of a use history of a facility of the same kind of industry as the facility where the facility-side apparatus is provided, when the use-history-of-same-kind-of-facility is determined to exist, then extracts at least one of the plurality of history information items stored in the management apparatus which has the history indicative of the use history of the facility of the same kind of industry as the facility where the facility-side-apparatus is provided by the user identified by the user identifying information, and generates the service selection information item based on the extracted one of the plurality of history information items, the one of the plurality of history information items being related to and corresponding to both (a) the user having the appearance characteristic that is identified based on the user identifying information item received from the user-side apparatus and (b) the facility that has the facility-side apparatus, the facility-side apparatus is capable of performing radio communication with the user-side apparatus; and the facility-side apparatus is configured to receive the user identifying information item from the user-side apparatus that is in a state for being capable of communicating with the facility-side apparatus.

30. The facility-side apparatus according to claim 29, further comprising:

history information storing means for storing a plurality of history information items indicating services provided in a past at the facility having the facility-side apparatus, wherein:

the service information generating means generates the service selection information item based on one of the plurality of history information items stored in the history information storing means, the one of the plurality of history information items being related to the user that has the appearance characteristic identified based on the user identifying information item received from the user-side apparatus.

31. The facility-side apparatus according to claim 29, wherein the one of the plurality of history information items indicates the service provided in the past at the facility having the facility-side apparatus.

32. The facility-side apparatus according to claim 29, wherein the one of the plurality of history information items indicates the service provided at the another facility of a category identical to a category of the facility having the facility-side apparatus.

33. The facility-side apparatus according to claim 30, wherein the user identifying information item transmitted to the facility-side apparatus by the appearance information transmitting means of the user-side apparatus is used for identifying an identification information item unique to the user associated with the user-side apparatus, and wherein the service information generating means generates the service selection information item based on one of the plurality of history information items, the one of the plurality of history information items indicating the service provided to the user corresponding to the identification information item identified based on the user identifying information item received from the user-side apparatus.

34. The facility-side apparatus according to claim 30, wherein the user identifying information item transmitted to the facility-side apparatus by the appearance information transmitting means of the user-side apparatus is used for identifying a characteristic information item indicating a characteristic of the user associated with the user-side apparatus, and wherein the service information generating means generates the service selection information item based on the one of the plurality of history information items, the one of the plurality of history information items indicating the service provided to the user corresponding to the characteristic information item identified based on the user identifying information item received from the user-side apparatus.

35. The facility-side apparatus according to claim 30, wherein the user identifying information item transmitted to the facility-side apparatus by the appearance information transmitting means of the user-side apparatus is used for identifying a status information item indicative of a state related to the user associated with the user-side apparatus, and wherein the service information generating means generates the service selection information item based on the one of the plurality of history information items, the one of the plurality of history information items corresponding to the status information item identified based on the user identifying information item received from the user-side apparatus.

36. The facility-side apparatus according to claim 29, wherein the user-side apparatus includes history information storing means for storing a plurality of history information items indicating services provided at the plurality of facilities in a past to a plurality of users, and wherein the service information generating means generates the service selection information item based on one of the plurality of history information items stored in the history information storing means, the one of the plurality of history information items being related to the facility having the facility-side apparatus.

37. The facility-side apparatus according to claim 36, wherein the one of the plurality of history information items indicates the service provided in the past at the facility having the facility-side apparatus.

38. The facility-side apparatus according to claim 36, wherein the one of the plurality of history information items indicates the service provided in the past at another facility of a category identical to a category of the facility having the facility-side apparatus.

39. The facility-side apparatus according to claim 29, wherein the user identifying information item transmitted to the facility-side apparatus by the appearance information transmitting means of the user-side apparatus is used for identifying a face-shot image as the appearance characteristic, the face-shot image showing a face of the user associated with the user-side apparatus, and wherein the output means outputs the face-shot image of the user, the face-shot image being identified based on the user identifying information item received from the user-side apparatus.

40. A user-side apparatus associated with a user for being capable of communicating with a facility-side apparatus, the facility-side apparatus being provided at a facility, which the user is capable of visiting, the facility-side apparatus including output means for outputting an appearance characteristic of the user identified based on a user identifying information item received from the user-side apparatus, the user-side apparatus comprising:

appearance information transmitting means for transmitting to the facility-side apparatus the user identifying information item related to the user of the user-side apparatus, the user identifying information item being used for identifying the appearance characteristic of the user; and a management apparatus configured to store a plurality of history information items that indicates services provided in a past at a plurality of facilities, wherein:

the facility-side apparatus includes service information generating means for generating service selection information item used for selecting a service to be provided to the user based on the user identifying information item received from the user-side apparatus, the user having the appearance characteristic identified based on the user identifying information item; and the service information generating means of the facility-side apparatus detects whether the user-side apparatus exists in a communication area of the facility-side apparatus, and when the user-side apparatus is detected in the communication area of the facility-side apparatus, transmits a wireless request to the user-side apparatus for the user identifying information item,
receives the user identifying information item, and
responsive to receipt of the user identifying information item,
  determines, from the plurality of history information items, as a use-history-of-facility, whether the user identified by the user identifying information has a history indicative of a use history of the facility where the facility-side-apparatus is provided,
  when the use-history-of-facility is determined to exist, then extracts at least one of the plurality of history information items stored in the management apparatus which has the history indicative of use history of the facility where the facility-side-apparatus is provided by the user identified by the user identifying information,
  when the use-history-of-facility is determined to not exist, then
    determines, from the plurality of history information items, as a use-history-of-same-kind-of-facility, whether the user identified by the user identifying information has a history indicative of a use history of a facility of the same kind of industry as the facility where the facility-side apparatus is provided,
    when the use-history-of-same-kind-of-facility is determined to exist, then extracts at least one of the plurality of history information items stored in the management apparatus which has the history indicative of the use history of the facility of the same kind of industry as the facility where the facility-side-apparatus is provided by the user identified by the user identifying information,
  and generates the service selection information item based on the extracted one of the plurality of history information items, the one of the plurality of history information items being related to and corresponding to both (a) the user having the appearance characteristic that is identified based on the user identifying information item received from the user-side apparatus and (b) the facility that has the facility-side apparatus;

the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus;

the facility-side apparatus is capable of performing radio communication with the user-side apparatus; and the facility-side apparatus is configured to receive the user identifying information item from the user-side apparatus that is in a state for being capable of communicating with the facility-side apparatus.

41. The user-side apparatus according to claim 40, wherein:
the output means provides notification of the appearance characteristic of the user identified based on the user identifying information item together with notification of the service selection information item generated by the service information generating means.

42. The user-side apparatus according to claim 41,
wherein the facility-side apparatus includes history information storing means for storing a plurality of history information items indicating services provided in a past at the facility having the facility-side apparatus,
wherein the service information generating means generates the service selection information item based on one of the plurality of history information items stored in the history information storing means, the one of the plurality of history information items being related to the user that has the appearance characteristic identified based on the user identifying information item received from the user-side apparatus,
wherein the appearance information transmitting means is configured to transmit the user identifying information item that indicates the appearance characteristic of the user associated with the user-side apparatus, and
wherein the output means provides the notification of the appearance characteristic of the user indicated by the user identifying information item received from the user-side apparatus together with the notification of the service selection information item generated by the service information generating means.

43. The user-side apparatus according to claim 41, wherein:
the facility-side apparatus includes history information storing means for storing a plurality of history information items indicating services provided in a past at the facility having the facility-side apparatus; and
the facility-side apparatus includes appearance information storing means for storing appearance information items indicative of appearance characteristics of a plurality of users,
wherein the service information generating means is configured to generate the service selection information item based on one of the plurality of history information items stored in the history information storing means, the one of the plurality of history information items being related to the user having the appearance characteristic identified based on the user identifying information item received from the user-side apparatus,
wherein the appearance information transmitting means is configured to transmit the user identifying information item that is used for identifying one of the appearance information items stored in the appearance information storing means, the one of the appearance information items indicating the appearance characteristic of the user associated with the user-side apparatus, and
wherein the output means acquires from the appearance information storing means the one of the appearance information items and provides the notification of the appearance characteristic indicated by the acquired one of the appearance information items together with the service selection information item generated by the service information generating means.

44. The user-side apparatus according to claim 41,
wherein the appearance information transmitting means is configured to transmit the user identifying information item that indicates the appearance characteristic of the user associated with the user-side apparatus, and
wherein the output means provides the notification of the appearance characteristic of the user indicated by the user identifying information item received from the user-side apparatus together with the service selection information item generated by the service information generating means.

45. The user-side apparatus according to claim 41, wherein the facility-side apparatus includes appearance information storing means for storing appearance information items indicative of appearance characteristics of a plurality of users,
wherein the appearance information transmitting means is configured to transmit the user identifying information item that is used for identifying one of appearance information items stored in the appearance information storing means, the one of appearance information items indicating the appearance characteristic of the user associated with the user-side apparatus, and
wherein the output means acquires the one of appearance information items from the appearance information storing means and provides notification of the appearance characteristic indicated by the acquired one of appearance information items together with the service selection information item generated by the service information generating means.

46. The user-side apparatus according to claim 41, wherein the management apparatus is configured to store appearance information items indicative of appearance characteristics of a plurality of users,
wherein the appearance information transmitting means is configured to transmit the user identifying information item that is used for identifying one of appearance information items stored in the management apparatus, the one of appearance information items indicating the appearance characteristic of the user associated with the user-side apparatus, and
wherein the output means acquires the one of appearance information items from the management apparatus and provides notification of the appearance characteristic indicated by the acquired one of appearance information items together with the service selection information item generated by the service information generating means.

47. The user-side apparatus according to claim 41, wherein the user-side apparatus includes history information storing means for storing a plurality of history information items indicating services provided at the plurality of facilities in a past to the user associated with the user-side apparatus,
wherein the service information generating means of the facility-side apparatus generates the service selection information item based on one of the plurality of history information items stored in the history information storing means, the one of the plurality of history information items being related to the facility having the facility-side apparatus,
wherein the user identifying information item transmitted by the appearance information transmitting means of the user-side apparatus indicates the appearance characteristic of the user associated with the user-side apparatus, and
wherein the output means provides the notification of the appearance characteristic of the user indicated by the user identifying information item received from the user-side apparatus together with the notification of the service selection information item generated by the service information generating means.

48. The user-side apparatus according to claim 41, wherein the user-side apparatus includes history information storing means for storing a plurality of history information items indicating services provided in a past to the user associated with the user-side apparatus at the plurality of facilities,
wherein the facility-side apparatus includes appearance information storing means for storing appearance information items indicative of appearance characteristics of a plurality of users,
wherein the service information generating means of the facility-side apparatus is configured to generate the service selection information item based on one of the plurality of history information items stored in the history information storing means, the one of the plurality of history information being related to the facility having the facility-side apparatus,
wherein the appearance information transmitting means is configured to transmit the user identifying information item used for identifying one of the appearance information items stored in the appearance information storing means, the one of the appearance information items indicating the appearance characteristic of the user associated with the user-side apparatus, and
wherein the output means acquires the one of the appearance information items from the appearance information storing means and provides notification of the appearance characteristic indicated by the acquired one of the appearance information items together with the service selection information item generated by the service information generating means.

49. The user-side apparatus according to claim 40,
wherein the user identifying information item transmitted to the facility-side apparatus by the appearance information transmitting means of the user-side apparatus is used for identifying a face-shot image as the appearance characteristic, the face-shot image showing a face of the user associated with the user-side apparatus, and
wherein the output means outputs the face-shot image of the user, the face-shot image being identified based on the user identifying information item received from the user-side apparatus.

50. The user-side apparatus according to claim 49, further including an updating device that captures an image of the user to generate the face-shot image of the user and that transmits the face-shot image to the user-side apparatus associated with the user to perform image updating processing,
wherein the appearance information transmitting means transmits the user identifying information item to the facility-side apparatus, the user identifying information item being used for identifying, as the appearance characteristic, the face-shot image received from the updating device.

51. A status detecting device for an information communication system,
wherein the information communication system includes a user-side apparatus associated with a user, the user-side apparatus including appearance information transmitting means for transmitting to a facility-side apparatus a user identifying information item used for identifying a status information item indicative of an appearance characteristic of the user and indicative of a state related to the user, the status information item being received from the status detecting device, wherein the system includes a management apparatus that stores a plurality of history information items indicating services provided in a past at a plurality of facilities, wherein the system includes a facility-side apparatus provided at a facility, which the user is capable of visiting, the facility-side apparatus including service information generating means for detecting whether the user-side apparatus exists in a communication area of the facility-side apparatus, and when the user-side apparatus is detected in the communication area of the facility-side apparatus, for transmitting a wireless request to the user-side apparatus for the user identifying information item, for receiving the user identifying information item, and responsive to receipt of the user identifying information item, for determining, from the plurality of history information items, as a use-history-of-facility, whether the user identified by the user identifying information has a history indicative of a use history of the facility where the facility-side-apparatus is provided, when the use-history-of-facility is determined to exist, then extracting at least one of the plurality of history information items stored in the management apparatus which has the history indicative of use history of the facility where the facility-side-apparatus is provided by the user identified by the user identifying information, when the use-history-of-facility is determined to not exist, then determining, from the plurality of history information items, as a use-history-of-same-kind-of-facility, whether the user identified by the user identifying information has a history indicative of a use history of a facility of the same kind of industry as the facility where the facility-side apparatus is provided, when the use-history-of-same-kind-of-facility is determined to exist, then extracting at least one of the plurality of history information items stored in the management apparatus which has the history indicative of the use history of the facility of the same kind of industry as the facility where the facility-side-apparatus is provided by the user identified by the user identifying information, and generating a service selection information item for selecting a service to be provided to the user based on the extracted one of the plurality of history information items, the one of the plurality of history information items being related to and corresponding to both (a) the user having the appearance characteristic identified based on the user identifying information item received from the user-side apparatus and (b) the facility having facility-side apparatus, the one of the plurality of history information items corresponding to the status information item identified based on the user identifying information item, the facility-side apparatus including notifying means for providing notification of the appearance characteristic of the user identified based on the user identifying information item received from the user-side apparatus together with the service selection information item generated by the service information generating means, the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus, and wherein the system includes a status detecting device mounted to a vehicle, the status detecting device comprising:

status detecting means for detecting at least one of a state of the user that sits in the vehicle and a state of the vehicle;

status information transmitting means for transmitting the status information item indicative of the state detected by the status detecting means to the user-side apparatus;

wherein the facility-side apparatus is capable of performing radio communication with the user-side apparatus; and the facility-side apparatus is configured to receive the user identifying information item from the user-side apparatus that is in a state for being capable of communicating with the facility-side apparatus.

52. An updating device suitable for an information communication system, wherein:

the system includes an updating device provided in a vehicle, the system includes a user-side apparatus associated with the user, the user-side apparatus including appearance information transmitting means for transmitting to a facility-side apparatus a user identifying information item related to the user received from the updating device, the user identifying information item being used for identifying a face-shot image of the user, as an appearance characteristic of the user;

the system includes the facility-side apparatus provide at a facility, at which the user is capable of visiting, the facility-side apparatus including output means for outputting the face-shot image of the user identified based on the user identifying information item received from the user-side apparatus;

the output means provides notification of the face-shot image of the user identified based on the user identifying information item received from the user-side apparatus;

the system includes a management apparatus configured to store a plurality of history information items that indicates services provided in a past at a plurality of facilities;

the facility-side apparatus includes service information generating means for generating service selection information item used for selecting a service to be provided to the user based on the user identifying information item received from the user-side apparatus, the user having the appearance characteristic identified based on the user identifying information item received from the user-side apparatus;

the output means provides notification of the appearance characteristic of the user identified based on the user identifying information item together with notification of the service selection information item generated by the service information generating means;

the service information generating means of the facility-side apparatus detects whether the user-side apparatus exists in a communication area of the facility-side apparatus, and when the user-side apparatus is detected in the communication area of the facility-side apparatus, transmits a wireless request to the user-side apparatus for the user identifying information item, receives the user identifying information item, and responsive to receipt of the user identifying information item,
   determines, from the plurality of history information items, as a use-history-of-facility, whether the user identified by the user identifying information has a history indicative of a use history of the facility where the facility-side-apparatus is provided,
   when the use-history-of-facility is determined to exist, then extracts at least one of the plurality of history information items stored in the management apparatus which has the history indicative of use history of the facility where the facility-side-apparatus is provided by the user identified by the user identifying information,
   when the use-history-of-facility is determined to not exist, then
      determines, from the plurality of history information items, as a use-history-of-same-kind-of-facility, whether the user identified by the user identifying information has a history indicative of a use history of a facility of the same kind of industry as the facility where the facility-side apparatus is provided,
      when the use-history-of-same-kind-of-facility is determined to exist, then extracts at least one of the plurality of history information items stored in the management apparatus which has the history indicative of the use history of the facility of the same kind of industry as the facility where the facility-side-apparatus is provided by the user identified by the user identifying information,
   and generates the service selection information item based on the extracted one of the plurality of history information items, the one of the plurality of history information items being related to and corresponding to both (a) the user having the appearance characteristic that is identified based on the user identifying information item received from the user-side apparatus and (b) the facility that has the facility-side apparatus;
the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus;
the updating device comprising a capturing device that captures an image of a face of the user to generate the face-shot image and that transmits the face-shot image to the user-side apparatus associated with the user to perform image updating processing, the user sitting in a driver seat of the vehicle;
the facility-side apparatus is capable of performing radio communication with the user-side apparatus; and
the facility-side apparatus is configured to receive the user identifying information item from the user-side apparatus that is in a state for being capable of communicating with the facility-side apparatus.

53. The updating device according to claim 52, wherein the capturing device performs the image updating processing after elapse of a predetermined period since a time, when the updating device previously performs the image updating processing.

54. The updating device according to claim 53, wherein the period is set to a length that differs depending on an age of the user.

55. The updating device according to claim 52, wherein the capturing device performs the image updating processing under a circumstance where an amount of light for capturing the image is ensured.

56. The updating device according to claim 52, wherein the updating device performs the image updating processing if the user is provided with a predetermined service at one of the plurality of facilities.

57. An article of manufacture for a facility-side apparatus provided at a facility, which a user is capable of visiting, the facility-side apparatus being capable of communicating with a user-side apparatus associated with the user, the user-side apparatus including appearance information transmitting means for transmitting to the facility-side apparatus a user identifying information item related to the user, the user identifying information item being used for identifying an appearance characteristic of the user, the article of manufacture comprising:
   a non-transitory computer readable medium readable by a computer; and
   program instructions carried by the computer readable medium for causing the computer to serve as:
   output means for outputting the appearance characteristic of the user identified based on the user identifying information item received from the user-side apparatus;
   service information generating means for generating service selection information item used for selecting a service to be provided to the user based on the user identifying information item received from the user-side apparatus, the user having the appearance characteristic identified based on the user identifying information item received from the user-side apparatus; and
   a management apparatus configured to store a plurality of history information items that indicates services provided in a past at a plurality of facilities, wherein:
   the output means provides notification of the appearance characteristic of the user identified based on the user identifying information item received from the user-side apparatus;
   the output means provides notification of the appearance characteristic of the user identified based on the user identifying information item together with notification of the service selection information item generated by the service information generating means;
   the service information generating means detects whether the user-side apparatus exists in a communication area of the facility-side apparatus, and when the user-side apparatus is detected in the communication area of the facility-side apparatus,
   transmits a wireless request to the user-side apparatus for the user identifying information item, receives the user identifying information item, and
   responsive to receipt of the user identifying information item,
   determines, from the plurality of history, information items, as a use-history-of-facility, whether the user identified by the user identifying information has a history indicative of a use history of the facility where the facility-side-apparatus is provided,
   when the use-history-of-facility is determined to exist, then extracts at least one of the plurality of history information items stored in the management apparatus which has the history indicative of use history of the facility where the facility-side-apparatus is provided by the user identified by the user identifying information, when the use-history-of-facility is determined to not exist, then determines, from the plurality of history information items, as a use-history-of-same-kind-of-facility, whether the user identified by the user identifying information has a history indicative of a use history of a facility of the same kind of industry as the facility where the facility-side apparatus is provided, when the use-history-of-same-kind-of-facility is determined to exist, then extracts at least one of the plurality of history information items stored in the management apparatus which has the history indicative of the use history of the facility of the same kind of industry as the facility where the facility-side-apparatus is provided by the user identified by the user identification information, and generates the service selection information item based on the extracted one of the plurality of history information items, the one of the plurality of history information items being related to and corresponding to both (a) the user having the appearance characteristic that is identified based on the user identifying information item received from the user-side apparatus and (b) the facility that has the facility-side apparatus;

the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus; the facility-side apparatus is capable of performing radio communication with the user-side apparatus; and the facility-side apparatus is configured to receive the user identifying information item from the user-side apparatus that is in a state for being capable of communicating with the facility-side apparatus.

58. An article of manufacture for a user-side apparatus associated with a user for being capable of communicating with a facility-side apparatus, the facility-side apparatus being provided at a facility, which the user is capable of visiting, the facility-side apparatus including output means for outputting an appearance characteristic of the user identified based on a user identifying information item received from the user-side apparatus, the article of manufacture comprising:

a non-transitory computer readable medium readable by a computer; and program instructions carried by the computer readable medium for causing the computer to serve as:

appearance information transmitting means for transmitting to the facility-side apparatus the user identifying information item related to the user of the user-side apparatus, the user identifying information item being used for identifying the appearance characteristic of the user; and a management apparatus configured to store a plurality of history information items that indicates services provided in a past at a plurality of facilities, wherein:

the facility-side apparatus includes service information generating means for generating service selection information item used for selecting a service to be provided to the user based on the user identifying information item received from the appearance information transmitting means, the user having the appearance characteristic identified based on the user identifying information item; and the service information generating means of the facility-side apparatus detects whether the user-side apparatus exists in a communication area of the facility-side apparatus, and when the user-side apparatus is detected in the communication area of the facility-side apparatus, transmits a wireless request to the user-side apparatus for the user identifying information item, receives the user identifying information item, and responsive to receipt of the user identifying information item, determines, from the plurality of history information items, as a use-history-of-facility, whether the user identified by the user identifying information has a history indicative of a use history of the facility where the facility apparatus is provided, when the use-history-of-facility is determined to exist, then extracts at least one of the plurality of history information items stored in the management apparatus which has the history indicative of use history of the facility where the facility-side-apparatus is provided by the user identified by the user identifying information, when the use-history-of-facility is determined to not exist, then determines, from the plurality of history information items, as a use-history-of-same-kind-of-facility, whether the user identified by the user identifying information has a history indicative of a use history of a facility of the same kind of industry as the facility where the facility-side apparatus is provided, when the use-history-of-same-kind-of-facility is determined to exist, then extracts at least one of the plurality of history information items stored in the management apparatus which has the history indicative of the use history of the facility of the same kind of industry as the facility where the facility-side-apparatus is provided by the user identified by the user identifying information, and generates the service selection information item based on the extracted one of the plurality of history information items, the one of the plurality of history information items being related to and corresponding to both (a) the user having the appearance characteristic that is identified based on the user identifying information item received from the user-side apparatus and (b) the facility that has the facility-side apparatus;

the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus; wherein the facility-side apparatus is capable of performing radio communication with the user-side apparatus; and the facility-side apparatus is configured to receive the user identifying information item from the user-side apparatus that is in a state for being capable of communicating with the facility-side apparatus.

59. An article of manufacture for a status detecting device for an information communication system, wherein the information communication system includes a user-side apparatus associated with a user, the user-side apparatus including appearance information transmitting means for transmitting to a facility-side apparatus a user identifying information item used for identifying a status information item indicative of an appearance characteristic of the user and indicative of a state related to the user, the status information item being received from the status detecting device, wherein the system includes a management apparatus that stores a plurality of history information items indicating services provided in a past at a plurality of facilities, wherein the system includes a facility-side apparatus provided at a facility, which the user is capable of visiting, the facility-side apparatus including service information generating means for detecting whether the user-side apparatus exists in a communication area of the facility-side apparatus, and when the user-side apparatus is detected in the communication area of the facility-side apparatus, for transmitting a wireless request to the user-side apparatus for the user identifying information item, for receiving the user identifying information item, and responsive to receipt of the user identifying information item, for determining from the plurality of history information items, as a use-history-of-facility, whether the user identified by the user identifying information has a history indicative of a use history, of the facility where the facility-side-apparatus is provided, when the use-history-of facility is determined to exist, then extracting at least one of the plurality of history information items stored in the management apparatus which has the history indicative of use history of the facility where the facility-side-apparatus is provided by the user identified by the user identifying information, when the use-history-of-facility is determined to not exist, then determining, from the plurality of history information items, as a use-history-of-same-kind-of-facility, whether the user identified by the user identifying information has a history indicative of a use history of a facility of the same kind of industry as the facility where the facility-side apparatus is provided, when the use-history-of-same-kind-of-facility is determined to exist, then extracting at least one of the plurality of history information items stored in the management apparatus which has the history indicative of the use history of the facility of the same kind of industry as the facility where the facility-side-apparatus is provided by the user identified by the user identifying information, extracting one of the plurality of history information items stored in the management apparatus and generating a service selection information item for selecting a service to be provided to the user based on the extracted one of the plurality of history information items, the one of the plurality of history information items being related to and corresponding to both (a) the user having the appearance characteristic identified based on the user identifying information item received from the user-side apparatus and (b) the facility having facility-side apparatus, the one of the plurality of history information items corresponding to the status information item identified based on the user identifying information item, the facility-side apparatus including notifying means for providing notification of the appearance characteristic of the user identified based on the user identifying information item received from the user-side apparatus together with the service selection information item generated by the service information generating means, and wherein the system includes a status detecting device mounted to a vehicle, the article of manufacture comprising:

a non-transitory computer readable medium readable by a computer; and program instructions carried by the computer readable medium for causing the computer to serve as:

status detecting means for detecting at least one of a state of the user that sits in the vehicle and a state of the vehicle;

status information transmitting means for transmitting the status information item indicative of the state detected by the status detecting means to the user-side apparatus; and the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus;

wherein the facility-side apparatus is capable of performing radio communication with the user-side apparatus; and the facility-side apparatus is configured to receive the user identifying information item from the user-side apparatus that is in a state for being capable of communicating with the facility-side apparatus.

60. An article of manufacture for an updating device suitable for an information communication system, wherein:

the system includes an updating device provided in a vehicle;

the system includes a user-side apparatus associated with the user, the user-side apparatus including appearance information transmitting means for transmitting to a facility-side apparatus a user identifying information item related to the user received from the updating device, the user identifying information item being used for identifying a face-shot image of the user as an appearance characteristic of the user;

the system includes the facility-side apparatus provide at a facility, at which the user is capable of visiting, the facility-side apparatus including output means for outputting the face-shot image of the user identified based on the user identifying information item received from the user-side apparatus;

the output means provides notification of the face-shot image of the user identified based on the user identifying information item received from the user-side apparatus;

the updating device comprising a capturing device that captures an image of a face of the user to generate the face-shot image and that transmits the face-shot image to the user-side apparatus associated with the user to perform image updating processing, the user sitting in a driver seat of the vehicle;

the system includes a management apparatus configured to store a plurality of history information items that indicates services provided in a past at a plurality of facilities;

the facility-side apparatus includes service information generating means for generating service selection information item used for selecting a service to be provided to the user based on the user identifying information item received from the user-side apparatus, the user having the appearance characteristic identified based on the user identifying information item received from the user-side apparatus;

the output means provides notification of the appearance characteristic of the user identified based on the user identifying information item together with notification of the service selection information item generated by the service information generating means;

the service information generating means of the facility-side apparatus detects whether the user-side apparatus exists in a communication area of the facility-side apparatus, and when the user-side apparatus is detected in the communication area of the facility-side apparatus, transmits a wireless request to the user-side apparatus for the user identifying information item, receives the user identifying information item, and responsive to receipt of the user identifying information item, determines from the plurality of history information items, as a use-history-of-facility, whether the user identified by the user identifying information has a history indicative of a use history of the facility where the facility-side-apparatus is provided, when the use-history-of-facility is determined to exist, then extracts at least one of the plurality of history information items stored in the management apparatus which has the history indicative of use history of the facility where the facility-side-apparatus is provided by the user identified by the user identifying information, when the use-history-of-facility is determined to not exist, then determines, from the plurality of history information items as a use-history-of-same-kind-of-facility, whether the user identified by the user identifying information has a history indicative of a use history of a facility of the same kind of industry, as the facility where the facility-side apparatus is provided, when the use-history-of-same-kind-of-facility is determined to exist, then extracts at least one of the plurality of history information items stored in the management apparatus which has the history indicative of the use history of the facility of the same kind of industry as the facility where the facility-side-apparatus is provided by the user identifying information, extracts one of the plurality of history information items stored in the management apparatus and generates the service selection information item based on the extracted one of the plurality of history information items, the one of the plurality of history information items being related to and corresponding to both (a) the user having the appearance characteristic that is identified based on the user identifying information item received from the user-side apparatus and (b) the facility that has the facility-side apparatus; and the appearance information transmitting means of the user-side apparatus detects whether the request for the user identifying information item is received, and in response to the request transmits the user identifying information item related to the user of the user-side apparatus to the facility-side apparatus, when the wireless request for the user identifying information item is received from the facility-side apparatus, the article of manufacture comprising:

a non-transitory computer readable medium readable by a computer; and program instructions carried by the computer readable medium for causing the computer to serve as the capturing device;

wherein the facility-side apparatus is capable of performing radio communication with the user-side apparatus; and the facility-side apparatus is configured to receive the user identifying information item from the user-side apparatus that is in a state for being capable of communicating with the facility-side apparatus.

61. The information communication system according to claim 11, wherein when there is no history information item stored in the management apparatus that indicates the service provided for the user at the facility, the service information generating means extracts the one of the plurality of history information items indicating the service provided for the user at the another facility.

62. The information communication system according to claim 21, wherein when there is no history information item stored in the management apparatus that indicates the service provided for the user at the facility, the service information generating means extracts the one of the plurality of history information items indicating the service provided for the user at the another facility.

63. The facility-side apparatus according to claim 32, wherein when there is no history information item stored in the management apparatus that indicates the service provided for the user at the facility, the service information generating means extracts the one of the plurality of history information items indicating the service provided for the user at the another facility.

64. The facility-side apparatus according to claim 38, wherein when there is no history information item stored in the management apparatus that indicates the service provided for the user at the facility, the service information generating means extracts the one of the plurality of history information items indicating the service provided for the user at the another facility.

65. The information communication system of claim 1, wherein the service information generating means of the facility-side apparatus generates only the service selection information items that are related to and correspond to both (a) the user and (b) the facility from the plurality of history information items that indicates services provided in the past at the plurality of facilities.

66. The information communication system according to claim 1, wherein
the user-side apparatus and the facility-side apparatus have short-range radio wireless communication configured to mutually communicate therebetween; and
the facility-side apparatus receives, via the short-range wireless communication, the user identifying information item in a state in which the user having the user-side apparatus is visiting the facility.

67. The information communication system according to claim 1, wherein
the output means is configured to provide notification of the appearance characteristic of the user as image information indicative of a face-shot image of the user.

68. The facility-side apparatus according to claim 29, wherein
the facility-side apparatus has short-range radio wireless communication configured to mutually communicate with the user-side apparatus; and
the facility-side apparatus receives, via the short-range wireless communication, the user identifying information item in a state in which the user having the user-side apparatus is visiting the facility.

69. The facility-side apparatus according to claim 29, wherein
the output means is configured to provide notification of the appearance characteristic of the user as image information indicative of a face-shot image of the user.

70. The user-side apparatus according to claim 40, wherein
the user-side apparatus has short-range radio wireless communication configured to mutually communicate with the facility-side apparatus; and
the user-side apparatus transmits, via the short-range wireless communication to the facility-side apparatus, the user identifying information item in a state in which the user having the user-side apparatus is visiting the facility.

71. The status detecting device according to claim 51, wherein
the user-side apparatus and the facility-side apparatus have short-range radio wireless communication configured to mutually communicate therebetween; and
the status detecting device is configured to transmit, via the short-range wireless communication to the facility-side apparatus, the user identifying information item in a state in which the user having the user-side apparatus is visiting the facility.

72. The updating device according to claim 52, wherein
the user-side apparatus and the facility-side apparatus have short-range radio wireless communication configured to mutually communicate therebetween; and
the updating device is configured to transmit, via the short-range wireless communication to the facility-side apparatus, the user identifying information item in a state in which the user having the user-side apparatus is visiting the facility.

73. The article of manufacture for the facility-side apparatus according to claim 57, wherein
the facility-side apparatus has short-range radio wireless communication configured to mutually communicate with the user-side apparatus; and
the program instructions cause the facility-side apparatus to receive, via the short-range wireless communication, the user identifying information item in a state in which the user having the user-side apparatus is visiting the facility.

74. The article of manufacture for the facility-side apparatus according to claim 57, wherein
the program instructions cause the output means to provide notification of the appearance characteristic of the user as image information indicative of a face-shot image of the user.

75. The article of manufacture for the user-side apparatus according to claim 58, wherein
the user-side apparatus has short-range radio wireless communication configured to mutually communicate with the facility-side apparatus; and
the program instructions cause the user-side apparatus to transmit, via the short-range wireless communication to the facility-side apparatus, the user identifying information item in a state in which the user having the user-side apparatus is visiting the facility.

76. The article of manufacture for the status detecting device according to claim 59, wherein
the user-side apparatus and the facility-side apparatus have short-range radio wireless communication configured to mutually communicate therebetween; and
the program instructions cause the status detecting device to transmit, via the short-range wireless communication to the facility-side apparatus, the user identifying information item in a state in which the user having the user-side apparatus is visiting the facility.

77. The article of manufacture for the updating device according to claim 60, wherein
the user-side apparatus and the facility-side apparatus have short-range radio wireless communication configured to mutually communicate therebetween; and
the program instructions cause the updating device to transmit, via the short-range wireless communication to the facility-side apparatus, the user identifying information item in a state in which the user having the user-side apparatus is visiting the facility.

* * * * *